US011109580B1

(12) United States Patent
Rosenbloom et al.

(10) Patent No.: US 11,109,580 B1
(45) Date of Patent: Sep. 7, 2021

(54) FISHING LINE ACCESSORY SYSTEMS, METHODS, AND APPARATUSES

(71) Applicant: Field Systems Research, LLC, Lake Oswego, OR (US)

(72) Inventors: Frank S. Rosenbloom, Portland, OR (US); John E. Van Leeuwen, Lake Oswego, OR (US)

(73) Assignee: FIELD SYSTEM RESEARCH, LLC, Lake Oswego, OR (US)

( * ) Notice: Subject to any disclaimer, the term of this patent is extended or adjusted under 35 U.S.C. 154(b) by 0 days.

(21) Appl. No.: 15/844,536

(22) Filed: Dec. 16, 2017

Related U.S. Application Data

(63) Continuation of application No. 14/606,961, filed on Jan. 27, 2015, now Pat. No. 9,867,365, which is a continuation-in-part of application No. 13/152,106, filed on Jun. 2, 2011, now Pat. No. 8,950,107.

(60) Provisional application No. 61/351,149, filed on Jun. 3, 2010, provisional application No. 61/363,131, filed on Jul. 9, 2010, provisional application No. 61/387,125, filed on Sep. 28, 2010.

(51) Int. Cl.
*A01K 91/03* (2006.01)
*A01K 93/00* (2006.01)
*A01K 91/04* (2006.01)

(52) U.S. Cl.
CPC .............. *A01K 93/00* (2013.01); *A01K 91/03* (2013.01); *A01K 91/04* (2013.01)

(58) Field of Classification Search
CPC ........ A01K 93/00; A01K 91/03; A63H 27/10; A63H 2027/1033; A63H 2027/1083; A63H 2027/1041; B60C 29/00

USPC ............ 43/44.93, 44.92, 44.95, 44.87, 43.1, 43/43.14, 42.22; 446/220, 222, 224; 137/846, 847

See application file for complete search history.

(56) References Cited

U.S. PATENT DOCUMENTS

| 418,995 A | * | 1/1890 | Tufts ................... A01K 95/00 |
|  |  |  | 43/44.95 |
| 563,287 A | * | 7/1896 | Lane et al. ........... A63H 27/10 |
|  |  |  | 446/224 |

(Continued)

FOREIGN PATENT DOCUMENTS

| DE |  | 2441698 A1 | * | 3/1976 | ............. A01K 93/00 |
| DE |  | 3825818 A1 | * | 2/1990 | ............. A01K 91/02 |

(Continued)

OTHER PUBLICATIONS

Vernay Laboratories, Inc., "Vernay Duckbill Check Valve VA3562: Technical Information Sheet," web catalog, item VA3562, Revised on Sep. 16, 2009, 2 pages.

(Continued)

*Primary Examiner* — Darren W Ark
(74) *Attorney, Agent, or Firm* — Green, Howard & Mughal LLP; Karen Dana Oster

(57) ABSTRACT

A fishing line accessory system for securing fishing accessories to a fishing line includes a primary coupling component, a secondary coupling component coupleable with the primary coupling component, and at least one fishing accessory. The at least one fishing accessory being at least one inflatable fishing accessory. The fishing line is secured between the primary coupling component and the secondary coupling component.

23 Claims, 38 Drawing Sheets

(56) References Cited

U.S. PATENT DOCUMENTS

| | | | | |
|---|---|---|---|---|
| 1,850,748 A * | 3/1932 | Foster | A01K 93/00 | 43/44.93 |
| 2,161,274 A * | 6/1939 | Behrend | A63H 27/10 | 446/224 |
| 2,201,588 A | 5/1940 | Kuhns | | |
| 2,255,793 A * | 9/1941 | Kridler | A01K 83/00 | 403/209 |
| 2,351,558 A * | 6/1944 | Sykora | A01K 93/00 | 43/44.87 |
| 2,379,676 A * | 7/1945 | Blackstone | A01K 93/00 | 24/115 G |
| 2,490,669 A | 12/1949 | Burke | | |
| 2,524,059 A * | 10/1950 | Kennedy | A63H 27/10 | 446/187 |
| 2,535,907 A * | 12/1950 | Dolejs | A01K 93/00 | 43/44.92 |
| 2,635,387 A * | 4/1953 | Anderson | A63H 27/10 | 446/221 |
| 2,729,014 A * | 1/1956 | Johnson | A01K 95/00 | 43/42.49 |
| 2,764,838 A * | 10/1956 | Singer | A01K 93/00 | 43/44.91 |
| 2,826,850 A | 3/1958 | Laudan | | |
| 2,847,792 A * | 8/1958 | Kuhimann | A01K 93/00 | 43/44.9 |
| 2,881,552 A * | 4/1959 | Miller | A01K 93/00 | 24/115 G |
| 2,892,198 A * | 6/1959 | Gruenberg | B63B 22/14 | 43/23 |
| 2,903,718 A * | 9/1959 | Wright, Jr. | B63B 22/08 | 116/210 |
| 2,924,039 A * | 2/1960 | Morton | A01K 93/00 | 43/43.11 |
| 2,924,041 A * | 2/1960 | Jackson et al. | A63H 27/10 | 446/224 |
| 2,958,976 A * | 11/1960 | Adams | A01K 91/02 | 24/615 |
| 3,032,913 A * | 5/1962 | Voll | A01K 91/04 | 24/132 AA |
| 3,037,319 A * | 6/1962 | Stanek | A01K 93/00 | 43/44.95 |
| 3,105,318 A * | 10/1963 | Birrell | A01K 93/00 | 43/42.74 |
| 3,107,451 A * | 10/1963 | Sitzler | A01K 93/00 | 43/43.14 |
| 3,149,435 A * | 9/1964 | Nordeen | A01K 93/00 | 43/26.1 |
| 3,246,417 A * | 4/1966 | Esplin | A01K 91/02 | 43/43.14 |
| 3,269,049 A * | 8/1966 | Emmons | A01K 91/06 | 43/23 |
| 3,589,053 A * | 6/1971 | Fynbo | A01K 93/00 | 43/44.92 |
| 3,597,871 A * | 8/1971 | Hansen | A01K 93/00 | 43/43.14 |
| 3,609,907 A * | 10/1971 | Wiig | A01K 93/00 | 43/43.12 |
| 3,698,121 A * | 10/1972 | Nordeen | A01K 93/02 | 43/43.14 |
| 3,747,257 A * | 7/1973 | Olsen | A01K 93/00 | 43/43.14 |
| 3,757,453 A * | 9/1973 | Therres | A01K 93/00 | 43/43.14 |
| 3,768,501 A * | 10/1973 | Elson | F16K 15/20 | 137/231 |
| 3,800,461 A * | 4/1974 | Jacobi | A01K 93/00 | 43/44.88 |
| 3,822,720 A * | 7/1974 | Souza | F04B 43/08 | 137/846 |
| 3,827,175 A * | 8/1974 | Howard | A01K 93/00 | 43/44.95 |
| 3,916,557 A * | 11/1975 | Taylor | A01K 95/00 | 43/43.12 |
| 3,949,513 A * | 4/1976 | Dmytriw | A01K 93/00 | 43/44.93 |
| 4,094,347 A * | 6/1978 | Ikemoto | A63H 27/10 | 141/313 |
| 4,291,484 A | 9/1981 | Young | | |
| 4,300,303 A * | 11/1981 | Hutson | A01K 87/00 | 43/24 |
| 4,341,239 A * | 7/1982 | Atkinson | F16K 15/147 | 137/493 |
| 4,434,810 A * | 3/1984 | Atkinson | F16K 15/147 | 137/493 |
| 4,472,903 A * | 9/1984 | Hutson | A01K 95/00 | 43/44.91 |
| 4,586,910 A * | 5/1986 | Buchanan | A63H 27/10 | 137/223 |
| 4,638,584 A | 1/1987 | Lindsay | | |
| 4,644,681 A * | 2/1987 | Hutson | A01K 93/00 | 43/44.91 |
| 4,648,194 A * | 3/1987 | Carroll, Jr. | A01K 91/02 | 43/19 |
| 4,681,138 A * | 7/1987 | Giuliani | A63H 27/10 | 137/516.29 |
| 4,693,030 A | 9/1987 | Wohead | | |
| 4,757,633 A * | 7/1988 | Van Cleve | A01K 91/02 | 43/26.1 |
| 4,873,784 A * | 10/1989 | Petron | A01K 93/00 | 43/44.95 |
| 4,893,433 A * | 1/1990 | Scheffler | A01K 93/00 | 43/43.1 |
| 5,010,925 A | 4/1991 | Atkinson et al. | | |
| 5,188,558 A * | 2/1993 | Barton | A63H 27/10 | 446/220 |
| 5,199,205 A | 4/1993 | Klammer | | |
| 5,233,781 A * | 8/1993 | Bigelow | A01K 93/00 | 43/17 |
| 5,295,891 A * | 3/1994 | Schalk | A63H 27/10 | 362/806 |
| 5,359,804 A | 11/1994 | Burns | | |
| 5,361,532 A * | 11/1994 | Moff | A01K 93/00 | 43/44.9 |
| 5,412,902 A * | 5/1995 | Hicks | A01K 93/00 | 43/44.87 |
| 5,490,344 A | 2/1996 | Bussiere | | |
| 5,496,203 A * | 3/1996 | Murray | A63H 27/10 | 446/221 |
| 5,499,941 A * | 3/1996 | Penjuke, Sr. | A63H 27/10 | 137/560 |
| 5,507,112 A * | 4/1996 | Cheney, Jr. | A01K 91/02 | 43/41.2 |
| 5,575,104 A | 11/1996 | Wilding | | |
| 5,588,897 A * | 12/1996 | Valentino | A63H 27/10 | 446/217 |
| 5,608,985 A * | 3/1997 | Kainec | A01K 91/04 | 43/43.1 |
| 5,651,210 A * | 7/1997 | Moore | A01K 93/00 | 43/4.5 |
| 5,934,310 A * | 8/1999 | Littlehorn | A63H 27/10 | 137/223 |
| 6,092,551 A | 7/2000 | Bennett | | |
| 6,125,574 A * | 10/2000 | Ganaja | A01K 91/03 | 24/136 L |
| 6,318,016 B1 | 11/2001 | Ellig | | |
| 6,550,179 B1 * | 4/2003 | Seay | A01K 93/00 | 43/44.87 |
| 6,622,759 B2 * | 9/2003 | Yang | A63H 27/10 | 141/114 |
| 6,887,173 B2 * | 5/2005 | Lacroix | A63B 41/00 | 473/593 |
| 7,100,323 B1 | 9/2006 | Bogess | | |
| 7,225,580 B1 | 6/2007 | Chou | | |
| 7,243,676 B2 * | 7/2007 | Bailey | A61M 39/24 | 137/493.1 |
| 7,437,850 B1 * | 10/2008 | Seay | A01K 93/00 | 43/44.87 |

(56) References Cited

U.S. PATENT DOCUMENTS

| | | | |
|---|---|---|---|
| 7,621,069 B2 | 11/2009 | Holtskampf | |
| 7,832,139 B1 | 11/2010 | Christensen | |
| 8,161,678 B1* | 4/2012 | DeLucca | A01K 93/02 43/17 |
| 8,266,837 B2* | 9/2012 | Loe | A01K 93/02 43/4.5 |
| 8,341,872 B2* | 1/2013 | Ellard | A01K 93/00 43/44.87 |
| 8,819,986 B2* | 9/2014 | Bennis | A01K 91/03 43/17.5 |
| 8,877,117 B2 | 11/2014 | Fields et al. | |
| 8,893,908 B2 | 11/2014 | Treece et al. | |
| 8,950,107 B1* | 2/2015 | Rosenbloom | A01K 91/03 43/44.87 |
| 9,113,619 B2* | 8/2015 | Loe | A01K 93/02 |
| 9,301,514 B2* | 4/2016 | Pearcy | A01K 91/03 |
| 9,731,213 B2* | 8/2017 | Laden | A63H 27/10 |
| 9,867,365 B1* | 1/2018 | Rosenbloom | A01K 91/04 |
| 9,883,664 B2* | 2/2018 | Bos | A01K 91/03 |
| 9,962,619 B2* | 5/2018 | Mowbray | A63H 27/10 |
| 2010/0288373 A1 | 11/2010 | Doig | |
| 2011/0308136 A1* | 12/2011 | Dragony | A01K 91/20 43/43.11 |
| 2012/0060404 A1* | 3/2012 | Baron | A01K 93/02 43/44.92 |
| 2012/0289120 A1* | 11/2012 | Nelson | A63H 27/10 446/224 |
| 2012/0308291 A1* | 12/2012 | Weiner | B43K 29/00 401/195 |
| 2014/0084112 A1* | 3/2014 | Stubbe | A63H 27/085 244/155 R |
| 2014/0250765 A1* | 9/2014 | Berchin-Miller | A01K 93/00 43/44.87 |
| 2017/0293060 A1* | 10/2017 | Hayashi | A63H 27/10 |
| 2018/0296935 A1* | 10/2018 | Mowbray | A63H 27/10 |
| 2020/0068863 A1 | 3/2020 | Cunic | |
| 2020/0068864 A1 | 3/2020 | Cunic | |

FOREIGN PATENT DOCUMENTS

| | | | | |
|---|---|---|---|---|
| DE | 4107474 A1 | * | 5/1992 | A01K 93/00 |
| DE | 4232153 A1 | * | 3/1994 | A01K 93/00 |
| DE | 4426781 A1 | * | 2/1996 | A01K 91/03 |
| DE | 10033275 A1 | * | 1/2002 | A01K 93/00 |
| EP | 0348582 A1 | * | 1/1990 | A01K 93/00 |
| EP | 575238 A1 | * | 12/1993 | |
| EP | 830812 A2 | * | 3/1998 | |
| FR | 2767640 A1 | * | 3/1999 | A01K 91/02 |
| GB | 725919 A | * | 3/1955 | A01K 93/00 |
| GB | 847342 A | * | 9/1960 | A01K 75/04 |
| GB | 1090464 A | * | 11/1967 | A01K 93/00 |
| GB | 1184325 A | * | 3/1970 | A01K 93/00 |
| GB | 1535211 A | * | 12/1978 | A01K 91/03 |
| GB | 2155292 A | * | 9/1985 | A01K 93/00 |
| GB | 2159031 B | * | 7/1988 | A01K 93/00 |
| GB | 2227636 A | * | 8/1990 | A01K 93/00 |
| GB | 2238939 A | * | 6/1991 | A01K 93/00 |
| GB | 2379371 A | * | 3/2003 | A01K 93/00 |
| GB | 2407955 A | * | 5/2005 | A01K 93/00 |
| GB | 2418583 A | * | 4/2006 | A01K 91/03 |
| GB | 2470381 A | * | 11/2010 | A01K 93/00 |
| GB | 2472223 A | * | 2/2011 | A01K 91/10 |
| JP | 04335850 A | * | 11/1992 | |
| JP | 06022669 A | * | 2/1994 | |
| JP | 08140539 A | * | 6/1996 | |
| JP | 08182452 A | * | 7/1996 | |
| JP | 08205736 A | * | 8/1996 | |
| JP | 08228649 A | * | 9/1996 | |
| JP | 09000129 A | * | 1/1997 | |
| JP | 09172923 A | * | 7/1997 | |
| JP | 09172924 A | * | 7/1997 | |
| JP | 10178995 A | * | 7/1998 | |
| JP | 10327726 A | * | 12/1998 | |
| JP | 11004644 A | * | 1/1999 | |
| JP | 11056186 A | * | 3/1999 | |
| JP | 2000000039 A | * | 1/2000 | |
| JP | 2000139306 A | * | 5/2000 | |
| JP | 2000262197 A | * | 9/2000 | |
| JP | 2001061387 A | * | 3/2001 | |
| JP | 2002209488 A | * | 7/2002 | |
| JP | 2002325532 A | * | 11/2002 | |
| JP | 2002325533 A | * | 11/2002 | |
| JP | 2003092961 A | * | 4/2003 | |
| JP | 2004275164 A | * | 10/2004 | |
| JP | 2005261392 A | * | 9/2005 | |
| JP | 2007014325 A | * | 1/2007 | A01K 93/02 |
| JP | 2007110980 A | * | 5/2007 | |
| JP | 2008017824 A | * | 1/2008 | |
| KR | 20010070618 A | * | 7/2001 | |
| KR | 20060127970 A | * | 12/2006 | |
| KR | 20070050161 A | * | 5/2007 | |
| KR | 20090085953 A | * | 8/2009 | |
| KR | 20090092555 A | * | 9/2009 | |
| KR | 100960264 B1 | * | 6/2010 | |
| KR | 20110017632 A | * | 2/2011 | |
| KR | 101364793 B1 | * | 2/2014 | |
| KR | 20150069860 A | * | 6/2015 | |
| WO | WO-8505249 A1 | * | 12/1985 | A01K 93/00 |
| WO | WO-0110207 A1 | * | 2/2001 | A01K 93/00 |
| WO | WO-2013153077 A3 | * | 1/2014 | A01K 91/02 |

OTHER PUBLICATIONS bitosense.com, "Glow Planer Bobbers," web page, at least as early as Aug. 12, 2014, 5 pages, http://www.bitosense.com/GLOWPLANERBOBBERS.html.

Bullet Bobbers Enterprises, bulletbobber.com, "Bullet Bobber & Glow Sticks," web page, at least as early as Aug. 12, 2014, 3 pages, http://www.bulletbobber.com/whlesalebasket.html.

GHOSTech Strike Indicators, "GHOSTech Fly Fishing Strike Indicators GHOSTech Strike Indicator Fly Fishing's Best Strike Indicator", website, https://ghostechsi.com/, at least as early as Mar. 7, 2021, 15 pages.

* cited by examiner

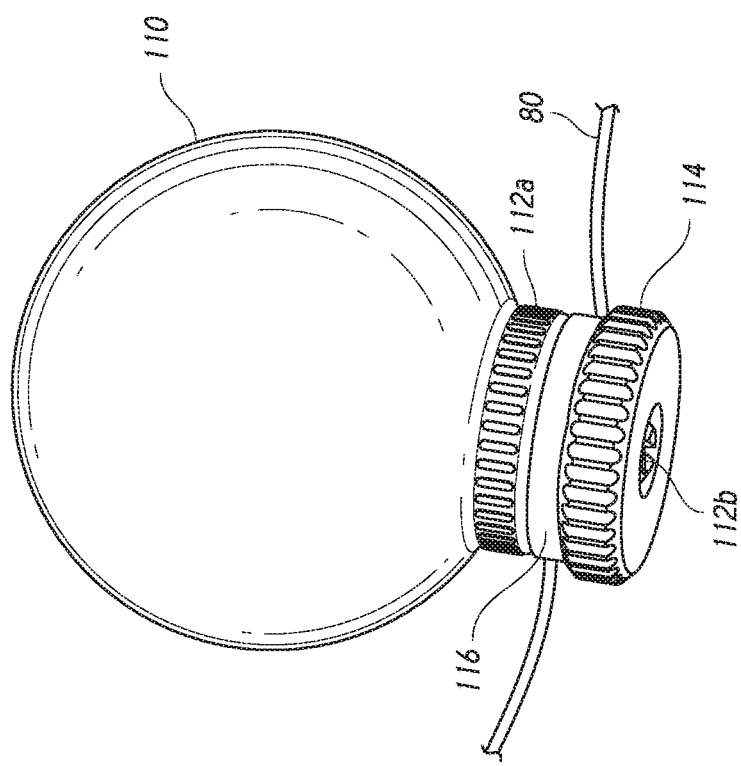
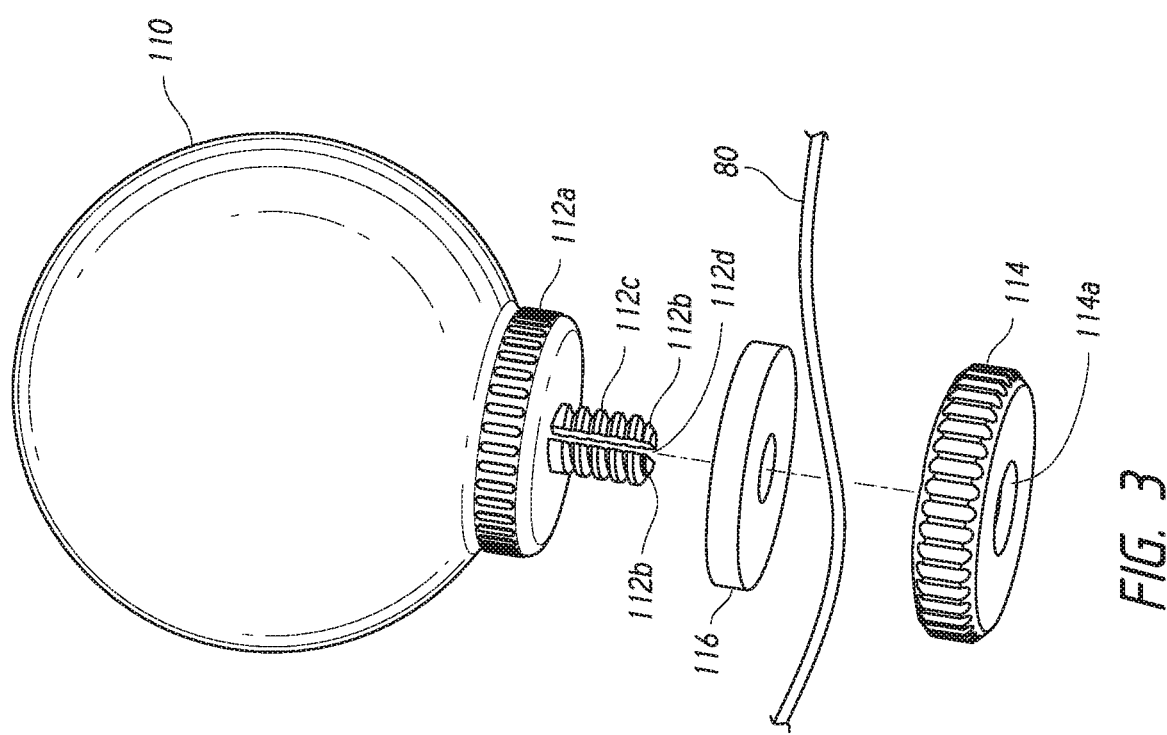

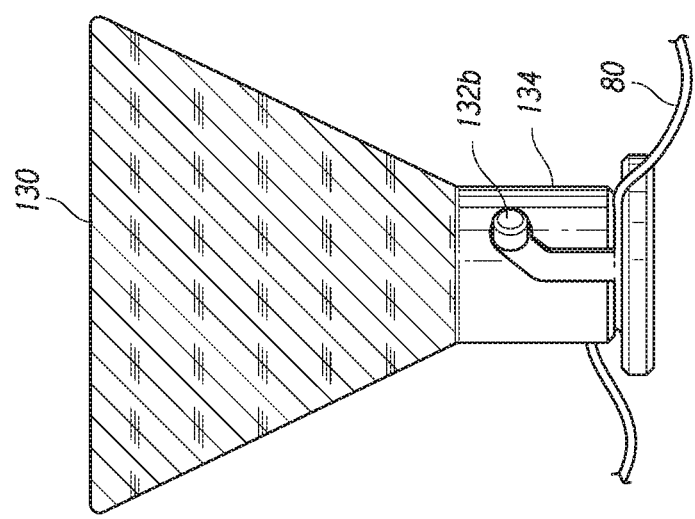
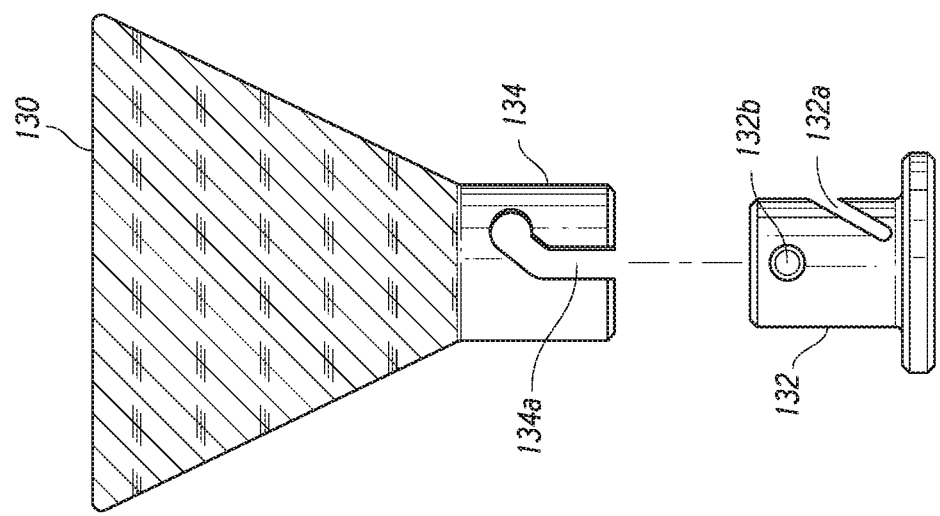

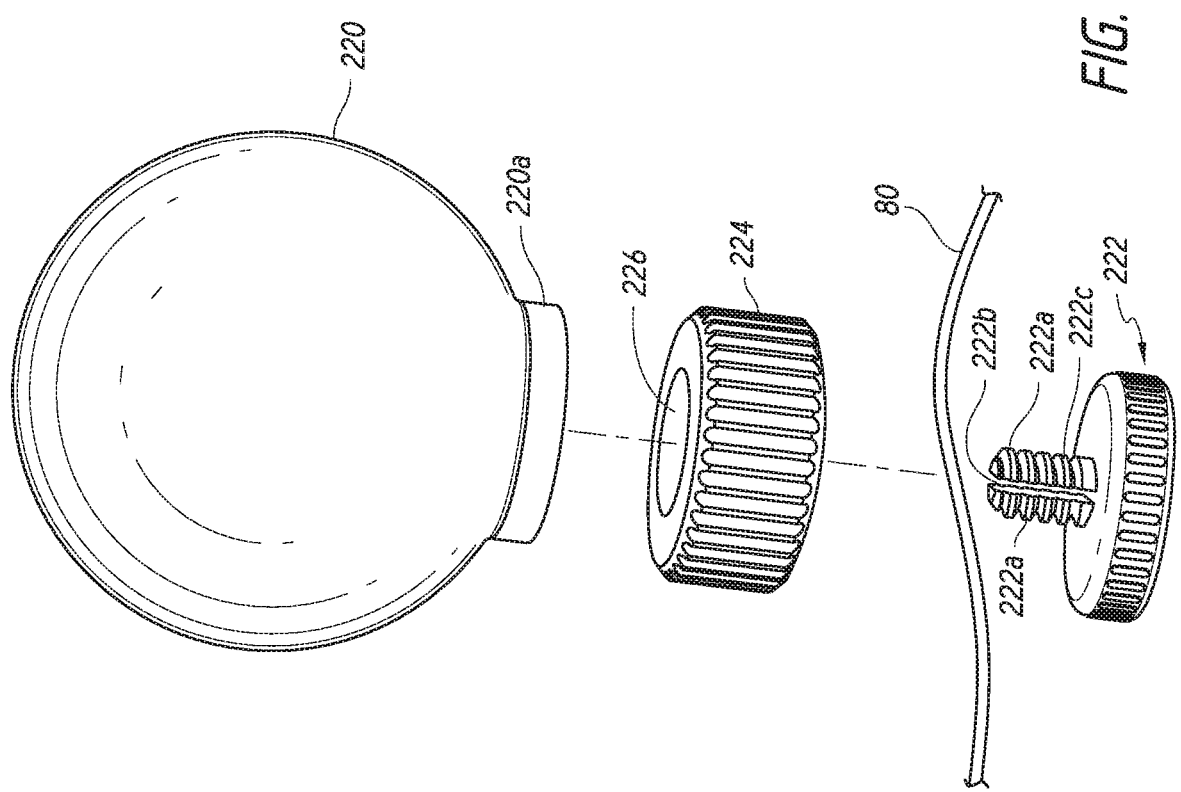

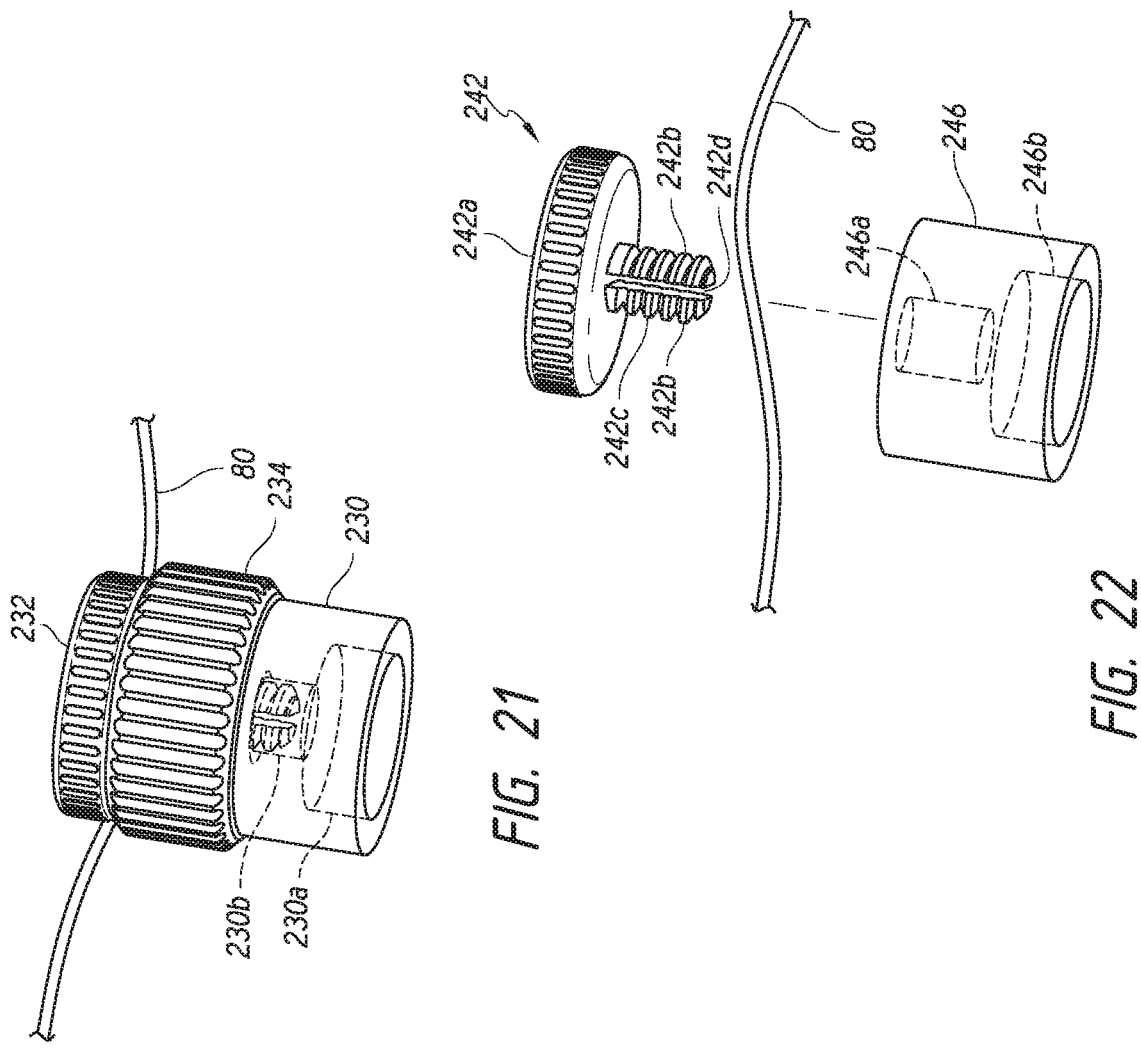
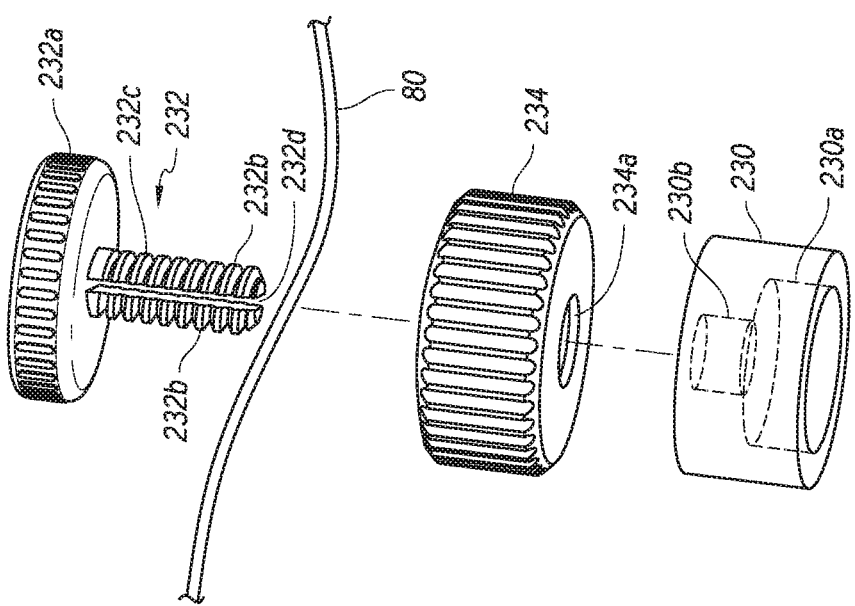

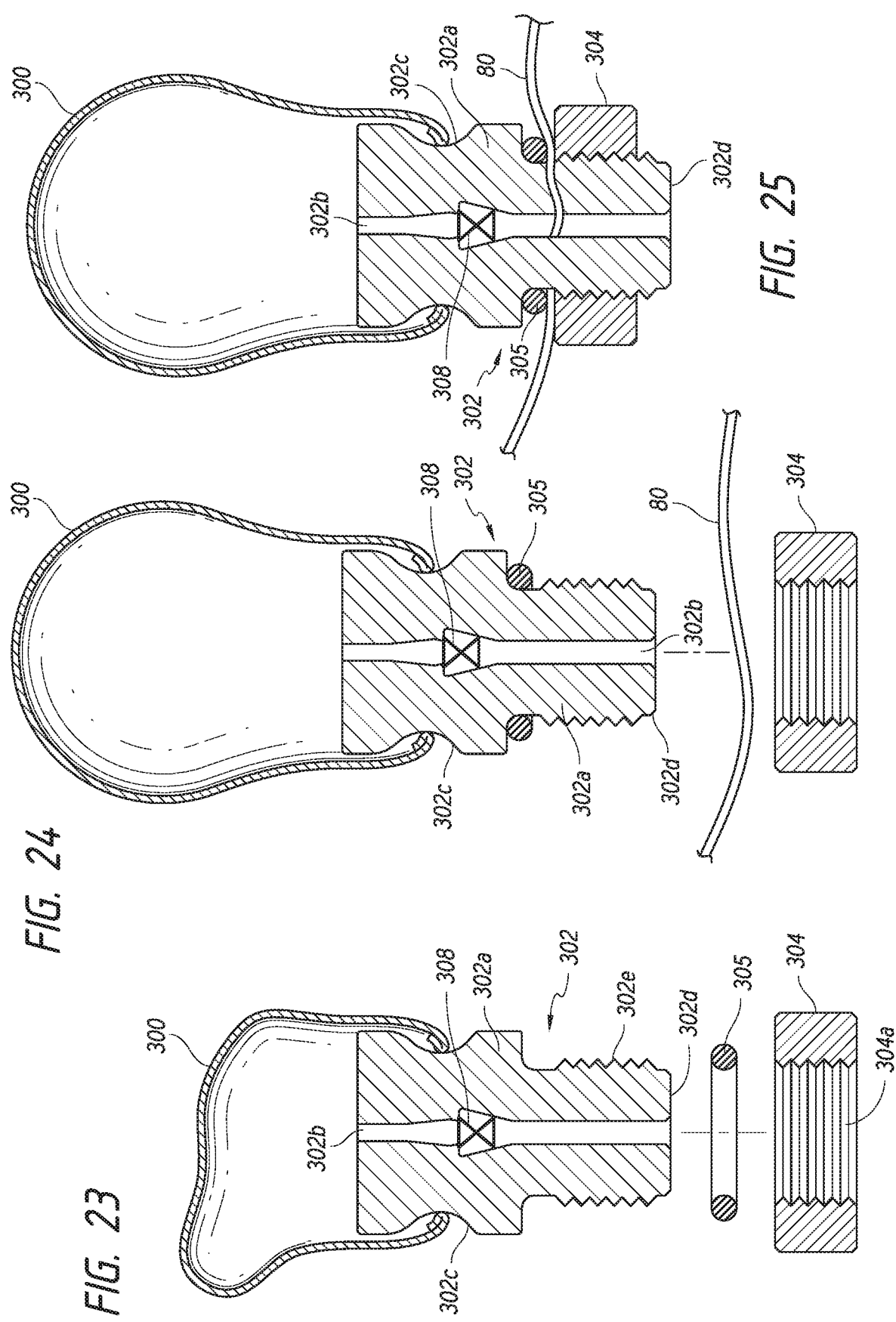

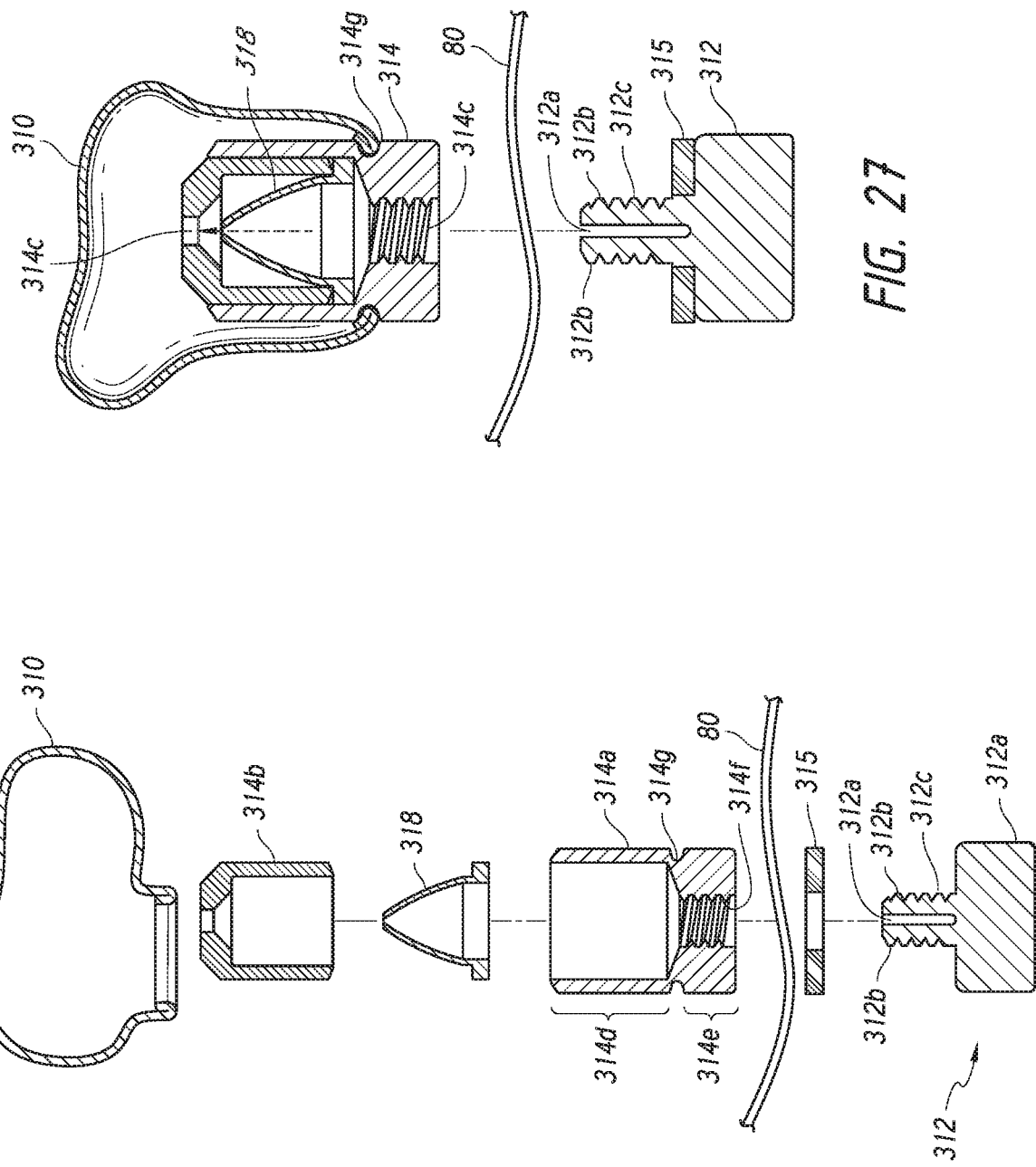

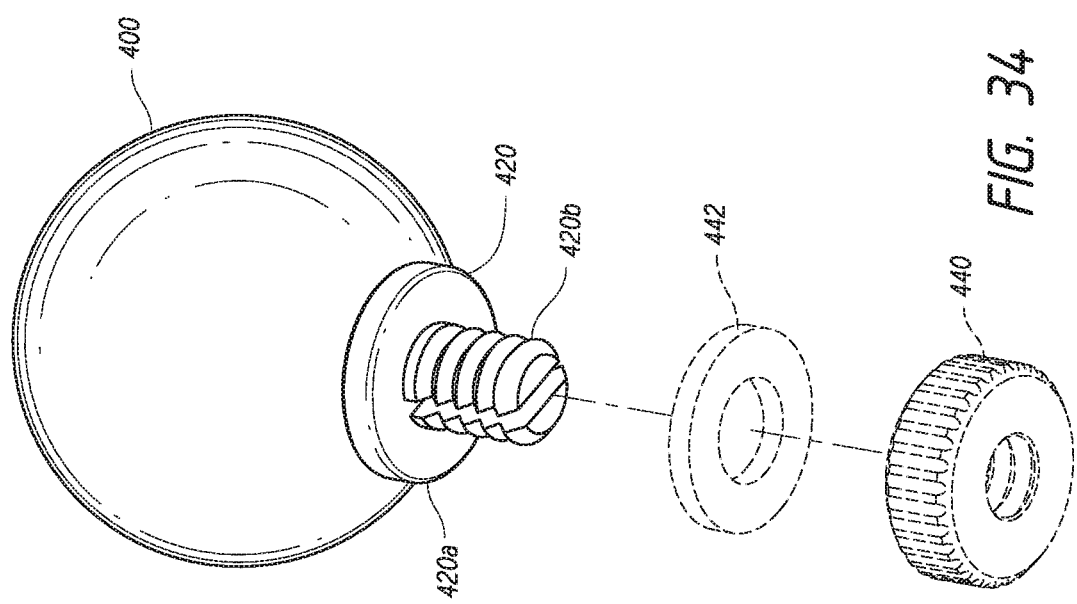

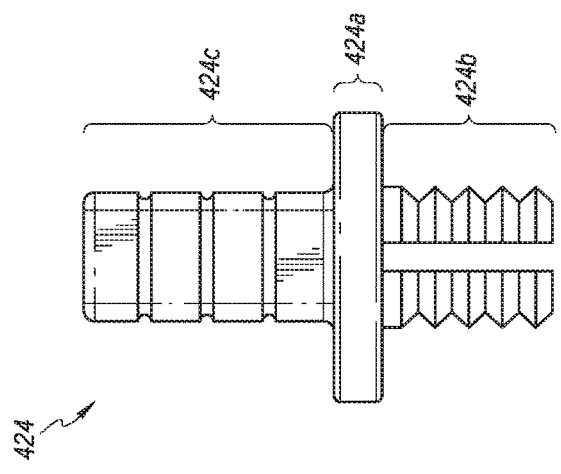
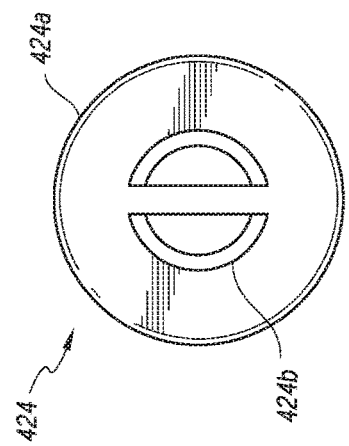
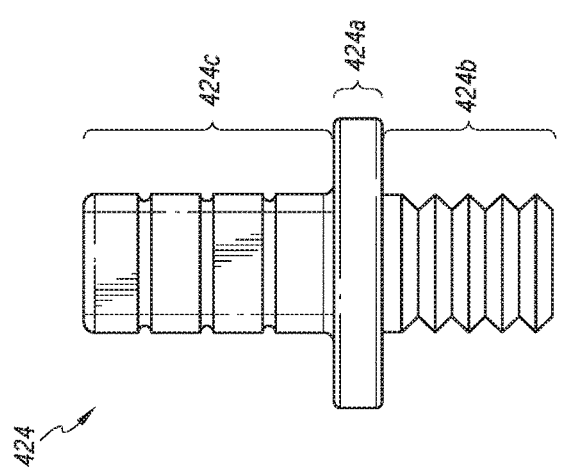
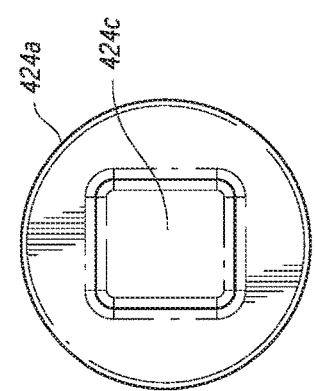
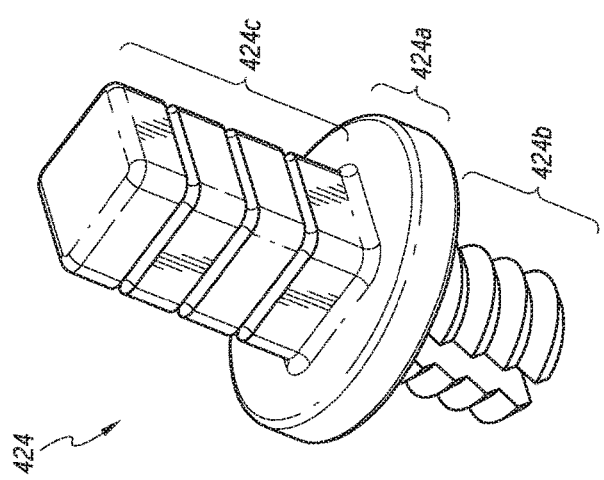

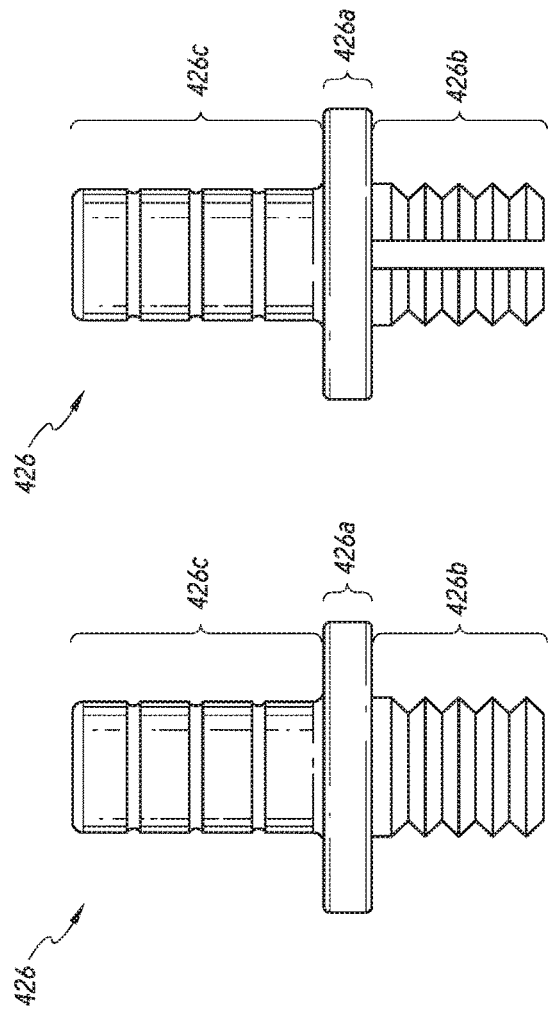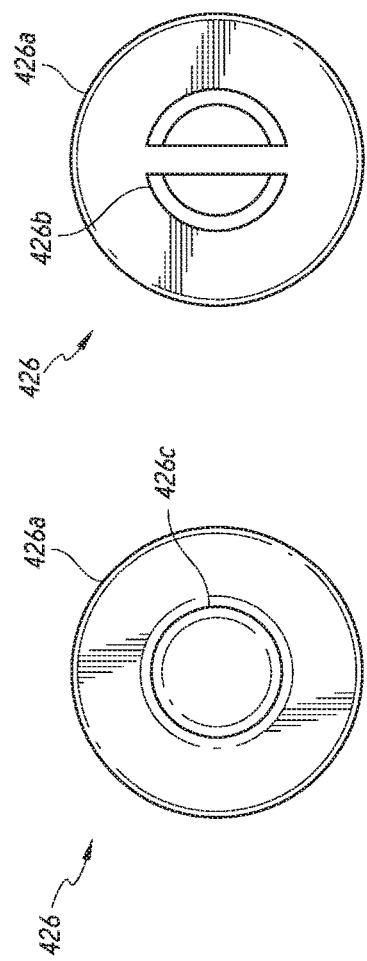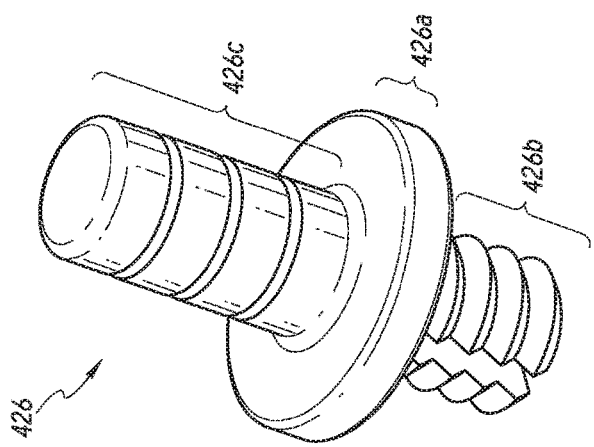

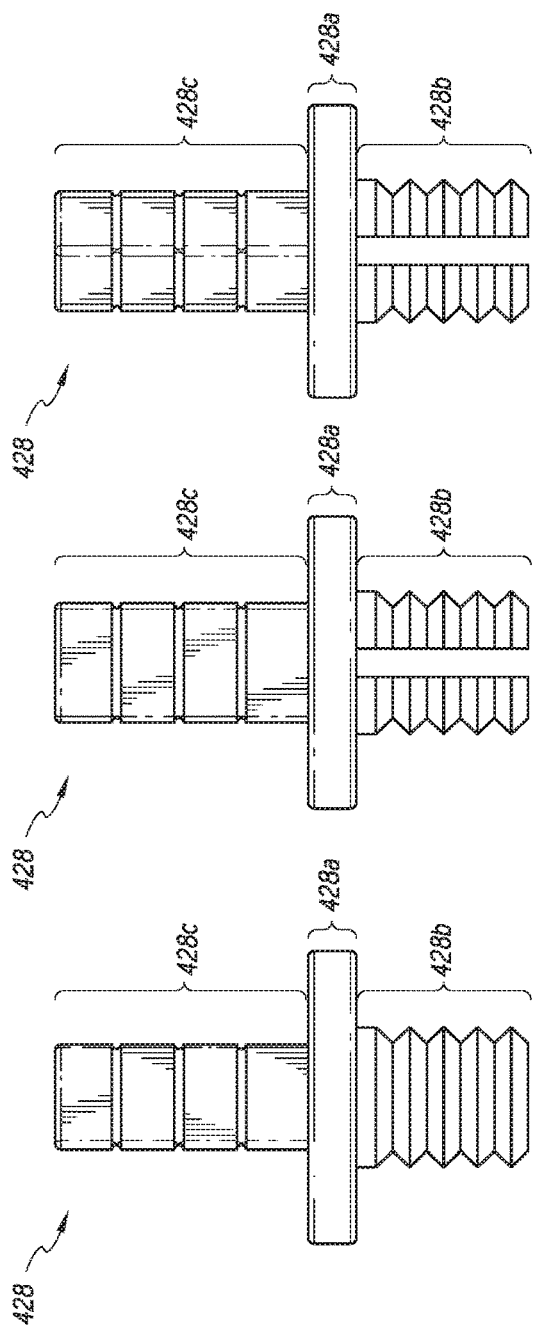
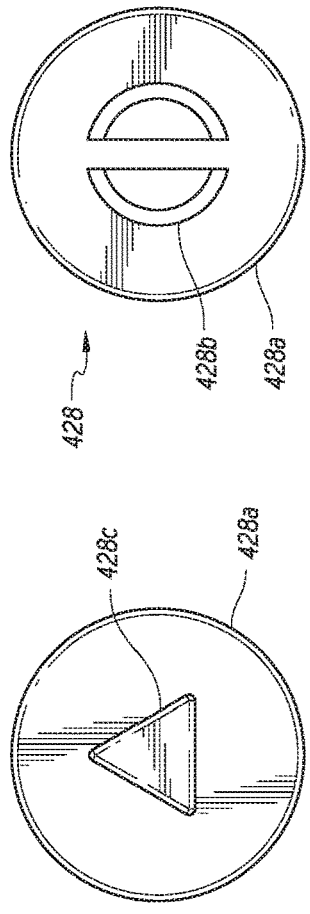
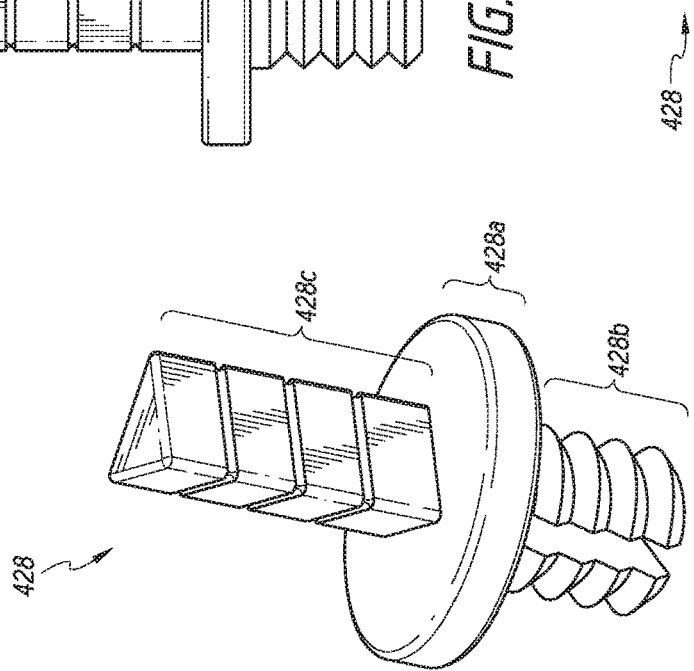

FISHING LINE ACCESSORY SYSTEMS, METHODS, AND APPARATUSES

The present application is a continuation application claiming the benefit of U.S. patent application Ser. No. 14/606,961 (filed Jan. 27, 2015). U.S. patent application Ser. No. 14/606,961 is a continuation-in-part application claiming the benefit of U.S. patent application Ser. No. 13/152,106 (filed Jun. 2, 2011), which issued as U.S. Pat. No. 8,950,107. U.S. patent application Ser. No. 13/152,106 is an application claiming the benefit of U.S. Provisional Patent Application No. 61/351,149 (filed Jun. 3, 2010), U.S. Provisional Patent Application No. 61/363,131 (filed Jul. 9, 2010), and U.S. Provisional Patent Application No. 61/387,125 (filed Sep. 28, 2010). The present application is based on and claims priority from these applications, the disclosures of which are hereby expressly incorporated herein by reference in their entirety.

BACKGROUND OF INVENTION

Described herein are fishing line accessory systems, methods, and apparatuses. More specifically, described herein are systems, methods, and apparatuses for securing strike indicators, bobbers, floats, weights, and other accessories to a fishing line.

Have you ever seen a fisherman's tackle box? There is a reason those specially designed boxes have so many compartments. Fishermen everywhere love to use, collect, buy, try, experiment with, and otherwise enjoy all sorts of accessories. In addition to the bait and hook at the end of the fishing line, there is a plethora of other accessories that fishermen interconnect (e.g. secure) to the fishing line at a point intermediately between the end of the fishing pole and the end of the fishing line. Examples of these accessories include, but are not limited to, strike indicators, bobbers, floats, and weights.

Currently, accessories suffer from one or more of the following deficiencies:
 Some known accessories do not strongly (which includes securely) connect to fishing line.
 If the accessories are strongly connected, they are not easily removed.
 Accessories tend to damage the fishing line by bending or kinking it when they are secured to the fishing line.
 Accessories easily fall off of the fishing line if they are not strongly connected.
 Accessories are not easily repositioned on the line once connected.
 The fishing line must pass through the body of the accessory, affecting performance of the accessory.

In fly fishing, the kinking of the leader (the fishing line between the end of the fishing pole and the end of the fishing line—in fly fishing the leader is a thinner material that connects the main fly line to where the final/terminal tackle and bait is connected) by these accessories precludes their use in dry fly fishing and requires replacement of the leader to do so.

U.S. Pat. No. 1,850,748 to Foster, U.S. Pat. No. 2,379,676 to Blackstone, U.S. Pat. No. 3,949,513 to Dmytriw, and U.S. Pat. No. 7,832,139 to Christensen all disclose various types of systems, methods, and/or apparatuses for connecting floats to a fishing line. These patents are herein incorporated by reference.

U.S. Pat. No. 3,949,513 to Dmytriw discloses a fishing float that includes a buoyant float body and a fishing line attachment member adapted to be removably coupled to the buoyant float body. The buoyant float body has an internal annular groove designed to receive an external annular rib of the attachment member. The attachment member has a slit that is dimensioned to receive and frictionally retain a fishing line. The attachment member is force-fit into a neck opening of the buoyant float body (and thereby compresses the slit so that it further grips the fishing line) until the rib snaps into the groove. The fishing line is trapped between the buoyant float body and the attachment member when they are coupled together. The attachment member is removed from the neck opening of the buoyant float body by twisting the attachment member and pulling it axially outwards.

U.S. Pat. No. 3,949,513 to Dmytriw also discloses an alternative fishing float that includes a buoyant float body and a fishing line attachment member adapted to be removably coupled to the buoyant float body. The buoyant float body has a flange that is formed around the outer end of the neck. The attachment member is in the form of a plastic snap-on cap with two slits on its outer peripheral wall. The slits frictionally engage a fishing line. Further, the slits are arranged so that the line is at an angled path to reduce the likelihood of the line being pulled through the cap. The fishing line is trapped between the buoyant float body and the attachment member when they are coupled together.

U.S. Pat. No. 5,233,781 to Bigelow and U.S. Pat. No. 5,651,210 to Moore both disclose floats that include a balloon and a valve. The systems disclosed by these references are complicated and expensive to produce. These patents, however, are herein incorporated by reference.

The fishing industry has long used accessories (e.g. bobbers, lures, and sinkers) that glow or are otherwise illuminated. The following references show examples of illuminated fishing accessories: U.S. Pat. No. 2,201,588 to Kuhns discloses a lighted bobber for fishing lines. U.S. Pat. No. 2,490,669 to Burke discloses an illuminated bobber. U.S. Pat. No. 2,826,850 to Laudan discloses a fishing bobber impregnated with a fluorescent dye. U.S. Pat. No. 4,291,484 to Young discloses an illuminated fishing float. U.S. Pat. No. 4,638,584 to Lindsay discloses luminescent fishing lures. U.S. Pat. No. 4,693,030 to Wohead discloses a luminescent floating sinker. U.S. Pat. No. 5,199,205 to Klammer discloses an illuminated bobber. U.S. Pat. No. 5,490,344 to Bussiere discloses glow in the dark material for fishing accessories. U.S. Pat. No. 5,359,804 to Burns discloses a fishing bobber that may have a cavity for receiving a glowing phosphorescence, fluorescent, or light stick matter. U.S. Pat. No. 6,318,016 to Ellig discloses a luminous fishing lure. U.S. Pat. No. 7,100,323 to Bogess discloses a light stick holding device for a fishing float. U.S. Pat. No. 7,225,580 to Chou discloses a fishing bobber having a lighting device. The systems disclosed by these references are complicated and expensive to produce. These patents, however, are herein incorporated by reference.

BRIEF SUMMARY OF THE INVENTION

Described herein is a fishing line accessory system for securing fishing accessories to a fishing line, the system including a primary coupling component, a secondary coupling component coupleable with the primary coupling component, and at least one fishing accessory. One of the coupling components has a first magnet, at least one fishing accessory includes a second magnet, and the second magnet is attachable to and detachable from the first magnet. The fishing line is secured between the primary coupling component and the secondary coupling component. The at least one fishing accessory is magnetically attachable to the coupled coupling components.

The at least one fishing accessory may be the second magnet, the second magnet attractable to the first magnet. The system may further include at least one additional magnet that is attractable to the first or second magnet.

The at least one fishing accessory including a second magnet may be a float with an affixed magnet.

Preferred fishing line accessory systems for securing fishing accessories to a fishing line described herein include a primary threaded coupling component and a secondary threaded coupling component. Preferably, at least one of the threaded coupling components has a gap defined therein. Preferably, at least one of the threaded coupling components has at least one fishing accessory connected or connectable thereto. The secondary threaded coupling component is rotatably matable with the primary threaded coupling component such that the gap is obstructed when the threaded coupling components are in a mating relationship. A fishing line that is captured by the threaded coupling components in an adjustably secure relationship can be adjusted without completely disengaging the threaded coupling components.

In preferred fishing line accessory systems, the primary threaded coupling component may be a "male" coupling component having the gap defined therein and an exterior threaded surface, and the secondary threaded coupling component being a "female" coupling component having an interior threaded surface. In some preferred fishing line accessory systems the at least one fishing accessory is connectable or connected to the "male" coupling component. In other preferred fishing line accessory systems the at least one fishing accessory is connectable or connected to the "female" coupling component.

In preferred fishing line accessory systems, at least one of the threaded coupling components has at least one fishing accessory affixed, attached or attachable, or secured or securable thereto.

In preferred fishing line accessory systems, the at least one threaded coupling component having a gap defined therein may include a base and a shaft. The shaft may be connected at one end to the base and forked to have two tines separated by the gap.

In preferred fishing line accessory systems, one of the threaded coupling components has an at least partially threaded exterior surface and one of the threaded coupling components has an at least partially threaded interior surface.

In some preferred fishing line accessory systems, one of the threaded coupling components has an interior plunger chamber and an exterior chamber with at least a partially threaded interior surface. The other threaded coupling component has a shaft divided into a narrow plunger and a wider shaft portion with an at least partially threaded exterior surface and a gap defined therein. A spring and the narrow plunger are preferably positioned within the interior plunger chamber. The spring provides outward pressure to expose the gap. The threaded interior surface and the threaded exterior surface are rotatably matable such that when they are mated the gap is obstructed and the outward pressure from the spring is overcome (in other words, the spring does not force the narrow plunger substantially out of the interior plunger chamber).

In some preferred fishing line accessory systems, one of the threaded coupling components having an attachable or attractable device (e.g. a magnet) embedded therein, the at least one fishing accessory is connected or connectable to an attachable or attractable device (e.g. a magnet), and the attachable or attractable devices are attractable to each other.

In some preferred fishing line accessory systems, one of the threaded coupling components having an air path defined therein and a valve positioned within the air path, the at least one fishing accessory being an inflatable fishing accessory, air being introducible to the inflatable fishing accessory via the valve and air path.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

BRIEF DESCRIPTION OF THE SEVERAL VIEWS OF THE DRAWINGS

The accompanying drawings illustrate various exemplary fishing line accessory systems and/or provide teachings by which the various exemplary fishing line accessory methods are more readily understood.

FIG. 3 is an exploded side elevational view of a preferred exemplary second fishing line accessory system including a fishing accessory having an affixed "male" forked coupling component and a "female" nut coupling component.

FIG. 4 is a side elevational view of the preferred exemplary second fishing line accessory system secured to a fishing line, the nut coupling component rotationally fit onto the forked coupling component.

FIG. 6 is an exploded side elevational view of a preferred exemplary fourth fishing line accessory system including a fishing accessory having an affixed "female" slotted-path coupling component and a "male" notched coupling component with outwardly extending pegs.

FIG. 7 is a side elevational view of the preferred exemplary fourth fishing line accessory system secured to a fishing line, the notched coupling component fit into the slotted-path coupling component, and the outwardly extending pegs following the slotted-path.

FIG. 19 is an exploded side perspective view of a preferred exemplary tenth fishing line accessory system including a "male" forked coupling component and a "female" nut coupling component, one of the coupling components having an embedded magnet, an attachable fishing accessory (shown as a float with an affixed magnet) being ready to attach to the embedded magnet.

FIG. 20 is an exploded side perspective view of a preferred exemplary eleventh fishing line accessory system including a "male" forked coupling component and a "female" nut coupling component, an attachable fishing accessory (shown as a weight with a transparent "female" notched coupling component) being ready to attach to the end of the threaded shaft (of the "male" forked coupling component) extending beyond the nut coupling component.

FIG. 21 is a side perspective view of the preferred exemplary eleventh fishing line accessory system secured to a fishing line, the nut coupling component rotationally fit onto the forked coupling component, and the attachable fishing accessories being attached to the end of the threaded shaft extending beyond the nut coupling component.

FIG. 22 is an exploded side perspective view of a preferred exemplary twelfth fishing line accessory system including a "male" forked coupling component having a shaft with an at least partially threaded exterior surface and a combined "female" nut coupling component and fishing accessory (including a weight).

FIG. 23 is a cross-sectional exploded side view of a preferred exemplary thirteenth fishing line accessory system including a "male" forked coupling component and a "female" nut coupling component, the "male" forked coupling component having an internal valve, an attachable fishing accessory (shown as a deflated balloon) being attached to the fishing accessory attachment structure of the forked coupling component.

FIG. 24 is a side cross-sectional view of the preferred exemplary thirteenth fishing line accessory system with the fishing line accessory in an at least partially inflated state.

FIG. 25 is a side cross-sectional view of the preferred exemplary thirteenth fishing line accessory system with the fishing line accessory in its at least partially inflated state secured to a fishing line, the nut coupling component rotationally fit onto the forked coupling component.

FIG. 26 is a cross-sectional exploded side view of a preferred exemplary fourteenth fishing line accessory system including a "male" forked coupling component and a "female" nut coupling component, an attachable fishing accessory (shown as a deflated balloon) attachable to the fishing accessory attachment structure of the "female" nut coupling component.

FIG. 27 is a cross-sectional exploded side view of the preferred exemplary fourteenth fishing line accessory system in which the attachable fishing accessory has been attached to the fishing accessory attachment structure.

FIG. 34 is a perspective exploded view of the seventeenth fishing line accessory system of FIG. 32 with the knurled nut and rubber washer shown in phantom.

FIG. 49 is a perspective view of a square post that may be used with a "square version" of an air-lock bobber of the preferred exemplary seventeenth and eighteenth fishing line accessory systems.

FIG. 50 is a front view of the square post of FIG. 49, the back view being a mirror image of the front view.

FIG. 51 is a first side view of the square post of FIG. 49, the second side view being a mirror image of the first side view.

FIG. 52 is a top view of the square post of FIG. 49.

FIG. 53 is a bottom view of the square post of FIG. 49.

FIG. 56 is a perspective view of a circular post that may be used with a "circular version" of an air-lock bobber of the preferred exemplary seventeenth and eighteenth fishing line accessory systems.

FIG. 57 is a front view of the circular post of FIG. 56, the back view being a mirror image of the front view.

FIG. 58 is a first side view of the circular post of FIG. 56, the second side view being a mirror image of the first side view.

FIG. 59 is a top view of the circular post of FIG. 56.

FIG. 60 is a bottom view of the circular post of FIG. 56.

FIG. 63 is a perspective view of a triangular post that may be used with a "triangular version" of an air-lock bobber of the preferred exemplary seventeenth and eighteenth fishing line accessory systems.

FIG. 64 is a first side view of the triangular post of FIG. 63.

FIG. 65 is a second side view of the triangular post of FIG. 63.

FIG. 66 is a third side view of the triangular post of FIG. 63.

FIG. 67 is a top view of the triangular post of FIG. 63 FIG. 68 is a bottom view of the triangular post of FIG. 63.

Figure 2:
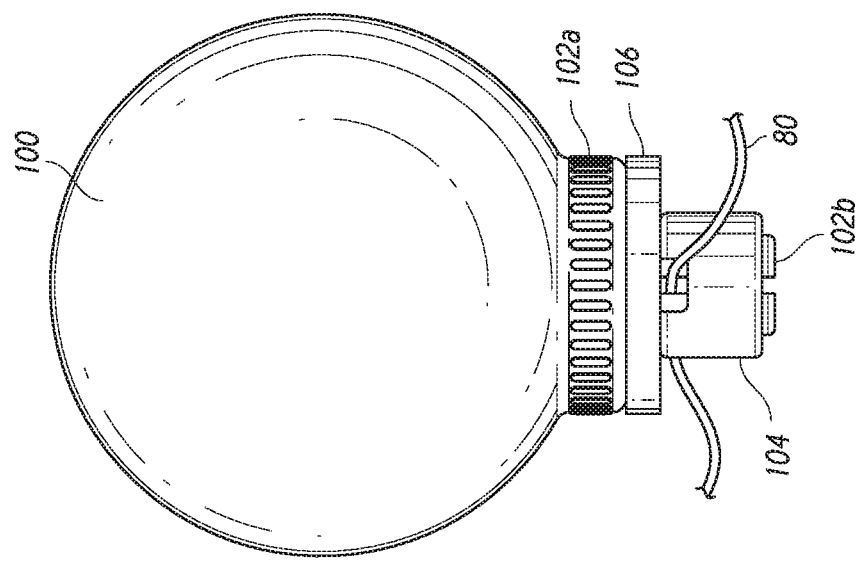
FIG. 2 is a side elevational view of the preferred exemplary first fishing line accessory system secured to a fishing line, the cap coupling component snap-fit onto the forked coupling component.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein are fishing line accessory systems, methods, and apparatuses. More specifically, described herein are systems, methods, and apparatuses for securing fishing accessories such as strike indicators, bobbers, floats, and weights to a fishing line. Preferred embodiments facilitate easy adjustment and/or removal of these accessories without kinking the fishing line. This is especially important in fly fishing as it affords the user the ability to change from "nymph" fishing to "dry" fishing without changing leaders as there is no kinking of the leader. The fishing line accessory systems described herein may be used, for example, in fly fishing and gear fishing. Larger floats or weights used in commercial fishing could also be secured in a like manner.

The fishing line accessory systems (described in detail herein) are secured to the fishing line 80. In the case of a strike indicator, bobber, or float, the fishing line accessory system is secured to the fishing line 80 in such a way as to afford the hook, lure, or fly the proper depth below the surface of the water. The fishing line 80 is then cast out into the water, and the fly, lure, or hook with bait is suspended therein at the desired depth.

The fishing line accessory systems described herein solve problems with known devices that connect to fishing lines. These problems include, but are not limited to: (1) poor fixation to the fishing line (in which case they tend to "slip"); (2) difficult or time consuming methods for repositioning the known devices; (3) difficult or time consuming methods for removing the known devices; and (4) kinking or damaging the fishing line. The fishing line accessory systems described herein facilitate securement of fishing accessories to fishing lines 80 or leaders, yet afford easy adjustment and removal with no discernable fishing line kinking.

Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The term "fishing" is meant to include many types of fishing including, but not limited to, fly fishing (using an artificial "fly" to catch fish—can be "nymph" fishing or "dry" fishing), drift fishing (in a boat that is not anchored but is drifting with the wind and current), trolling, and gear fishing.

The phrase "fishing accessory" and the term "accessory," as used herein, are defined as any type of fishing device that can be secured to a fishing line. In most cases, the accessory will be secured to the fishing line at a point intermediately between the end of the fishing pole and the end of the fishing line. Examples of these accessories include, but are not limited to, strike indicators, bobbers, floats, spoons, spinners, soft baits, yarns, beads, bobber stops, surgical tubing, and weights. Hooks, lures, planers, divers, flies, and/or bait may also be considered accessories. The phrase "accessory body" may be used to describe the main portion of the accessory. Depending on its use, a body may have different properties. A body for a float or bobber may have, for example, a spherical, oblong, teardrop, football, or irregular shape. Floating accessories (e.g. floats or bobber bodies) may be made of any floating material including, but not limited to, a rubber or latex (e.g. a balloon), plastic (e.g. a hollow plastic shape), polystyrene (e.g. STYROFOAM®), cork, foam, yarn, neoprene, silicone, or any other floating material. On the other hand, the body for a weight may be or may include any heavy material including, but not limited to, magnets, metal (e.g. lead), sand, or any material that would sink in water. In addition to shown weights that have a housing (that may be a plastic housing) with an embedded weight (e.g. FIGS. 20-22), alternative weights could be made completely of a heavy material or could be a pouch or closed tube that can be filled with heavy material.

The phrase "coupling component," as used herein, is defined as a generic "part" (component) that, when paired with a mating coupling component, can be used to secure fishing line therebetween. Many of the systems described herein have coupling components that are rotatably matable (e.g. they screw together). The fishing line accessory systems described herein each have coupling components that have been designated as "male" coupling components and "female" coupling components. The phrases "primary" coupling component and "secondary" coupling component, as used in the claims, designate two complementary coupling components that may be "male" and "female," that may be "female and "male," or that may be two "gender neutral" coupling components. In some embodiments, the coupling component may be a "stem" attached to an accessory body.

Figure 13:
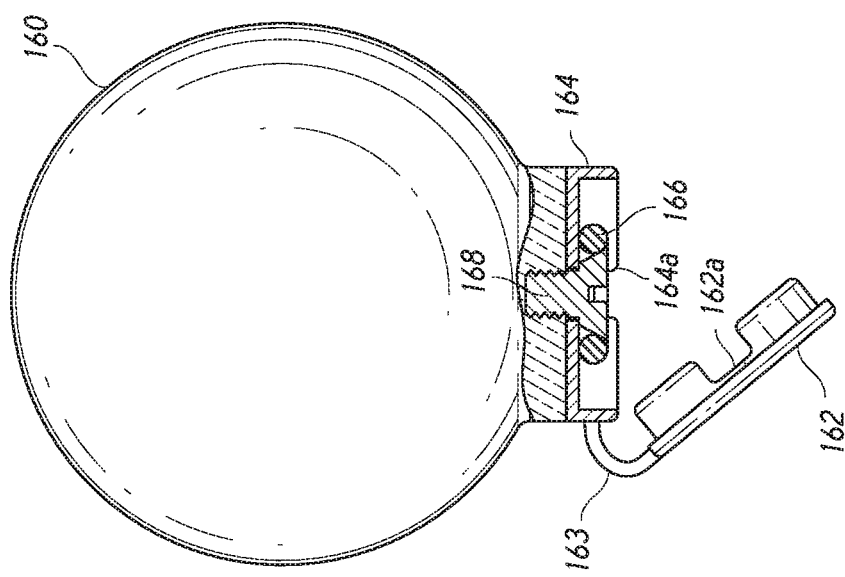
FIG. 13 is a side elevational view with a cutaway showing a cross-section of a preferred exemplary seventh fishing line accessory system including a fishing accessory having an affixed "female" frame coupling component and a tethered "male" cap coupling component, the seventh fishing line accessory system being shown in an open position.

Three terms are used to describe various strengths of connections and/or interconnections. The term "attach" is defined as relatively removable or light connections (as compared to the "secure" and "affixed" connections described below). For example, although extremely strong magnets are used herein, the magnetic connection would be described as "attached." Another example is that a balloon can be described as being "attached" to the fishing accessory attachment structure. The term "secure" is defined as a removable interconnection that is stronger than one that is "attached." The term "secure" is used to describe how fishing line accessory systems are connected with the fishing line or how coupling components of the fishing line accessory systems are interconnected. Some "secure" connections are "adjustably secure" in that the connection to the fishing line is secure, but the fishing line accessory system can be repositioned on the fishing line. It should be noted that there may be some overlap between connections that are "attached" and connections that are "secure." The term "affix" is defined as a more permanent connection including an integral or embedded connection. Components that are "affixed" are not designed to be separated and if separated would be considered "broken" and/or in need of fixing (e.g. by gluing components together). In some of the shown fishing line accessory systems, components are affixed by being adhered together. FIG. 13 shows a frame coupling component that is affixed to a fishing accessory using a screw that is not intended to be removed. The term "connect" is used as a generic of the terms "attach," "secure," and "affix."

Figure 5:
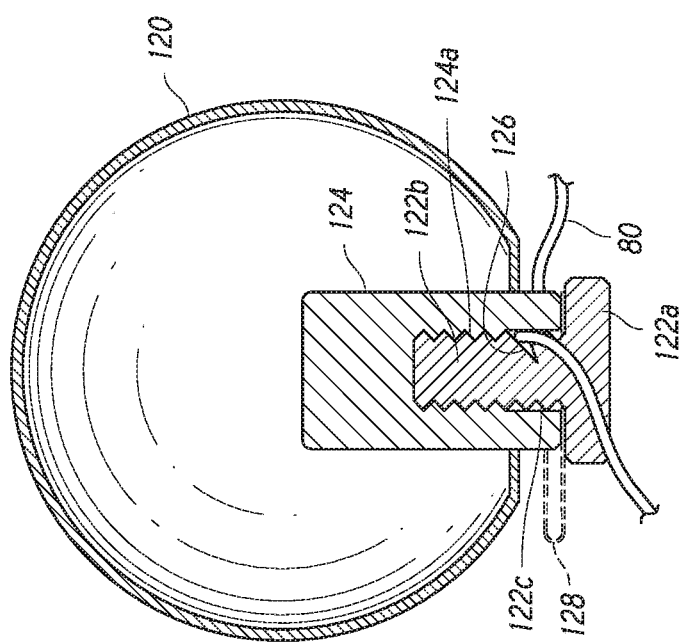
FIG. 5 is a cross-sectional side view of a preferred exemplary third fishing line accessory system secured to a fishing line, the third fishing line accessory system including a fishing accessory having an affixed "female" nut coupling component and a "male" notched coupling component, the notch engaging the fishing line and the notched coupling component rotationally fit into the nut coupling component.
Figure 9:
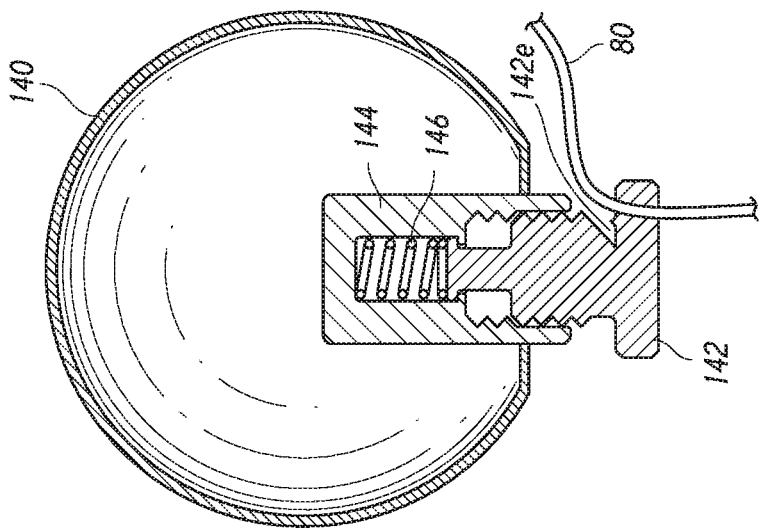
FIG. 9 is a cross-sectional side view of the preferred exemplary fifth fishing line accessory system in a fishing line insertion position in which a spring in the plunger chamber of the nut coupling component has pushed the plunger of the notched coupling component outward to expose the notch for easy insertion of the fishing line.

The term "forked" is defined as two elements having a gap therebetween (divided). The term "notched" is defined as an element having a gap therein. Additional terms that could be used to describe a gap include, but are not limited to, "slit" and "slot." The gap in both forked and notched fishing line accessory systems is designed to accommodate the fishing line 80. The "male" forked coupling components include two "tines" separated by a gap. It should be noted that in fishing line accessory systems having forked components, the gap can be "lengthwise" along a longitudinal axis or parallel to the longitudinal axis. Examples of this type of forked components are shown in FIGS. 1, 3, 15, 17, 19, 20, and 22-31. The gap in notched fishing line accessory systems is shown as "angled" or "slanted" in relation to a longitudinal axis. Examples of this type of gap are shown in FIGS. 5, 6, and 9. Unless specifically limited to one type of gap, the shown gap in a particular fishing line accessory system is meant to be exemplary and not limiting. It should also be noted that more than one gap may be used.

Each of the fishing line accessory systems described herein include at least one apparatus (e.g. the fishing accessory combined with the coupling components) and at least one method (e.g. the process of connecting the apparatus to the fishing line 80). The term "system" is used generically to describe the apparatus and/or the method for using the apparatus.

Unless specifically stated otherwise, chronological terms such as "first," "second," and "third" are meant solely for purposes of designation and not for order or limitation. For example, the "first fishing line accessory system" has no order relationship with the "second fishing line accessory system."

It should be noted that relative terms (e.g. "upper" and "lower") are meant to help in the understanding of the technology and are not meant to limit the scope of the invention. Similarly, the term "front" is meant to be relative to the term "back" and the term "top" is meant to be relative to the term "bottom." If a system is rotated (its positions are changed), the terms would change accordingly.

It should be noted that the terms "may," "might," "can," and "could" are used to indicate alternatives and optional features and only should be construed as a limitation if specifically included in the claims. For example, the phrase "the fishing line accessory system may have an O-ring" indicates that the O-ring is optional. It should be noted that the various components, features, steps, or embodiments thereof are all "preferred" whether or not it is specifically indicated. Claims not including a specific limitation should not be construed to include that limitation.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes," "has," and "comprises" mean "contains" (e.g. a device that includes, has, or comprises A and B, contains A and B, but optionally may contain C or additional components other than A and B). It should be noted that, unless otherwise specified, the singular forms "a," "an," and "the" refer to one or more than one, unless the context clearly dictates otherwise.

Exemplary Preferred Fishing Line Accessory Systems

Figure 1:
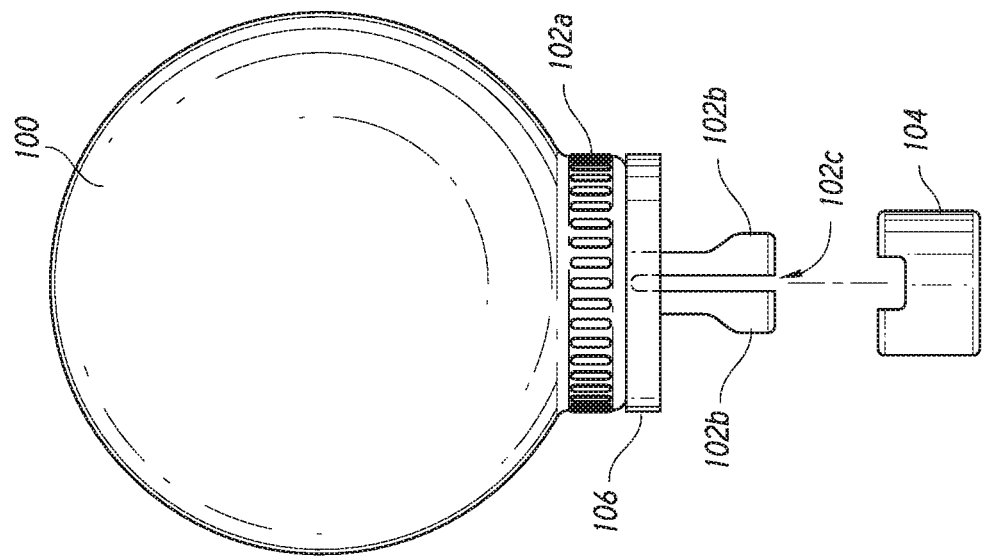
FIG. 1 is an exploded side elevational view of a preferred exemplary first fishing line accessory system including a fishing accessory having an affixed "male" forked coupling component and a "female" cap coupling component.

FIGS. 1-66 show various exemplary preferred fishing line accessory systems. Not all of the preferred fishing line accessory systems are specifically represented in a figure. The following general variations (which are not necessarily applicable to all the fishing line accessory systems) provide additional preferred fishing line accessory systems.

As a first general matter, several of the fishing line accessory systems described herein have a pair of threaded coupling components that are rotatably matable so that they may be connected in a rotational relationship (a type of mating relationship). This rotational relationship is an adjustably secure relationship in that the coupling components can be separated (and brought together). This allows a user to partially separate one coupling component (partially unscrew) from the other coupling component so that the fishing line can be inserted and/or adjusted without completely disengaging the coupling components from their mating relationship. In fishing line accessory systems such as those shown in FIGS. 3, 4, and 15-66, a slight separation (unscrewing) can allow enough room in the gap so that the fishing line can be pulled through the gap and, thereby, the position of the fishing line accessory system may be adjusted in relation to the fishing line.

As a second general matter, the specific fishing accessory shown in the figures is meant to be an example of a fishing accessory and does not limit the fishing line accessory system to that specifically shown fishing accessory. For example, a fishing accessory shown as a bobber could be replaced with a bobber of a different size, shape (e.g. spherical, oblong, teardrop, football, or irregular), or material (balloon, hollow spherical plastic, polystyrene, cork, foam, yarn, neoprene, silicone, or other floating material). Alternatively, the bobber could be replaced by a weight. Weights may be, for example, magnets, metal (e.g. lead), sand, or any material that would sink in water.

As a third general matter, the absence or presence of an O-ring (that may be used, for example, for sealing purposes, to limit sliding, or to protect the fishing line when the system is tightened) in the figures is not meant to be limiting as most of the embodiments could be modified to include or exclude the O-ring depending, for example, on the purpose of the fishing accessory and/or the materials from which the fishing accessory is constructed. The shown positions of the O-rings are also meant to be exemplary. For example, O-rings could be positioned around "male" coupling components and/or positioned within the "female" coupling components. The shown shapes of the O-rings are also meant to be exemplary. For example, the O-ring might be a flat disk (washer-shaped) with a central hole (with a rectangular cross-section) or it might be torus-shaped (with a circular cross-section as shown in FIG. 13).

As a fourth general matter, the coupling components may be tethered (or connected via a lanyard) together even if they are shown as discrete elements. This would prevent loss of one of the components during the attachment and detachment process. (It should be noted that the tether should allow proper rotation for systems in which the components are to be rotationally connected.) Similarly, embodiments shown as tethered together could be made in an embodiment with discrete elements.

FIGS. 1 and 2 show a first fishing line accessory system that includes a fishing accessory 100 having an affixed "male" forked coupling component 102 (shown as 102*a* and 102*b*) and a "female" cap coupling component 104. As shown, the "male" forked coupling component 102 has a base 102*a* and a shaft 102*b* that is forked to have two tines 102*b*, 102*b* separated by a gap 102*c* into which a fishing line 80 may be inserted. The base 102*a* is affixed to the fishing accessory 100. An optional O-ring 106 is shown at the base of the shaft 102*b* that helps both in the gripping of the fishing line 80 and sealing. As shown in FIG. 2, the cap coupling component 104 is snap-fit onto the forked coupling component 102 (after the fishing line 80 has been inserted into the gap 102*c*) to secure the first fishing line accessory system to the fishing line 80. In this mating relationship, the gap 102*c* is obstructed to prevent the fishing line 80 from "escaping" or slipping out (thereby capturing the fishing line). In one preferred first fishing line accessory system, the interior surface of the cap coupling component 104 is slightly smaller than the exterior surface of the shaft 102*b* and the tines of the shaft 102*b* are at least slightly resilient. When the cap coupling component 104 is on the shaft 102*b*, the tines of the shaft 102*b* are compressed slightly together to grip the fishing line 80 secured therebetween. One of the advantages of the "male" forked coupling component 102 being affixed to the fishing accessory 100 is that it is the more expensive component and would float if dropped, whereas the cap coupling component 104 is less expensive.

FIGS. 3 and 4 show a second fishing line accessory system including a fishing accessory 110 having an affixed "male" forked coupling component 112 (shown as 112*a* and 112*b*) and a "female" nut coupling component 114. As shown, the "male" forked coupling component 112 has a base 112*a* and a shaft 112*b* with an at least partially threaded exterior surface 112*c*. The base 112*a* is affixed to the fishing accessory 110. The shaft 112*b* is forked to have two tines 112*b*, 112*b* separated by a gap 112*d* into which a fishing line 80 may be inserted. An optional O-ring 116 is shown at the base of the shaft 112*b* that helps both in the gripping of the fishing line 80 and sealing. The nut coupling component 114 has an at least partially threaded interior surface 114*a*. As shown in FIG. 4, the nut coupling component 114 is rotationally fit (screwed) onto the forked coupling component 112 (after the fishing line 80 has been inserted into the gap 112*d*) to secure the second fishing line accessory system to a fishing line 80. In this mating relationship, the gap 112*d* is obstructed to prevent the fishing line 80 from "escaping" or slipping out (thereby capturing the fishing line). In one preferred second fishing line accessory system, the interior surfaces of the nut coupling component 114 is slightly smaller than the exterior surface of the shaft 112*b* and the tines of the shaft 112*b* are at least slightly resilient. When the nut coupling component 114 is on the shaft 112*b*, the tines of the shaft 112*b* are compressed slightly together to grip the fishing line 80 secured therebetween. This second fishing line accessory system has the advantage of the "male" forked coupling component 112 being affixed to the fishing accessory 110 as discussed above. One of the advantages of having a rotational relationship between two threaded coupling components 112, 114 is that the relationship (an adjustably secure relationship) between the two components can be separated (and brought together) partially and gradually. This allows a user to gradually back (unscrew) the "male" coupling component 112 out (unscrew) of the "female" coupling component 114 so that the fishing line 80 has room to be pulled through the gap and, thereby, the position of the fishing line accessory system may be adjusted in relation to the fishing line 80.

FIG. 5 shows a third fishing line accessory system secured to a fishing line 80. The third fishing line accessory system includes a fishing accessory 120 having an affixed "female" nut coupling component 124 and a "male" notched coupling component 122 (shown as 122*a* and 122*b*). The "male" notched coupling component 122 has a base 122*a* and a shaft 122*b* with an at least partially threaded exterior surface 122*c* and a notch 126. The "female" nut coupling component 124 has an at least partially threaded interior surface 124*a*. The notched coupling component 122 (with its notch 126 that is engaging the fishing line 80) is rotationally fit (screwed) into the nut coupling component 124. In this mating relationship, the notch 126 is obstructed to prevent the fishing line 80 from "escaping" or slipping out (thereby capturing the fishing line). The shown third fishing line accessory system includes an optional lanyard or tether 128 that is shown as spanning the distance between the nut coupling component 124 and the notched coupling component 122. The tether 128 has attachment mechanisms at both ends for mating with its respective components. For example, the tether 128 may have an aperture at one end through which the shaft 122*b* may be inserted. This third fishing line accessory system has the advantage of the rotational relationship (an adjustably secure relationship) between two threaded coupling components 122, 124, as discussed above, that allows the position of the fishing line accessory system to be adjusted in relation to the fishing line 80.

FIGS. 6 and 7 show a fourth fishing line accessory system including a fishing accessory 130 having an affixed "female" slotted-path coupling component (shown as a tube 134) and a "male" notched coupling component (shown as a tube or solid cylinder 132). The shown fishing accessory 130 is a substantially frustum-shaped cork, but alternative fishing accessories could be substituted. The annular surface of the "female" slotted-path coupling component 134 has at least one slotted-path 134*a* (e.g. one on each side of the coupling component 134) that is shown as having at least one change of direction (angle) and an enlarged section (a "stop"). The "male" notched coupling component 132 has a notch 132*a* defined therein and at least one outwardly extending peg 132*b* (e.g. one on each side of the coupling component 132) that extends radially from the peripheral surface of the coupling component 132. Two outwardly extending pegs 132*b* may be formed by a single pin inserted transversely through the notched coupling component 132 (tube). In use, the fishing line 80 is inserted into the notch 132*a* of the notched coupling component 132. Then the outwardly extending pegs 132*b* of the notched coupling component 132 are aligned with the respective openings of the slotted-paths 134*a* of the slotted-path coupling component 134. By pushing inward and turning the coupling components 132, 134 in relation to each other so that the outwardly extending pegs 132*b* follow their respective slotted-paths 134*a*, the fourth fishing line accessory system is secured to the fishing line 80 as shown in FIG. 7. In this mating relationship, the notch 132*a* is obstructed to prevent the fishing line 80 from "escaping" or slipping out (thereby capturing the fishing line).

Figure 10:
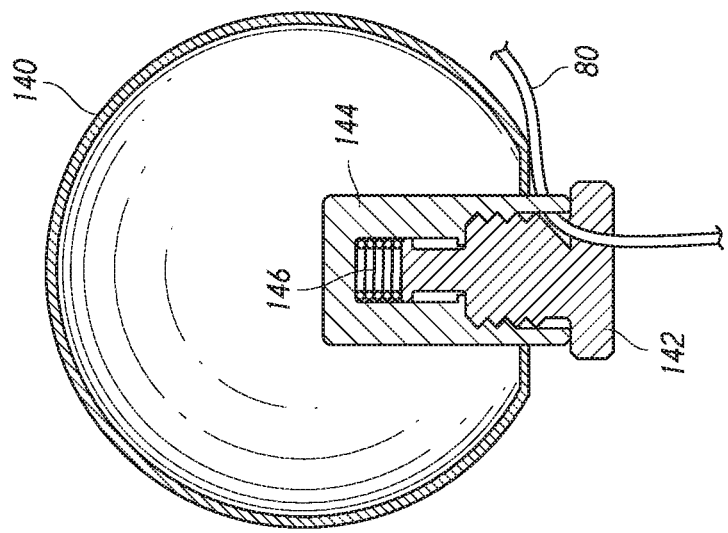
FIG. 10 is a cross-sectional side view of the preferred exemplary fifth fishing line accessory system in a fishing line securing position in which the spring in the plunger chamber of the nut coupling component is compressed, the notch is engaging the fishing line, and the shaft of the notched coupling component is rotationally fit into the nut coupling component.
Figure 8:
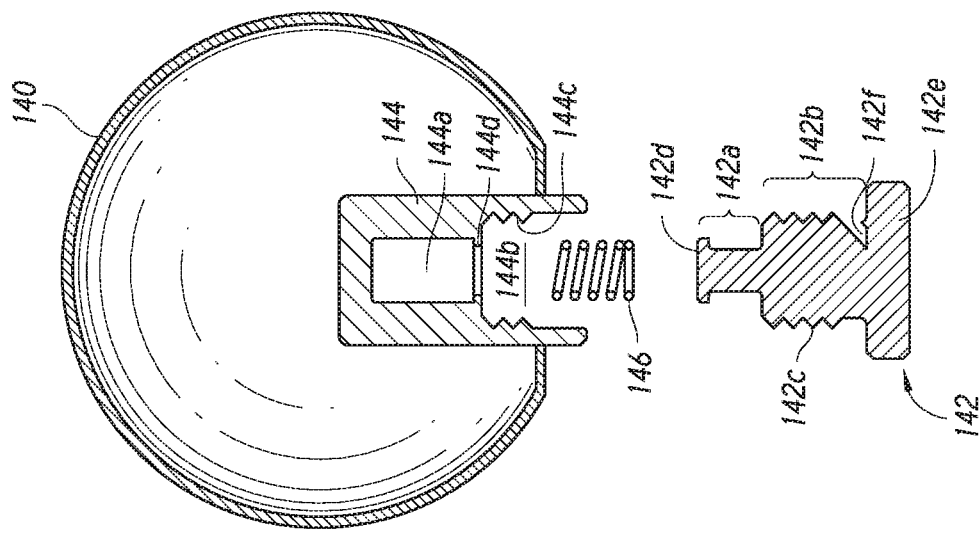
FIG. 8 is a cross-sectional exploded side view of a preferred exemplary fifth fishing line accessory system including a fishing accessory having an affixed "female" nut coupling component and a "male" notched coupling component.

A fifth fishing line accessory system, as shown in FIGS. 8, 9, and 10 has a unique plunger system that (1) provides assistance in transitioning from a fishing line insertion position (FIG. 9) to a fishing line securing position (FIG. 10)

and (2) retains a portion of the "male" notched coupling component 142 within the "female" nut coupling component 144 to prevent loss of the "male" notched coupling component 142 when in the fishing line insertion position. The nut coupling component 144 has an interior plunger chamber 144a and an exterior chamber 144b with at least a partially threaded interior surface 144c. Retaining structure 144d (shown as an annular lip) is positioned substantially between the interior plunger chamber 144a and the exterior chamber 144b. The notched coupling component 142 has a shaft divided into a narrow plunger 142a and a wider shaft portion 142b with an at least partially threaded exterior surface 142c. At or substantially near the end of the narrow plunger 142a is stop structure 142d (shown as a flat disk) that interacts with the retaining structure 144d to prevent the end of the narrow plunger 142a from escaping the interior plunger chamber 144a. The notched coupling component 142 also has a base 142e at the end of the shaft opposite the narrow plunger 142a. A notch 142f is cut in the shaft (e.g. the wider shaft portion 142b) near the base 142e. It should be noted that one alternative way to construct the fifth fishing line accessory system would be to use a two-piece nut coupling component that is divided along its longitudinal axis. FIG. 9 shows the fifth fishing line accessory system in the fishing line insertion position in which a spring 146 in the plunger chamber 144a of the nut coupling component has pushed (using outward pressure) the plunger 142a of the notched coupling component 142 outward to expose the notch 142f for easy insertion of the fishing line 80. FIG. 10 shows the fifth fishing line accessory system in the fishing line securing position in which the spring 146 in the plunger chamber 144a of the nut coupling component 144 is compressed, the notch 142f is engaging the fishing line 80, and the shaft of the notched coupling component 142 is rotationally fit (screwed) into the nut coupling component 144. The threaded interior surface and the threaded exterior surface are rotatably mated such that, when the surfaces are mated, the notch 142f is obstructed and the outward pressure from said spring 146 is overcome. In the fishing line securing position, the notch 142f is obstructed to prevent the fishing line 80 from "escaping" (thereby capturing the fishing line). In use, the fisherman would rotationally loosen (unscrew or back out) the notched coupling component 142 from the nut coupling component 144. When the threaded exterior surface 142c of the wider shaft portion 142b is beyond the threaded interior surface 144c of the exterior chamber 144b (unscrewed), the spring 146 pushes the plunger 142a out of the interior plunger chamber 144a, but the stop structure 142d interacting with the retaining structure 144d prevents the end of the narrow plunger 142a from escaping the interior plunger chamber 144a. The fisherman can then insert the fishing line 80 into the notch 142f. By twisting the base 142e, the fisherman rotationally fits (screws) the notched coupling component 142 into the nut coupling component 144 to secure the fifth fishing line accessory system to the fishing line 80.

Figure 12:
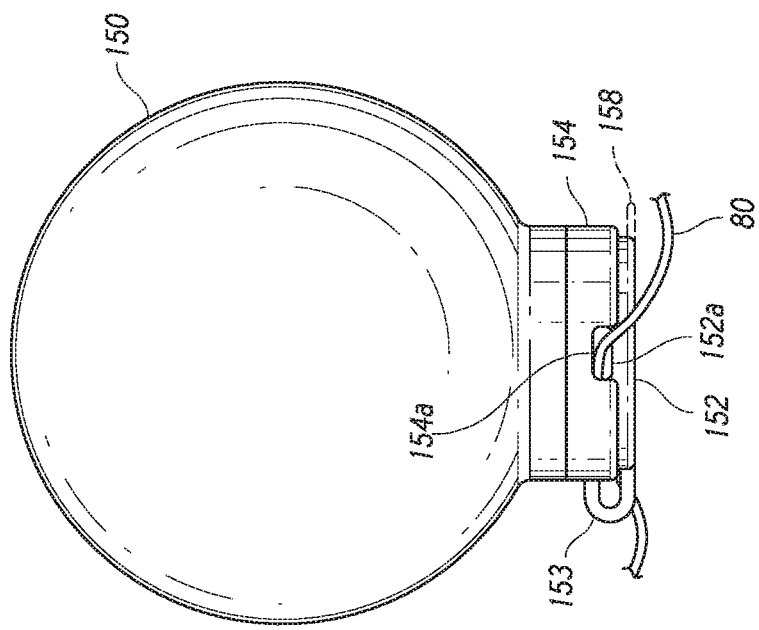
FIG. 12 is a side elevational view of the preferred exemplary sixth fishing line accessory system secured to a fishing line, the cap coupling component inserted into the frame coupling component.
Figure 11:
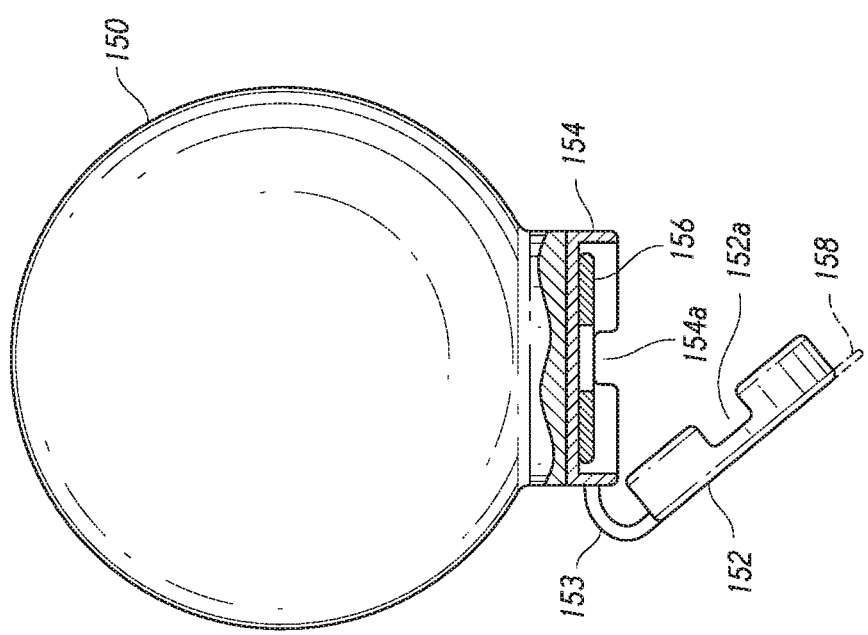
FIG. 11 is a side elevational view with a cutaway showing a cross-section of a preferred exemplary sixth fishing line accessory system including a fishing accessory having an affixed "female" frame coupling component and a tethered "male" cap coupling component, the sixth fishing line accessory system being shown in an open position.

FIGS. 11 and 12 show a sixth fishing line accessory system including a fishing accessory 150 having an affixed "female" frame coupling component 154 (housing an optional O-ring 156) and a tethered (via tether 153) "male" cap coupling component 152. As shown, the frame coupling component 154 has a pair of notches 154a (only one of which can be seen in the figures) positioned opposite each other on the annular periphery of the frame coupling component 154. Similarly, as shown, the cap coupling component 152 has a pair of notches 152a (only one of which can be seen in the figures) positioned opposite each other on the annular periphery of the cap coupling component 152. FIG. 11 shows the sixth fishing line accessory system in an open position. A fisherman can open the sixth fishing line accessory system using his finger or fingernail to lift the cap coupling component 152 off the frame coupling component 154. An optional tab 158 might be included to assist the fisherman in this opening process. The fisherman then lays the fishing line 80 across the frame coupling component 154 so that it spans the distance between the notches 154a. The fisherman then "closes" the system by pressing the cap coupling component 152 into the frame coupling component 154 so that the notches 152a, 154a align. FIG. 12 shows this sixth fishing line accessory system secured to a fishing line 80, the cap coupling component 152 inserted into the frame coupling component 154. In this mating relationship, the notches 154a are obstructed to prevent the fishing line 80 from "escaping" (thereby capturing the fishing line). It should be noted that the shown O-ring 156 preferably serves a sealing function (to prevent fluids from entering the fishing accessory 150) and/or a gripping function (to help grip the fishing line 80 and prevent unwanted slippage). It should be noted that the shown notches 152a and/or notches 154a may be narrower than shown so that they are narrow enough to grip the fishing line 80. It should be noted that alternative sixth fishing line accessory systems might have a cap coupling component 152 without notches defined therein. It should be noted that alternative sixth fishing line accessory systems might have a cap coupling component that is "female" and a frame coupling component that is "male."

Figure 14:
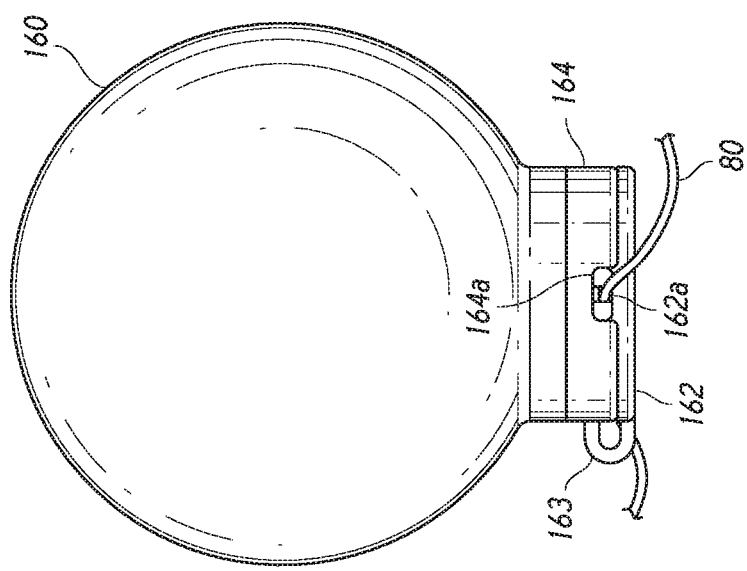
FIG. 14 is a side elevational view of the preferred exemplary seventh fishing line accessory system secured to a fishing line, the cap coupling component inserted into the frame coupling component.

FIGS. 13 and 14 show a seventh fishing line accessory system including a fishing accessory 160 having an affixed "female" frame coupling component 164 (housing an O-ring 166) and a tethered (via tether 163) "male" cap coupling component 162. The seventh fishing line accessory system is similar to the sixth fishing line accessory system. One difference, however, is that the frame coupling component 164 is affixed to the fishing accessory 160 using a bolt or screw 168 (which could imply a solid fishing accessory 160 that might be made of floating material such as polystyrene, cork, or foam). Another difference is the shape of the cap coupling component 162. As shown, the frame coupling component 164 has a pair of notches 164a (only one of which can be seen in the figures) positioned opposite each other on the annular periphery of the frame coupling component 164. Similarly, as shown, the cap coupling component 162 has a pair of notches 162a (only one of which can be seen in the figures) positioned opposite each other on the annular periphery of the cap coupling component 162. FIG. 13 shows the seventh fishing line accessory system being shown in an open position. A fisherman can open the seventh fishing line accessory system using his finger or fingernail to lift the cap coupling component 162 off the frame coupling component 164. The fisherman then lays the fishing line 80 across the frame coupling component 164 so that it spans the distance between the notches 164a. The fisherman then "closes" the system by pressing the cap coupling component 162 into the frame coupling component 164 so that the notches 162a, 164a align. FIG. 14 shows this seventh fishing line accessory system secured to a fishing line 80, the cap coupling component 162 inserted into the frame coupling component 164. In this mating relationship, the notches 164a are obstructed to prevent the fishing line 80 from "escaping" (thereby capturing the fishing line). It should be noted that the shown O-ring 166 preferably serves a sealing function and/or a gripping function. It should be noted that the shown notches 162a and/or notches 164a may be narrower than shown so that they are narrow enough to grip the fishing line 80. It should be noted that alternative seventh fishing line accessory systems might have a cap coupling component 162 without notches defined therein. It should be noted that alternative seventh fishing line accessory systems might have a cap coupling component that is "female" and a frame coupling component that is "male."

Fishing line accessory systems described herein (e.g. those in FIGS. 15-19) as including pairs of attracting attachable magnets (e.g. the eighth fishing line accessory system of FIGS. 15 and 16, the ninth fishing line accessory system of FIGS. 17 and 18, and the tenth fishing line accessory system of FIG. 19) may have alternative attachable and/or attractable pairs of devices including, but not limited to, a magnet and an attracting metal element (e.g. magnetic metals such as iron, nickel, cobalt, certain steels and other alloys), hook and loop fabric (i.e. VELCRO®), or any other pair of devices that can be attached and/or attracted to each other in a secure fashion and can be used under water. It should also be noted that a single connecting device (e.g. a clamp, groove, or elevated seat) can be used with a device that doesn't have any particular connecting properties (e.g. a blown up balloon). FIGS. 15-19 use magnets for attachment purposes. In FIGS. 15-18 they also serve as a primary source of weight. Preferred magnets have an extremely strong attachment to each other. Exemplary magnets suitable for this purpose include, but are not limited to, Neodymium rare earth magnets purchased from CMS Magnetics, Inc. of Plano Tex. (e.g. ND025-42EM). FIGS. 15-19 also show the magnets as being embedded in the coupling component. Alternatively the magnets can be otherwise connected or connectable to the coupling components and/or fishing accessories. It should be noted that these specific magnets are disclosed for purposes of enablement and best mode, but are not meant to be limiting as many appropriately sized and shaped pair of magnets (or other attractable and/or attachable devices) would suffice.

Figure 16:
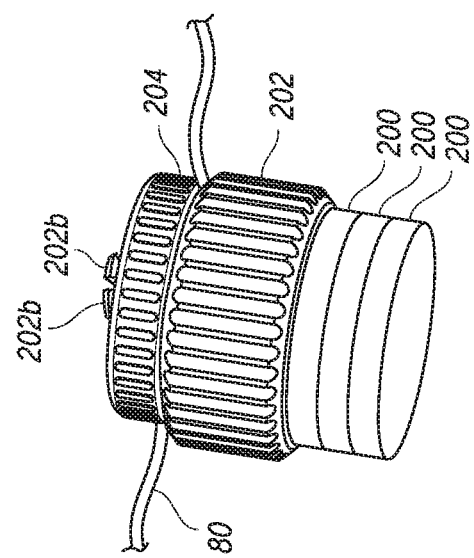
FIG. 16 is a side perspective view of the preferred exemplary eighth fishing line accessory system secured to a fishing line, the nut coupling component rotationally fit onto the forked coupling component, and the attachable fishing accessories being attached to the embedded magnet.
Figure 15:
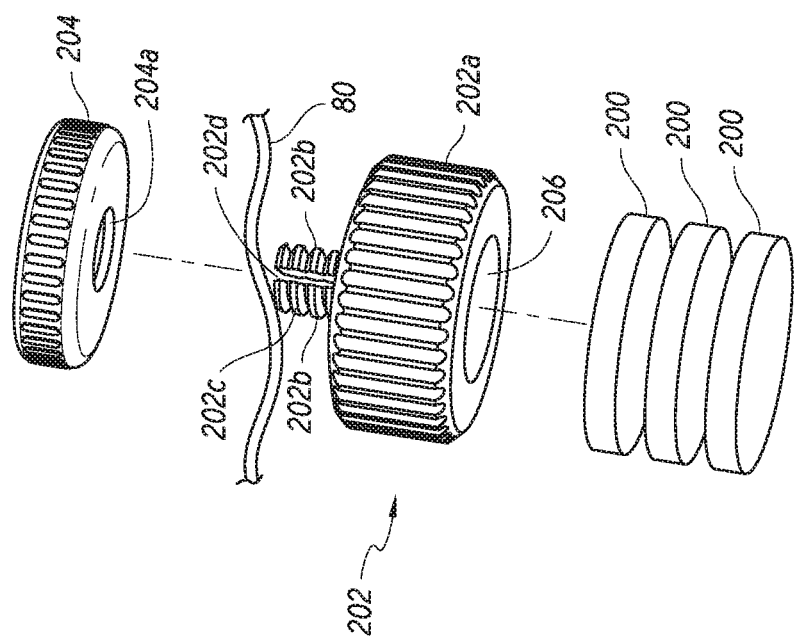
FIG. 15 is an exploded side perspective view of a preferred exemplary eighth fishing line accessory system including a "male" forked coupling component and a "female" nut coupling component, the base of the "male" forked coupling component having an embedded magnet, attachable fishing accessories (shown as magnet weights) being ready to attach to the embedded magnet.

FIGS. 15 and 16 show an eighth fishing line accessory system including a "male" forked coupling component 202 and a "female" nut coupling component 204. The "male" forked coupling component 202 has a base 202a and a shaft 202b. The base 202a has a magnet 206 within it (e.g. an embedded magnet 206). The shaft 202b has an at least partially threaded exterior surface 202c. The shaft 202b is forked to have two tines 202b, 202b separated by a gap 202d into which a fishing line 80 may be inserted. The "female" nut coupling component 202 has an at least partially threaded interior surface 204a. Attachable fishing accessories 200 (shown as magnet weights) may be attached to or detached from the embedded magnet 206. FIG. 16 shows the eighth fishing line accessory system secured to a fishing line 80, the nut coupling component 204 rotationally fit (screwed) onto the forked coupling component 202 (after the fishing line 80 has been inserted into the gap) to secure the eighth fishing line accessory system secured to a fishing line 80. In this mating relationship, the gap 202d is obstructed to prevent the fishing line 80 from "escaping" (thereby capturing the fishing line). In one preferred eighth fishing line accessory system, the interior surfaces of the nut coupling component 204 are slightly smaller than the exterior surface of the shaft 202b and the tines of the shaft 202b are at least slightly resilient. When the nut coupling component 204 is on the shaft 202b, the tines of the shaft 202b are compressed slightly together to grip the fishing line 80 secured therebetween. As with other fishing line accessory systems having a rotational relationship between two threaded coupling components 202, 204, the relationship (an adjustably secure relationship) between the two components 202, 204 can be separated (and brought together) partially and gradually. This allows a user to gradually back the "male" coupling component 202 out (unscrew) of the "female" coupling component 204 so that the fishing line 80 has room to be pulled through the gap and, thereby, the position of the fishing line accessory system may be adjusted in relation to the fishing line 80. The attachable fishing accessories 200 are attachable to the embedded magnet 206 (as shown in FIG. 16). This allows a fisherman to have precisely the amount of weight he requires (based on, for example, water depth, water speed, and/or other factors that would dictate how heavy a weight should be used) for his particular situation because he can readily attach and detach individual fishing accessories 200. It should be noted that the fishing accessories 200 can be attached to and detached from the embedded magnet 206 before or after the fishing line accessory system is secured to a fishing line 80.

Figure 18:
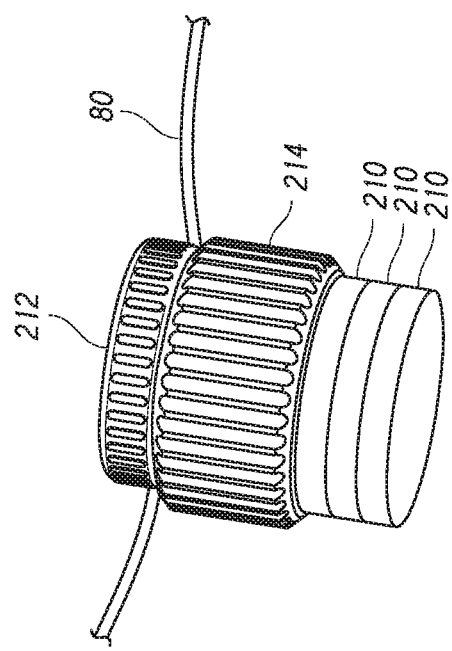
FIG. 18 is a side perspective view of the preferred exemplary ninth fishing line accessory system secured to a fishing line, the nut coupling component rotationally fit onto the forked coupling component, and the attachable fishing accessories being attached to the embedded magnet.
Figure 17:
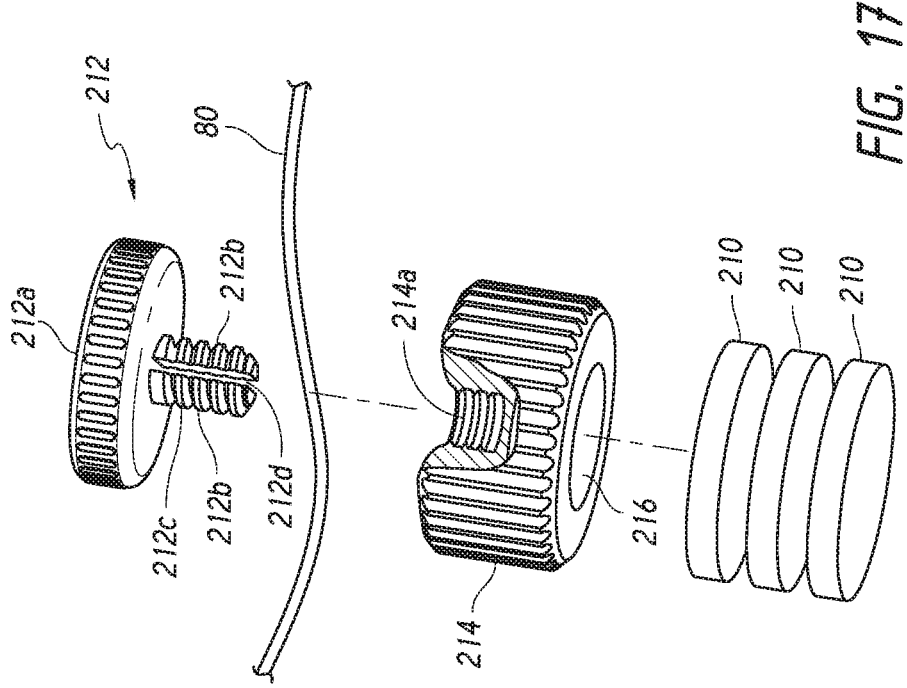
FIG. 17 is an exploded side perspective view of a preferred exemplary ninth fishing line accessory system including a "male" forked coupling component and a "female" nut coupling component (with a partial cutaway), the "female" nut coupling component having an embedded magnet, attachable fishing accessories (shown as magnet weights) being ready to attach to the embedded magnet.

FIGS. 17 and 18 show a ninth fishing line accessory system that is similar to the eighth fishing line accessory system except that the "male" and "female" components have been reversed. More specifically, the ninth fishing line accessory system includes a "male" forked coupling component 212 and a "female" nut coupling component 214. The "male" forked coupling component 212 has a base 212a and a shaft 212b with an at least partially threaded exterior surface 212c. The shaft 212b is forked to have two tines 212b, 212b separated by a gap 212d into which a fishing line 80 may be inserted. The "female" nut coupling component 214 has an at least partially threaded interior surface 214a and an embedded magnet 216. Attachable fishing accessories 210 (shown as magnet weights) may be attached to or detached from the embedded magnet 216. FIG. 18 shows the ninth fishing line accessory system secured to a fishing line 80, the nut coupling component 214 rotationally fit (screwed) onto the forked coupling component 212 (after the fishing line 80 has been inserted into the gap) to secure the ninth fishing line accessory system secured to a fishing line 80. In this mating relationship, the gap 212d is obstructed to prevent the fishing line 80 from "escaping" (thereby capturing the fishing line). In one preferred ninth fishing line accessory system, the interior surfaces of the nut coupling component 214 are slightly smaller than the exterior surface of the shaft 212b and the tines of the shaft 212b are at least slightly resilient. When the nut coupling component 214 is on the shaft 212b, the tines of the shaft 212b are compressed slightly together to grip the fishing line 80 secured therebetween. As with other fishing line accessory systems having a rotational relationship between two threaded coupling components 212, 214, the relationship (an adjustably secure relationship) between the two components 212, 214 can be separated (and brought together) partially and gradually. This allows a user to gradually back the "male" coupling component 212 out (unscrew) of the "female" coupling component 214 so that the fishing line 80 has room to be pulled through the gap and, thereby, the position of the fishing line accessory system may be adjusted in relation to the fishing line 80. The attachable fishing accessories 210 are attachable to the embedded magnet 216 (as shown in FIG. 18). This allows a fisherman to have precisely the amount of weight he requires (based on, for example, water depth, water speed, and/or other factors that would dictate how heavy a weight should be used) for his particular situation because he can readily attach and detach individual fishing accessories 210. It should be noted that the fishing accessories 210 can be attached to and detached from the embedded magnet 216 before or after the fishing line accessory system is secured to a fishing line 80.

FIG. 19 shows a tenth fishing line accessory system including a "male" forked coupling component 222 and a "female" nut coupling component 224. The "male" forked coupling component 222 has a shaft (with two tines 222*a*, 222*a* separated by a gap 222*b*) with an at least partially threaded exterior surface 222*c*. The "female" nut coupling component 224 has an at least partially threaded interior surface (not shown) and an embedded magnet 226. Alternatively, like the eighth embodiment shown in FIGS. 15 and 16, the "male" forked coupling component can have a magnet embedded in its base. FIG. 19 is included to show the attachable fishing accessory 220. In this figure, the fishing accessory 220 is a float with an affixed magnet 220*a*. The magnet 220*a* is then attached to the embedded magnet 226.

FIGS. 20 and 21 show an eleventh fishing line accessory system including a "male" forked coupling component 232 and a "female" nut coupling component 234. The "male" forked coupling component 232 has a base 232*a* and a shaft 232*b* with an at least partially threaded exterior surface 232*c*. The shaft 232*b* is forked to have two tines 232*b*, 232*b* (that are preferably at least slightly resilient) separated by a gap 232*d* into which a fishing line 80 may be inserted. The "female" nut coupling component 234 has an at least partially threaded interior surface 234*a*. The eleventh fishing line accessory system includes an attachable fishing accessory 230 (shown as a solid cylinder with an embedded weight 230*a* and an at least partially threaded cavity 230*b*). Multiple fishing accessories 230 of differing weights could be provided to allow a user to select an appropriate weight. In use, the user would insert the fishing line 80 into the gap between the two tines of the shaft 232*b*. Then the nut coupling component 234 may be rotationally fit (screwed) onto the shaft 232*b* of the forked coupling component 232. This secures the two coupling components 232, 234 to the fishing line 80. Because of the rotational relationship between two threaded coupling components 232, 234, the components can be separated (and brought together) partially and gradually by rotating (screwing and unscrewing) to allow repositioning in relation to the fishing line 80. Because the shaft 232*b* is longer than the depth of the nut coupling component 234, when the coupling components 232, 234 are fully brought together (screwed together), the ends of the tines of the shaft 232*b* extend beyond the nut coupling component 234. Once the coupling components 232, 234 are in the proper position in relation to the fishing line 80, an attachable fishing accessory 230 can be selected and rotationally fit to the protruding ends of the tines of the shaft 232*b*. FIG. 21 shows the eleventh fishing line accessory system secured to a fishing line 80. In this mating relationship, the gap 232*d* is obstructed to prevent the fishing line 80 from "escaping" (thereby capturing the fishing line).

The twelfth fishing line accessory system shown in FIG. 22 is similar to the eleventh fishing line accessory system shown in FIGS. 20 and 21 except that the twelfth fishing line accessory system eliminates the "female" nut coupling component. The twelfth fishing line accessory system includes a "male" forked coupling component 242 and a combined "female" nut coupling component and fishing accessory (referred to jointly as the "fishing accessory coupling component 246"). The "male" forked coupling component 242 has a base 242*a* and a shaft 242*b* with an at least partially threaded exterior surface 242*c*. The shaft 242*b* is forked to have two tines 242*b*, 242*b* (that are preferably at least slightly resilient) separated by a gap 242*d* into which a fishing line 80 may be inserted. The fishing accessory coupling component 246 has an at least partially threaded interior cavity 246*a* and an embedded weight 246*b*. Multiple fishing accessory coupling components 246 of differing weights could be provided to allow a user to select an appropriate weight. In use, the user would insert the fishing line 80 into the gap between the two tines of the shaft 242*b*. Then the fishing accessory coupling component 246 may be rotationally fit (screwed) onto the shaft 242*b* of the forked coupling component 242. This secures the two coupling components 242, 246 to the fishing line 80. In the mating relationship (not shown), the gap 242*d* would be obstructed to prevent the fishing line 80 from "escaping" (thereby capturing the fishing line). Because of the rotational relationship between two threaded coupling components 242, 246, the relationship between the two components can be separated (and brought together) partially and gradually by rotating (screwing and unscrewing) to allow repositioning in relation to the fishing line 80.

FIGS. 23-31 all show fishing line accessory systems that include an attachable fishing accessory that is inflatable and has an internal valve. The attachable fishing accessory is preferably a balloon, although it may be reinforced or have a custom shape. A preferred exemplary internal valve is a one-way valve through which air can be forced in a single direction, but the air cannot flow in an opposite direction (and thereby prevent escape or leakage of the air). Exemplary valves include those shown and described in U.S. Pat. Nos. 5,010,925, 6,092,551, and U.S. Patent Application No. 2010/0288373 the specifications of which are incorporated herein by reference. One valve that is commercially available is VA3562 VERNAY® Duckbill Check Valve (Vernay Laboratories, Inc., Yellow Springs, Ohio) and has the part number VL 1742-102 and silicone number VL1001M11. It should be noted that these specific valves are disclosed for purposes of enablement and best mode, but are not meant to be limiting as many appropriately sized and shaped one-way valve designed to handle high flow and low leakage would suffice.

FIGS. 23, 24, and 25 show a thirteenth fishing line accessory system including a "male" forked coupling component 302, a "female" nut coupling component 304, and an optional O-ring 305. The "male" forked coupling component 302 is a substantially cylindrical body 302*a* having a substantially longitudinal air path 302*b* defined therein. An internal valve 308 is positioned within (which is functionally positioned so as to control) the longitudinal air path 302*b*. The upper portion of the cylindrical body 302*a* has a fishing accessory attachment structure (shown as an annular indentation 302*c* on the exterior surface of the upper portion of the cylindrical body 302). The lower portion of the cylindrical body 302*a* is or includes a shaft 302*d* that has an exterior surface that is at least partially threaded 302*e*. The shaft 302*d* of the "male" forked coupling component 302 preferably has two tines separated by a gap (which may be part of air path 302*b*) into which a fishing line 80 may be inserted (as shown) or the shaft 302*d* may have a notch (not shown) defined in its exterior surface gap into which a fishing line 80 may be inserted. (Alternatively, the thirteenth fishing line accessory system could have a notched shaft.) The "female" nut coupling component 304 preferably has an at least partially threaded interior surface 304*a*. In FIG. 23, the attachable fishing accessory 300 is shown as a deflated balloon that is attached to the fishing accessory attachment structure 302*c* of the forked coupling component 302. Prior to attaching the thirteenth fishing line accessory system to the fishing line 80, air is forced into the longitudinal air path 302*b* (e.g. by a fisherman blowing into it), through the valve 308, and into the attachable fishing accessory 300 causing the attachable fishing accessory 300 to inflate. Because valve 308 is a one-way valve, air cannot escape back through the longitudinal air path 302b. FIG. 24 shows the thirteenth fishing line accessory system with the fishing line accessory 300 in an at least partially inflated state. Once the fishing line accessory 300 has been inflated, the fishing line 80 may be inserted into the gap between the tines of the shaft 302d (or into a notch defined in the shaft). FIG. 25 shows the thirteenth fishing line accessory system with the fishing line accessory 300 in its at least partially inflated state secured to a fishing line 80, the nut coupling component 304 rotationally fit (screwed) onto the forked coupling component 302. In this mating relationship, the gap (which may be part of air path 302b) is obstructed to prevent the fishing line 80 from "escaping" (thereby capturing the fishing line). The described methods of use, properties, and advantages associated with components that are rotationally fit (screwed) together also apply to this system.

Figure 29:
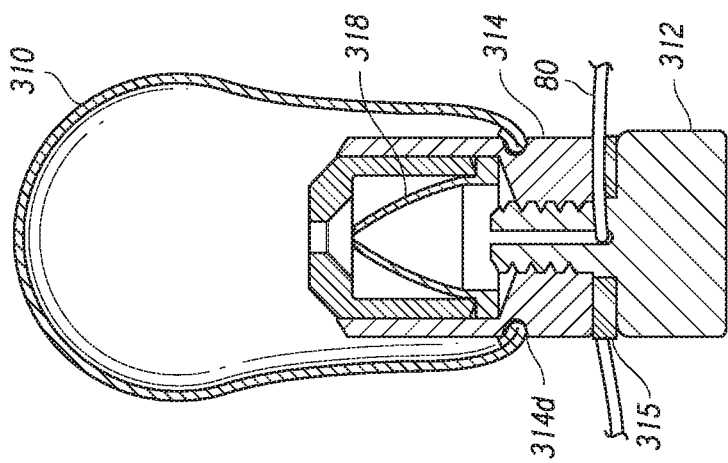
FIG. 29 is a cross-sectional side view of the preferred exemplary fourteenth fishing line accessory system with the fishing line accessory in its inflated state secured to a fishing line, the forked coupling component rotationally fit into the nut coupling component.
Figure 28:
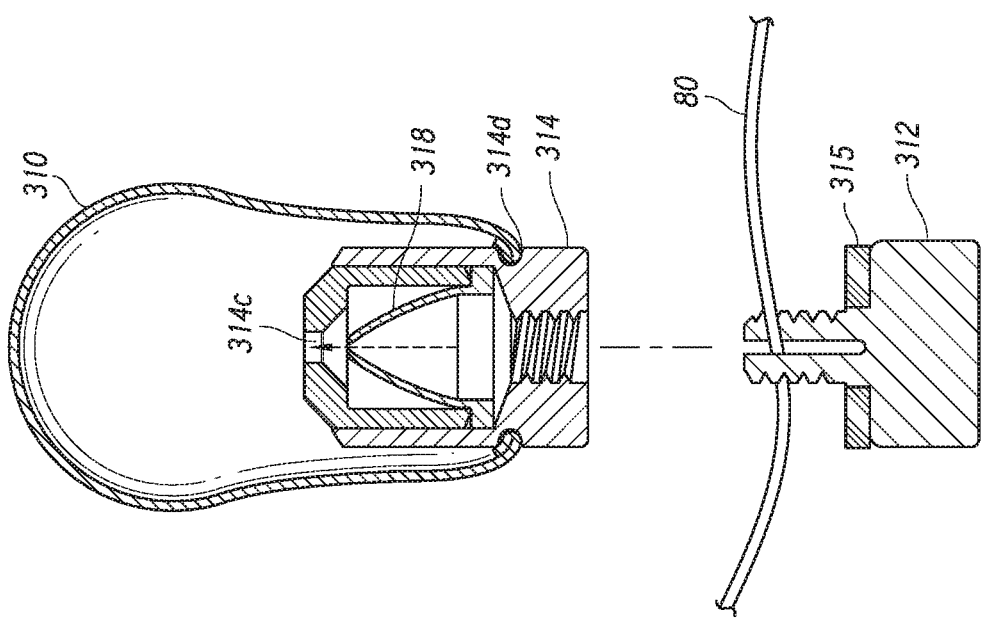
FIG. 28 is a cross-sectional side view of the preferred exemplary fourteenth fishing line accessory system in which the attachable fishing accessory is shown in its at least partially inflated state.

FIGS. 26, 27, 28, and 29 show a fourteenth fishing line accessory system. One significant difference between the fourteenth fishing line accessory system and the thirteenth fishing line accessory system is the reversal of the "male" and "female" coupling components. The shown fourteenth fishing line accessory system includes a "male" forked coupling component 312, a "female" nut coupling component 314 (shown as housing 314a and insert cover 314b), and an optional O-ring 315. The "female" nut coupling component 314 has a substantially longitudinal air path 314c defined therein. An internal valve 318 is positioned within the longitudinal air path 314c and, as shown, within an internal valve chamber created by the upper section of the housing 314a and insert cover 314b. The housing 314a can be thought of as being divided into an upper section 314d (which has the valve chamber described above) and a lower section 314e. The lower section 314e has a narrow passage that forms part of the longitudinal air path 314c. The shown narrow passage in the lower section has an at least partially threaded interior surface 314f. Substantially near the intersection of the upper and lower sections 314d, 314e of the housing 314a is fishing accessory attachment structure (shown as an annular indentation 314g on the exterior surface of the upper section 314d of the nut coupling component 314). The "male" forked coupling component 312 has a base 312a and a shaft 312b that has an exterior surface that is at least partially threaded 312c. The shaft 312b of the "male" forked coupling component 312 preferably has two tines 312b, 312b separated by a gap 312c into which a fishing line 80 may be inserted (as shown in FIGS. 28 and 29) or the shaft 312b may have a notch (defined in its exterior surface) into which a fishing line 80 may be inserted. (Alternatively, the fourteenth fishing line accessory system could have a notched shaft.) In FIG. 27, the attachable fishing accessory 310 is shown as a deflated balloon that is attached to the fishing accessory attachment structure 314g of the nut coupling component 314. Prior to attaching the fourteenth fishing line accessory system to the fishing line 80, air is forced into the longitudinal air path 314c (e.g. by a fisherman blowing into it), through the valve 318, and into the attachable fishing accessory 310 causing the attachable fishing accessory 310 to inflate. Because valve 318 is a one-way valve, air cannot escape back through the longitudinal air path 314c. FIG. 28 shows the fourteenth fishing line accessory system with the fishing line accessory 310 in an at least partially inflated state and the fishing line 80 inserted into the gap between the tines of the shaft 312b (or into a notch defined in the shaft) of the forked coupling component 312. The fisherman then rotationally fits (screws) the nut coupling component 314 onto the forked coupling component 312. FIG. 29 shows the fourteenth fishing line accessory system with the fishing line accessory 310 in its at least partially inflated state secured to the fishing line 80, the nut coupling component 314 and the forked coupling component 312 being rotationally fit (screwed) together. In this mating relationship, the gap 312c is obstructed to prevent the fishing line 80 from "escaping" (thereby capturing the fishing line). The described methods of use, properties, and advantages associated with components that are rotationally fit (screwed) together also apply to this system.

Figure 30:
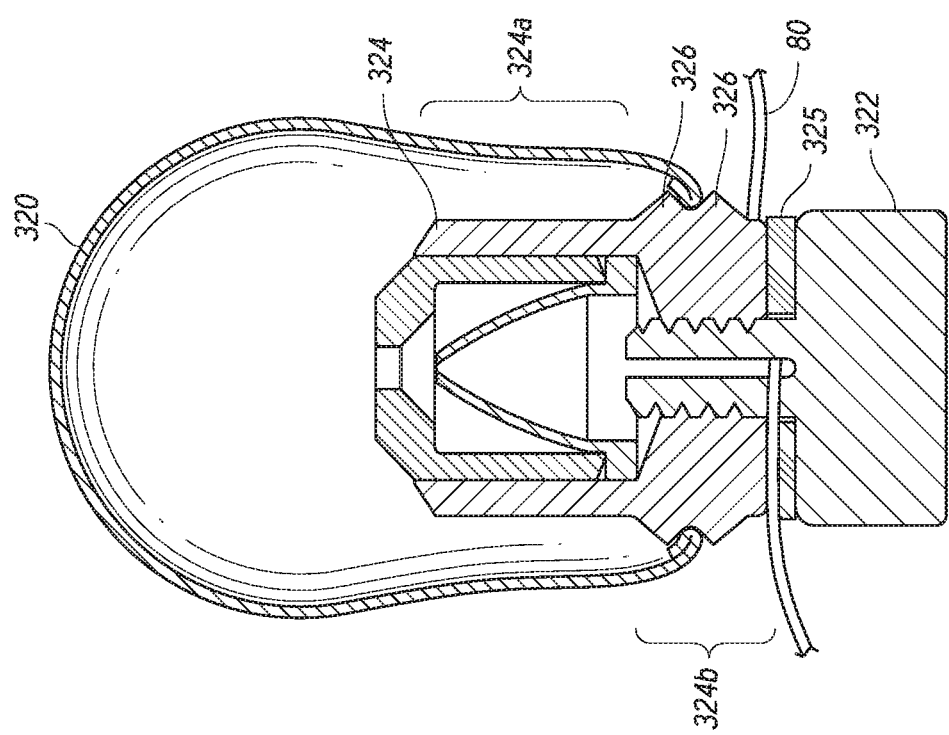
FIG. 30 is a cross-sectional side view of a preferred exemplary fifteenth fishing line accessory system with an attachable fishing line accessory (shown as an inflated balloon) secured to a fishing line.
Figure 33:
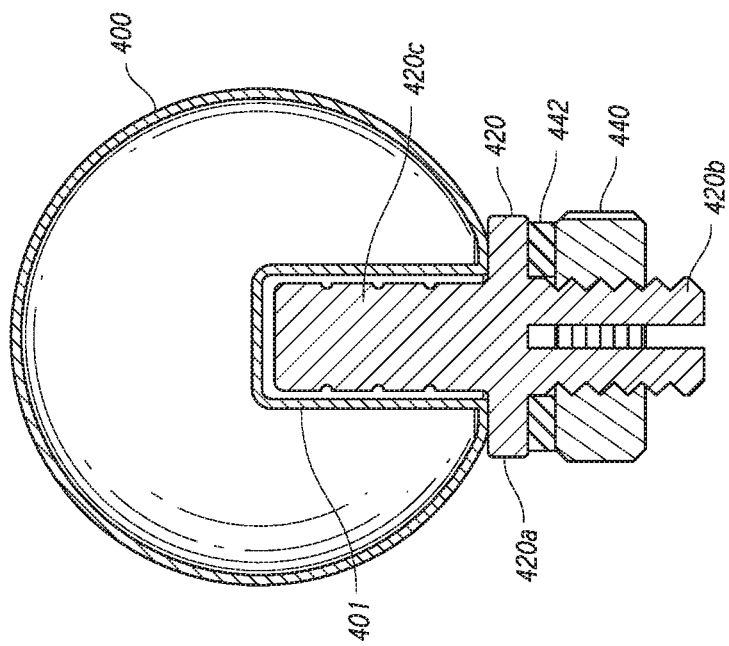
FIG. 33 is a cross-sectional view of the seventeenth fishing line accessory system of FIG. 32 fully assembled.

FIG. 30 shows a fifteenth fishing line accessory system that is similar to the fourteenth fishing line accessory system except for the type and placement of the fishing accessory attachment structure 326. The fifteenth fishing line accessory system has an attachable fishing line accessory 320 (shown as an inflated balloon), a "male" forked coupling component 322, a "female" nut coupling component 324, and an optional O-ring 325. The nut coupling component 324 can be thought of as being divided into an upper section 324a (which has a valve therein) and a lower section 324b. In the shown fifteenth fishing line accessory system, the exterior of the lower section 324b of the nut coupling component 324 has fishing accessory attachment structure (shown as two spaced protruding annular ridges on the exterior surface of the lower section 324b). The reinforced mouth of the fishing accessory 320 is attached to the fishing accessory attachment structure 326 by being positioned between the two annular ridges thereof. The fifteenth fishing line accessory system is secured to the fishing line 80 in a mating relationship so that the gap (defined between the tines of nut coupling component 324) is obstructed to prevent the fishing line 80 from "escaping" (thereby capturing the fishing line).

Figure 31:
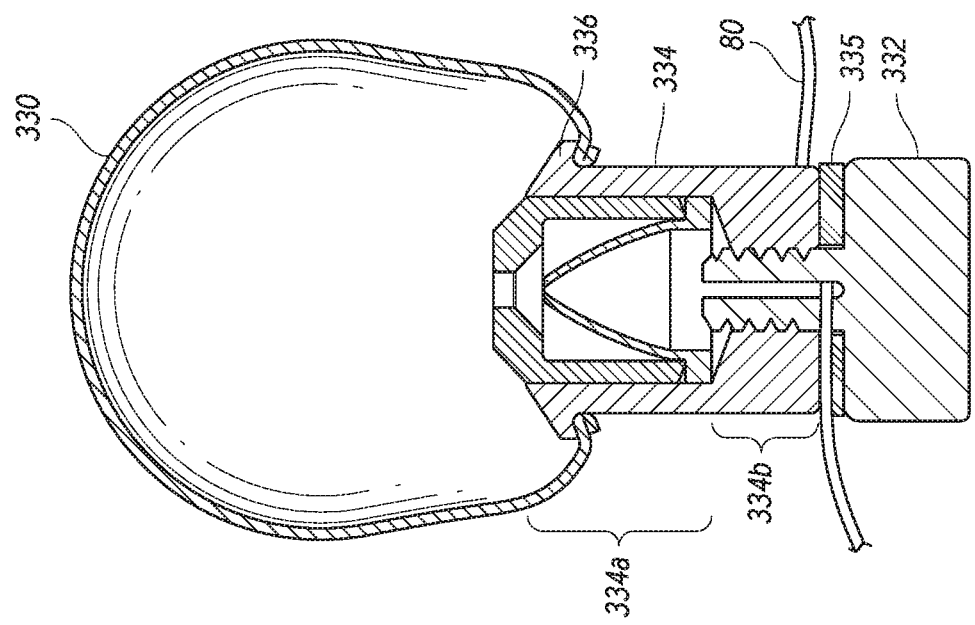
FIG. 31 is a cross-sectional side view of a preferred exemplary sixteenth fishing line accessory system with an attachable fishing line accessory (shown as an inflated balloon) secured to a fishing line.

FIG. 31 shows a sixteenth fishing line accessory system that is similar to the fourteenth and fifteenth fishing line accessory systems except for the type and placement of the fishing accessory attachment structure 336. The sixteenth fishing line accessory system has an attachable fishing line accessory 330 (shown as an inflated balloon), a "male" forked coupling component 332, a "female" nut coupling component 334, and an optional O-ring 335. The nut coupling component 334 can be thought of as being divided into an upper section 334a (which has a valve therein) and a lower section 334b. In the shown sixteenth fishing line accessory system, the exterior of the upper section 334a of the nut coupling component 334 has fishing accessory attachment structure (shown as single protruding annular ridge that is angled downward on the exterior surface of the upper section 334a). The reinforced mouth of the fishing accessory 330 is attached to the fishing accessory attachment structure 336 by being positioned below the angled annular ridge. The sixteenth fishing line accessory system is secured to the fishing line 80 in a mating relationship so that the gap (defined between the tines of nut coupling component 324) is obstructed to prevent the fishing line 80 from "escaping" (thereby capturing the fishing line).

As set forth in the Background, U.S. Pat. No. 5,233,781 to Bigelow and U.S. Pat. No. 5,651,210 to Moore both disclose floats that include a balloon and a valve. The known systems are complicated and expensive to produce, but the specific valving is necessary for their intended purposes. The apparatuses and methods disclosed in these references for attaching the fishing line to the floats is either complicated and/or problematic. The fishing line accessory systems described herein include valves that are significantly less complicated. Further, the apparatuses and methods for connecting fishing line accessory systems to a fishing line, as described herein, are less complicated than those disclosed in the Bigelow and Moore references. Finally, the apparatuses and methods for connecting fishing line accessory systems to a fishing line, as described herein, eliminate the problems associated with the apparatuses and methods disclosed in the Bigelow and Moore references.

Figure 32:
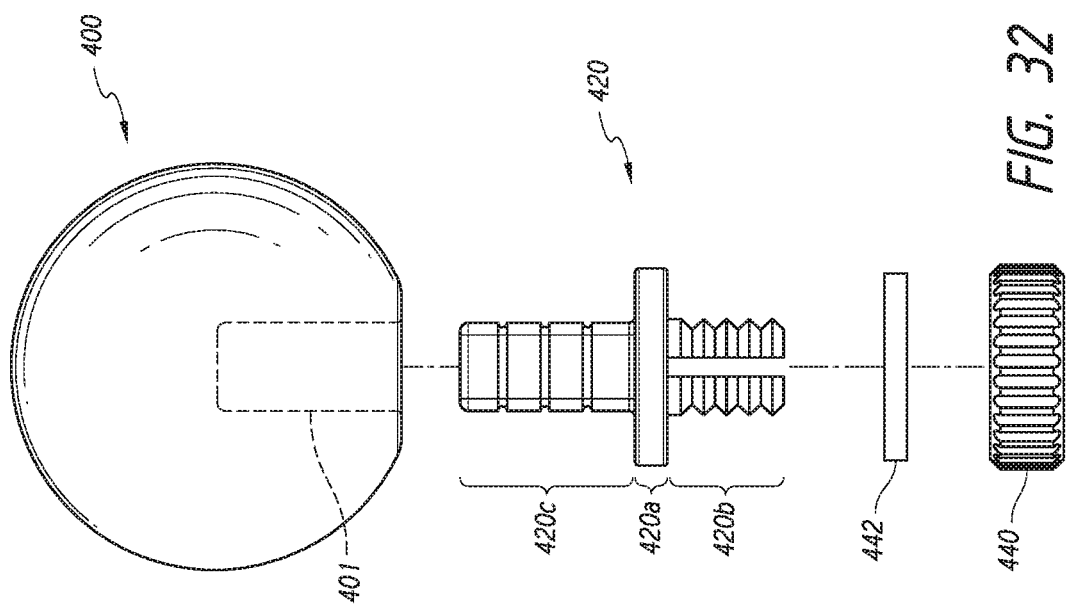
FIG. 32 is an exploded view of a preferred exemplary seventeenth fishing line accessory system with an air-lock bobber having a cavity defined therein and a post coupling component.
Figure 36:
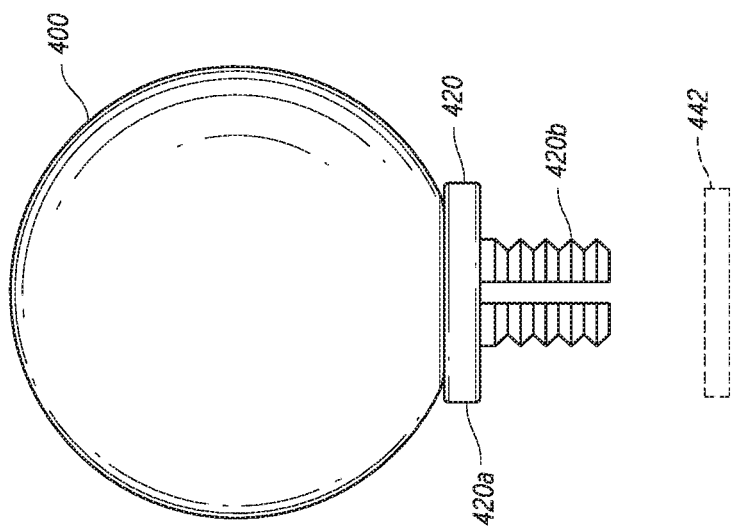
FIG. 36 is a first side exploded view of the seventeenth fishing line accessory system of FIG. 32 with the knurled nut and rubber washer shown in phantom, the second side exploded view being a mirror image of the first side view.
Figure 35:
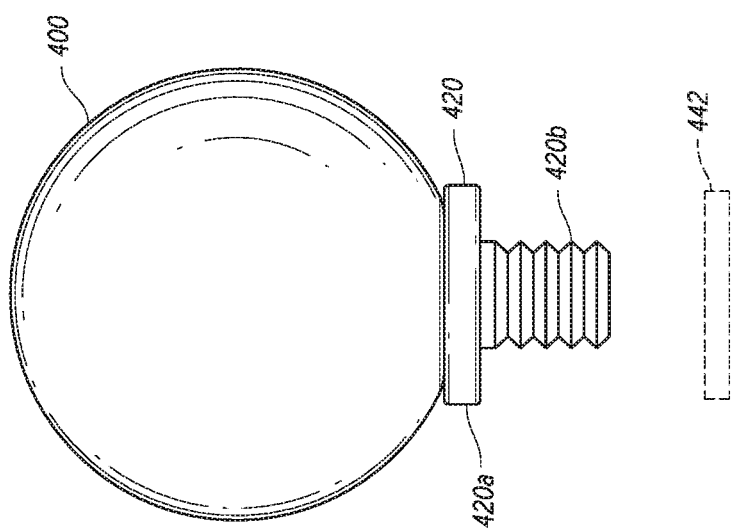
FIG. 35 is a front exploded view of the seventeenth fishing line accessory system of FIG. 32 with the knurled nut and rubber washer shown in phantom, the back view being a mirror image of the front view.
Figure 39:
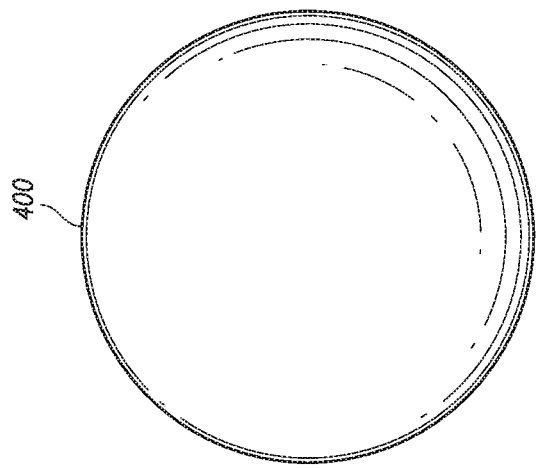
FIG. 39 is a top view of the seventeenth fishing line accessory system of FIG. 32.
Figure 38:
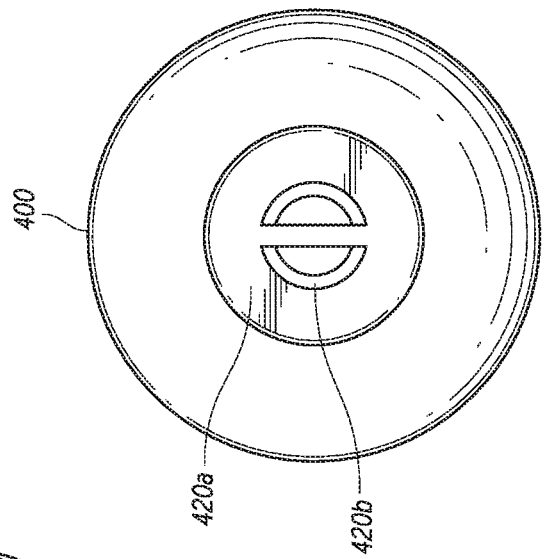
FIG. 38 is a bottom view of the seventeenth fishing line accessory system of FIG. 32 without the knurled nut and rubber washer.
Figure 37:
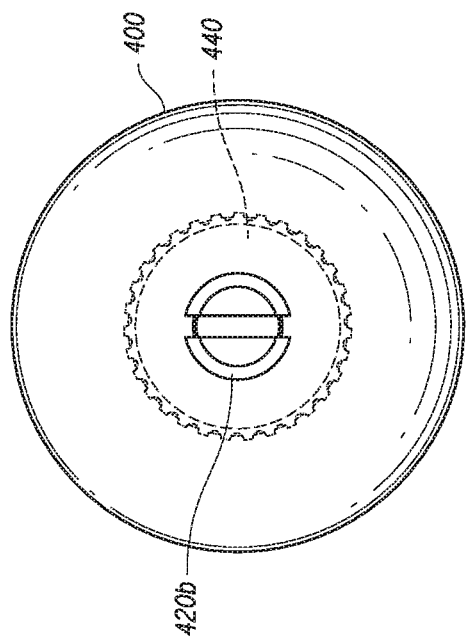
FIG. 37 is a bottom view of the seventeenth fishing line accessory system of FIG. 32, the knurled nut being shown in phantom, and the tines of the shaft being visible.
Figure 41:
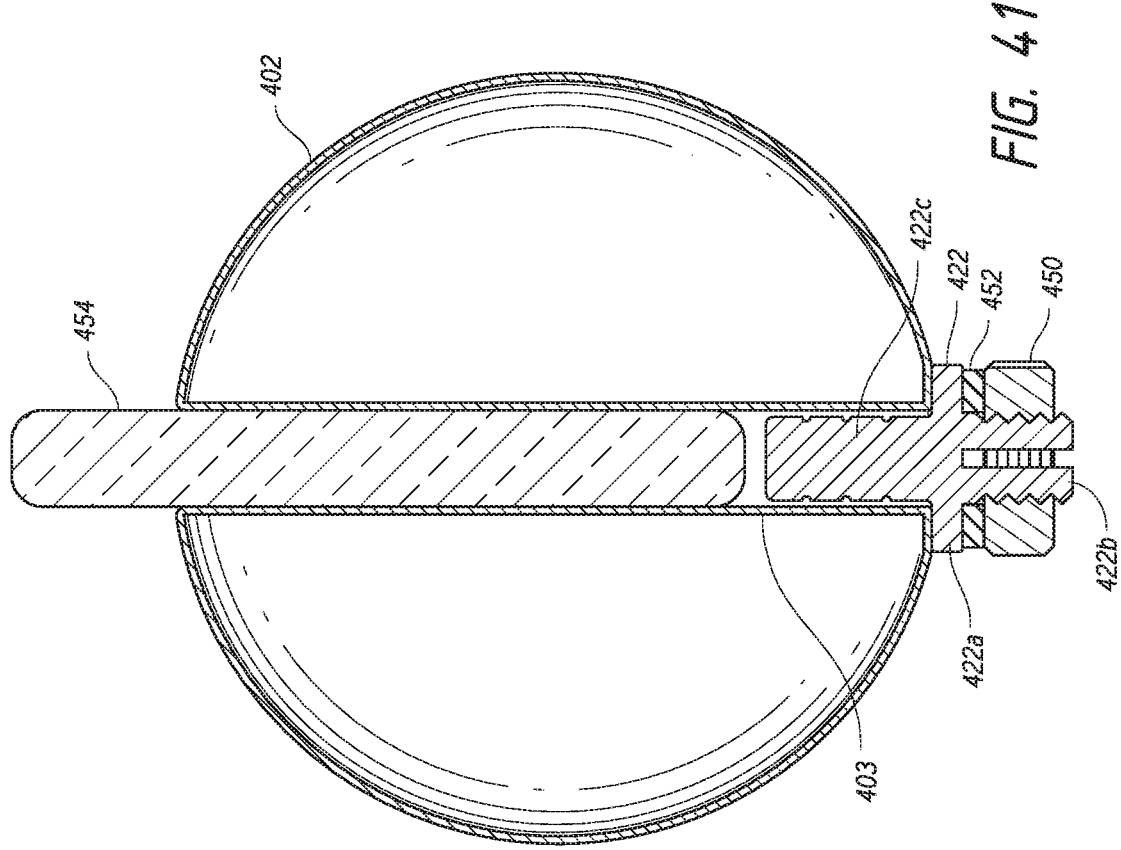
FIG. 41 is a cross-sectional view of the eighteenth fishing line accessory system of FIG. 40, fully assembled.
Figure 40:
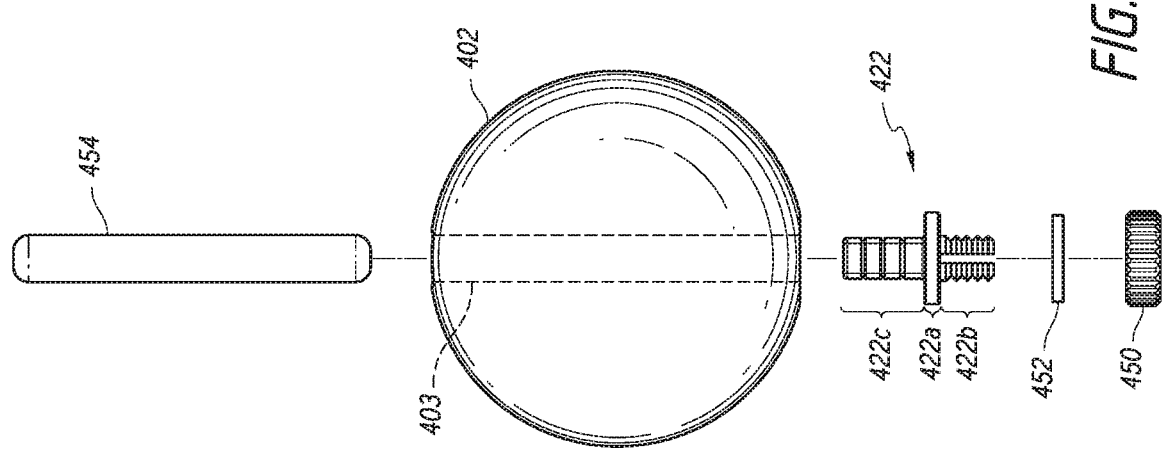
FIG. 40 is an exploded view of a preferred exemplary eighteenth fishing line accessory system shown with a glow stick that is insertable into an air-lock bobber.
Figure 42:
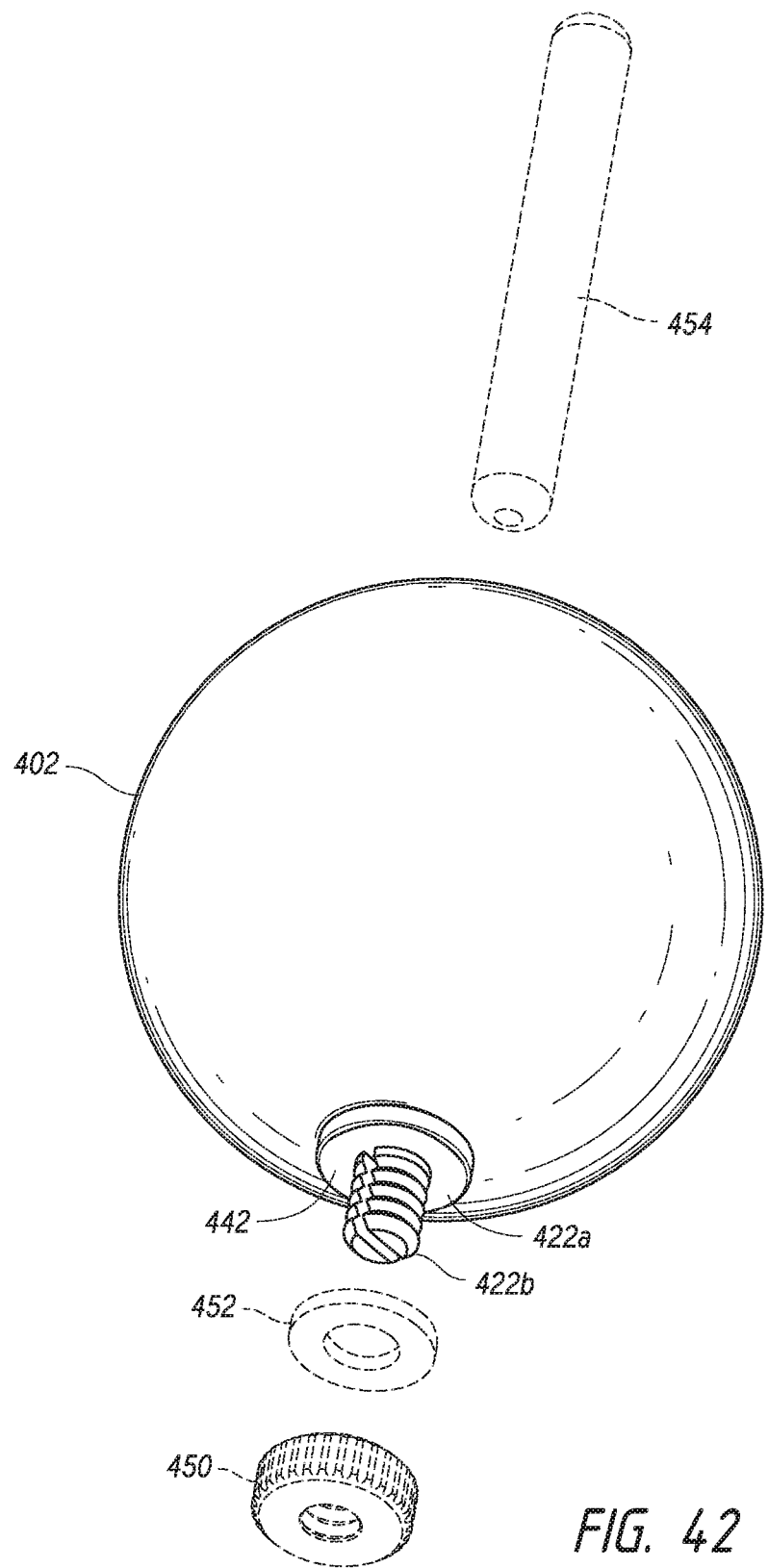
FIG. 42 is a perspective exploded view of the eighteenth fishing line accessory system of FIG. 40, with the knurled nut, rubber washer, and glow stick shown in phantom.
Figure 44:
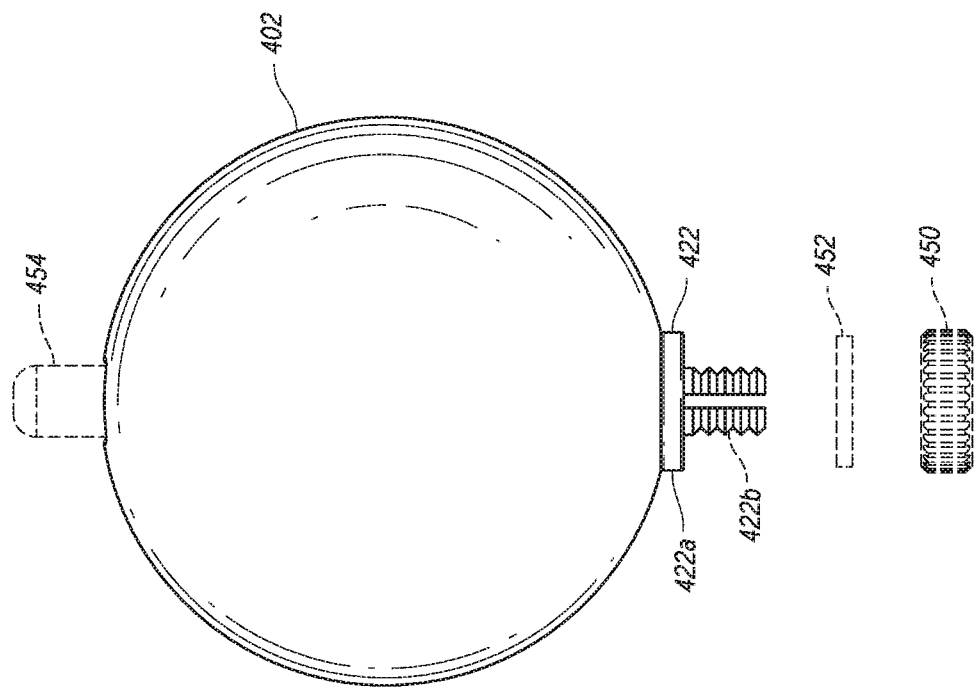
FIG. 44 is a first side exploded view of the eighteenth fishing line accessory system of FIG. 40, with the knurled nut, rubber washer, and glow stick shown in phantom, the second side exploded view being a mirror image of the first side view.
Figure 43:
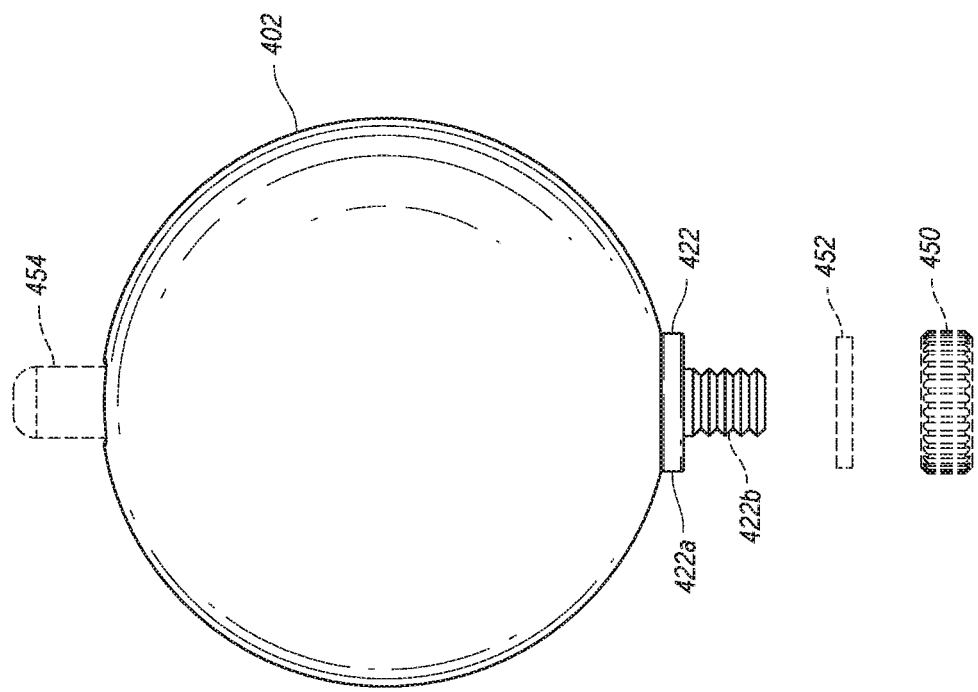
FIG. 43 is a front exploded view of the eighteenth fishing line accessory system of FIG. 40 with the knurled nut, rubber washer, and glow stick shown in phantom, the back view being a mirror image of the front view.
Figure 46:
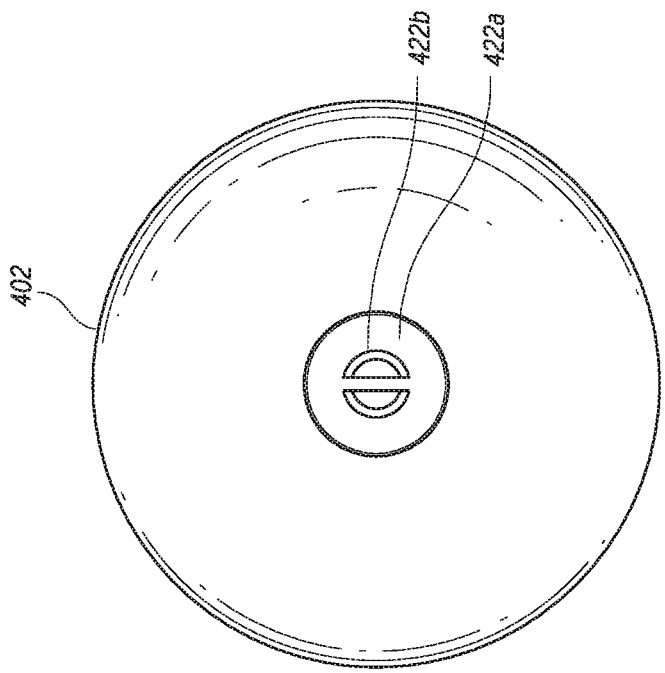
FIG. 46 is a bottom of the eighteenth fishing line accessory system of FIG. 40, without the knurled nut.
Figure 45:
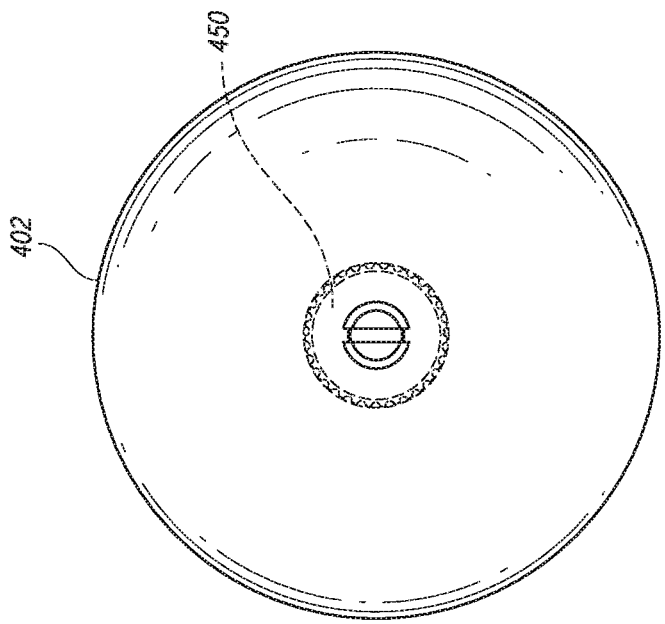
FIG. 45 is a bottom view of the eighteenth fishing line accessory system of FIG. 40, the knurled nut being shown in phantom, and the tines of the shaft being visible.
Figure 48:
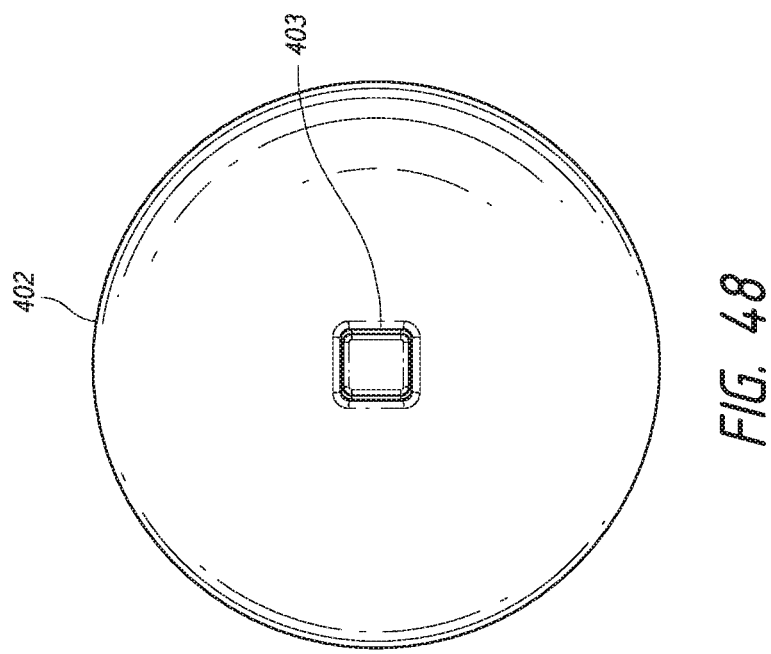
FIG. 48 is a top view of the eighteenth fishing line accessory system of FIG. 40, without a glow stick inserted in the square shaft.
Figure 47:
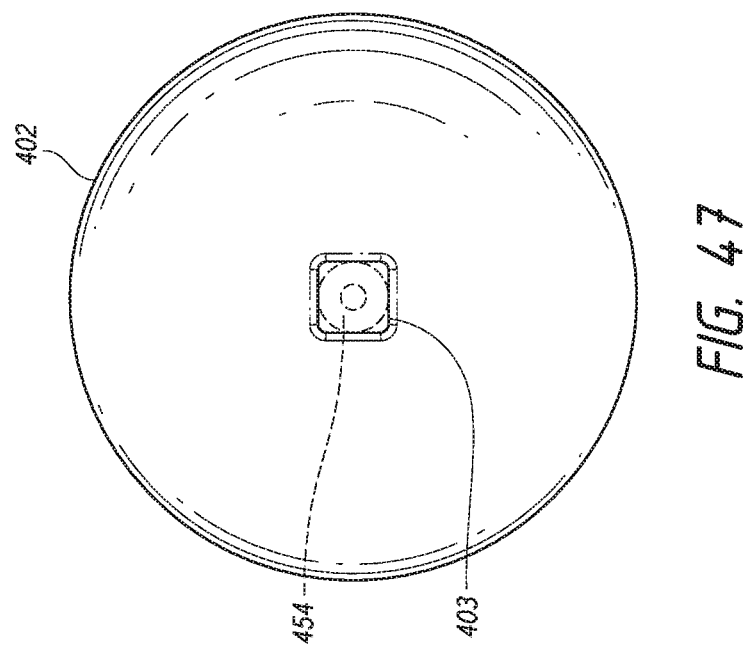
FIG. 47 is a top view of the eighteenth fishing line accessory system of FIG. 40, with the glow stick shown in phantom inserted in the square shaft.
Figure 83:
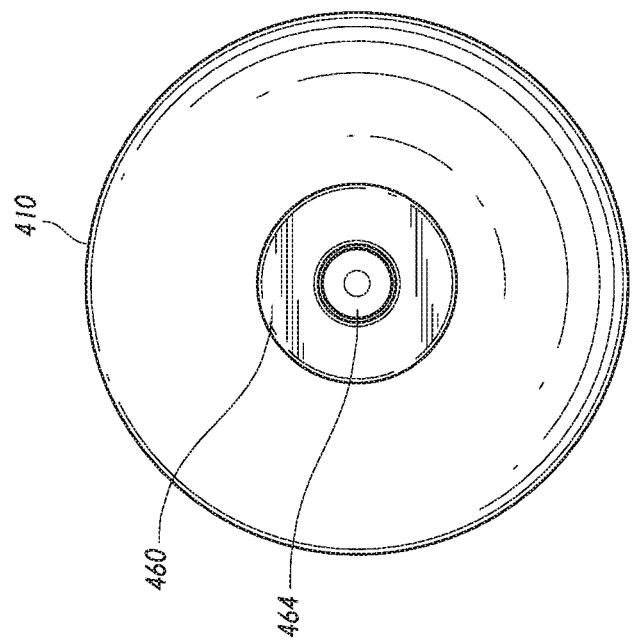
FIG. 83 is a top view of the preferred exemplary nineteenth fishing line accessory system of FIG. 79.
Figure 82:
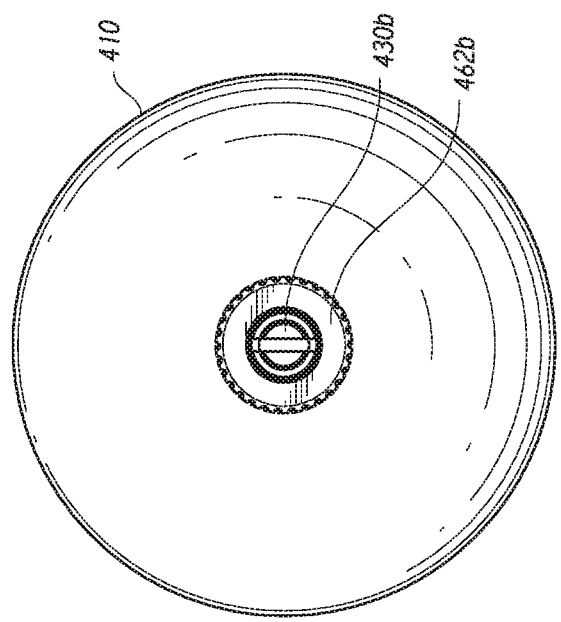
FIG. 82 is a bottom view of the preferred exemplary nineteenth fishing line accessory system of FIG. 79.

FIGS. 32-83 show fishing line accessory systems with several unique features that may be used alone or in combination.

Figure 55:
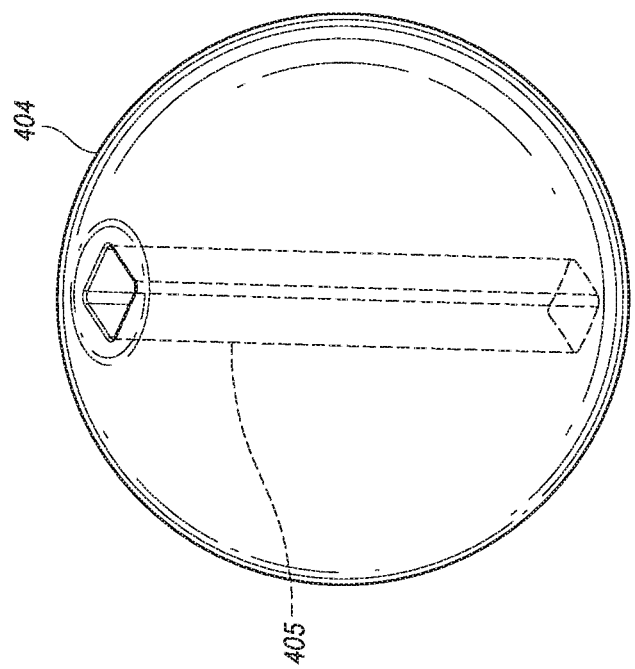
FIG. 55 is a perspective side view of the "square version" of an air-lock bobber, the square channel shown in phantom.
Figure 54:
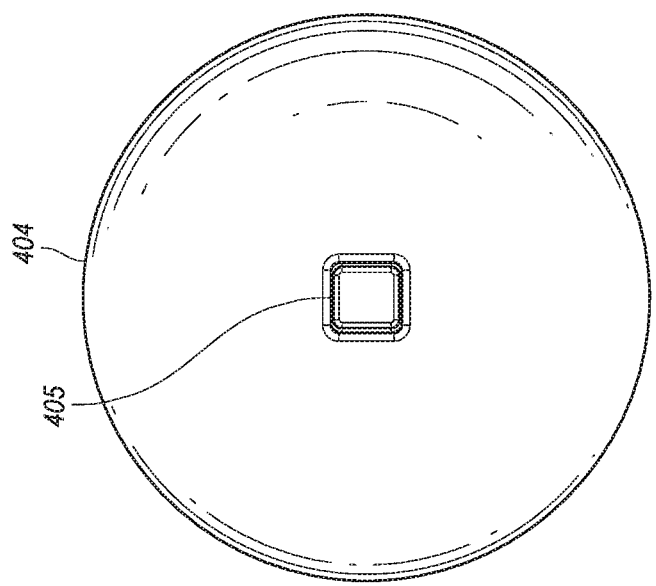
FIG. 54 is a top view of a "square version" of an air-lock bobber with a square channel, the square channel opening being visible, the bottom view being a mirror image of the top view.
Figure 62:
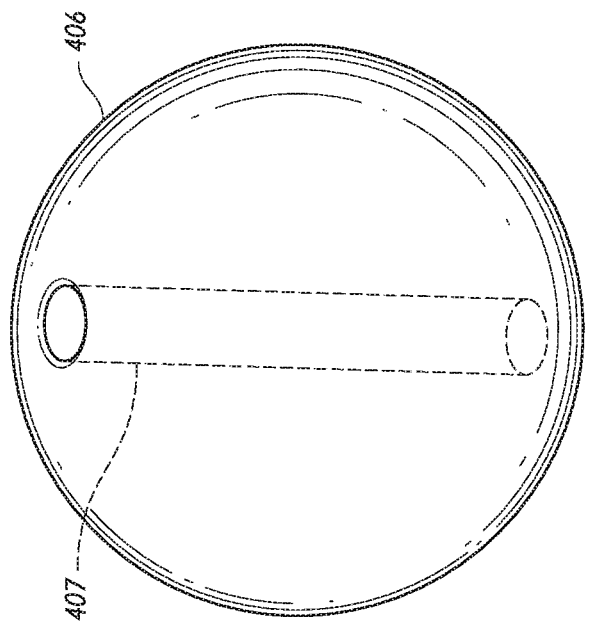
FIG. 62 is a perspective side view of the "circular version" of an air-lock bobber, the circular channel shown in phantom.
Figure 61:
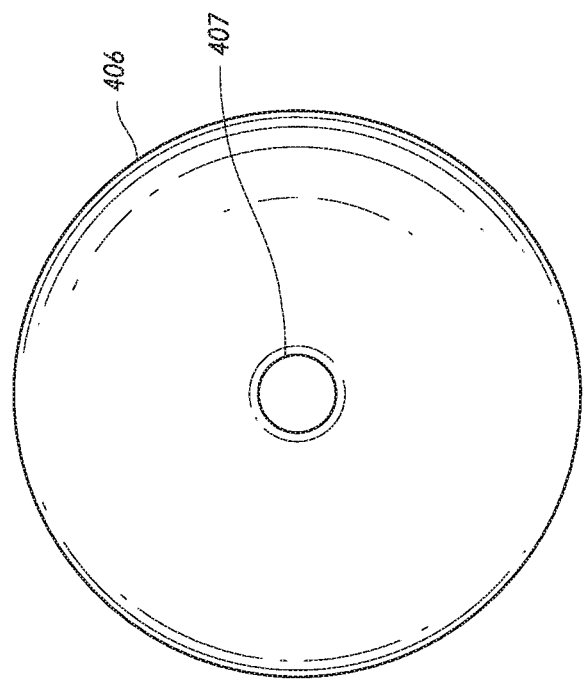
FIG. 61 is a top view of a "circular version" of an air-lock bobber with a circular channel, the circular channel opening being visible, the bottom view being a mirror image of the top view.
Figure 70:
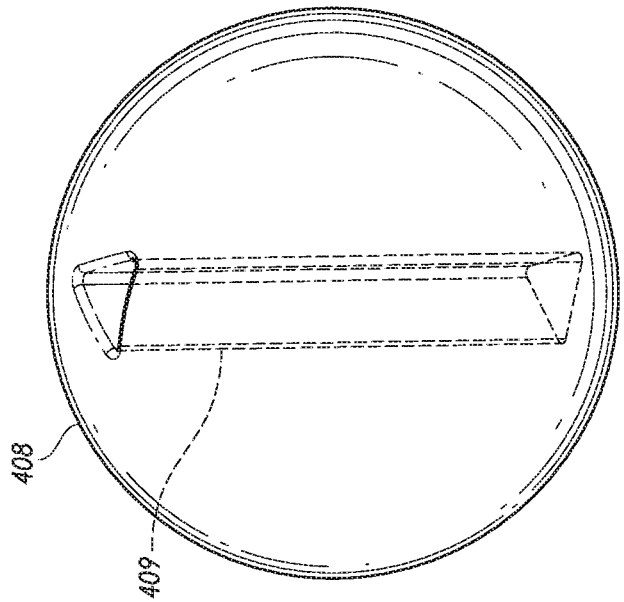
FIG. 70 is a perspective side view of the "triangular version" of an air-lock bobber, the triangular channel shown in phantom.
Figure 69:
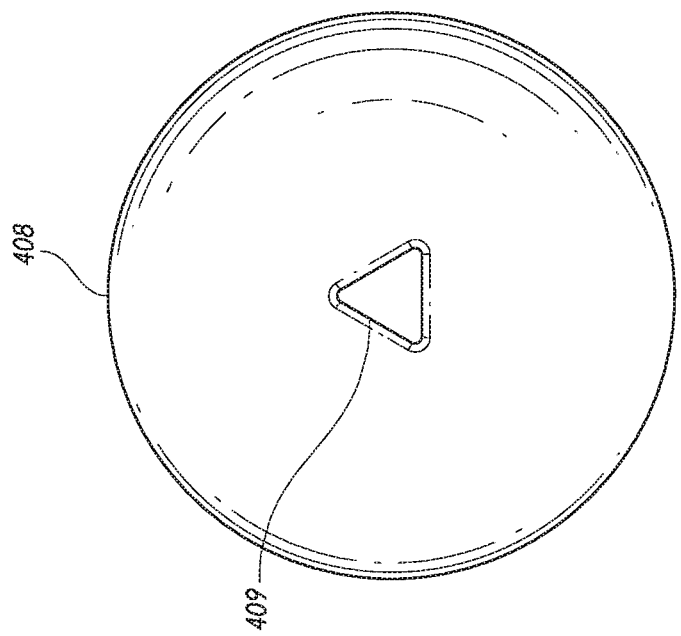
FIG. 69 is a top view of a "triangular version" of an air-lock bobber with a triangular channel, the triangular channel opening being visible, the bottom view being a mirror image of the top view.

A first unique feature shown in some of the fishing line accessory systems of FIGS. 32-83 is an air-lock float or bobber (shown and described as an air-lock bobber 400, 402, 404, 406, 408) with a cavity 401 or a channel 403, 405, 407, 409, 412 ("channel" 412 is described further below) defined therein. An air-lock bobber may be an air-filled, hollow three-dimensional geometric figure (shown as a sphere, but other three-dimensional figures are contemplated including, but not limited to, cubes, prisms, pyramids, cylinders, and cones, as well as irregular shapes and shapes designed to look like known objects (e.g. fish, eggs, star, tear drops, teddy bears, flowers)). The cavity 401 or channel 403 may have a cross-section that is square-shaped (such as channel 405 in FIGS. 54 and 55), circular-shaped (such as channel 407 in FIGS. 61 and 62), triangle-shaped (such as channel 409 in FIGS. 69 and 70), or a different two-dimensional regular or irregular geometric figure. The channel 403, 405, 407, 409, 412 can be visualized as a conduit between two "openings" in the surface of the air-lock bobber 400, 402, 404, 406, 408. Most likely the air-lock bobber 400, 402, 404, 406, 408 would be made from materials including, but not limited to, soft plastic, foams (such s extruded polystyrene foams such as STYROFOAM®), cork, wood, hard plastic, yarn, or virtually any known or yet to be discovered material that floats. Most likely the air-lock bobber 400, 402, 404, 406, 408 would be made using a blow molding process (for example, the processes described in U.S. Pat. No. 8,893,908 to Treece et al. or U.S. Pat. No. 8,877,117 to Fields et al.). Preferably the channel 403, 405, 407, 409, 412 is integral with the 400, 402, 404, 406, 408. Solid floats and bobbers (made from floatable materials) with cavities and channels defined therein could be used.

A second unique feature shown in some of the fishing line accessory systems of FIGS. 32-83 is a post coupling component 420, 422, 424, 426, 428. A variation is a shaft coupling component 430 (that will be discussed in conjunction with FIGS. 71-83). Each post coupling component 420, 422, 424, 426, 428 has a base section 420a, 422a, 424a, 426a, 428a, a shaft section 420b, 422b, 424b, 426b, 428b, and an insertion section 420c, 422c, 424c, 426c, 428c. The base sections 420a, 422a, 424a, 426a, 428a are similar to the bases described in other embodiments (e.g. base 102a, base 112a, base 122a) except that they are not used specifically for adhering to the fishing line accessory and may, instead, be used for limiting the depth that an insertion section 420c, 422c, 424c, 426c, 428c may be inserted into the cavity 401 or a channel 403, 405, 407, 409. The shown shape and thickness of the base sections 420a, 422a, 424a, 426a, 428a are meant to be exemplary. The shaft sections 420b, 422b, 424b, 426b, 428b are similar to the shafts described in other embodiments (e.g. shaft 102b, shaft 112b, shaft 122b) including being forked to have two tines separated by a gap. The shown shape and thickness of the shaft sections 420b, 422b, 424b, 426b, 428b and tines are meant to be exemplary. The insertion sections 420c, 422c, 424c, 426c, 428c are designed to be inserted into the cavity 401 or channel 403, 405, 407, 409, 412 of an air-lock bobber 400, 402, 404, 406, 408. The cross-section of the insertion sections 420c, 422c, 424c, 426c, 428c, therefore, would at least substantially mate with the cavity 401 or channel 403, 405, 407, 409, 412. So, if the cavity 401 or channel 403 had a square cross-section (e.g. FIGS. 54-55), the post coupling component 420, 422, 424, 426, 428 would have an insertion section 420c, 422c, 424c, 426c, 428c that had a square cross-section (e.g. FIGS. 49-53). Similarly, if the cavity 401 or channel 403 had a circular cross-section (e.g. FIGS. 61-62), the post coupling component 420, 422, 424, 426, 428 would have an insertion section 420c, 422c, 424c, 426c, 428c that had a circular cross-section (e.g. FIGS. 56-60). Also similarly, if the cavity 401 or channel 403 had a triangular cross-section (e.g. FIGS. 69-70), the post coupling component 420, 422, 424, 426, 428 would have an insertion section 420c, 422c, 424c, 426c, 428c that had a triangular cross-section (e.g. FIGS. 63-68). If an alternative cavity or channel had a different shaped cross-section, the respective insertion section would have the appropriate mating cross-section. An advantage of a circular cross-section of an insertion section 420c, 422c, 424c, 426c, 428c is that it does not need to be oriented before insertion. An advantage of a non-regular cross-section (e.g. a triangle or square cross-section) of an insertion section 420c, 422c, 424c, 426c, 428c is that it is less likely to rotate after insertion. Regardless of the cross-section of the insertion section 420c, 422c, 424c, 426c, 428c, the insertion section 420c, 422c, 424c, 426c, 428c may have grooves, bumps, or other texturing to help the insertion section 420c, 422c, 424c, 426c, 428c stay within the cavity 401 or a channel 403, 405, 407, 409, 412. The grooves, bumps, or texturing may also be helpful if adhesive (e.g. glue) is used to further secure the insertion section 420c, 422c, 424c, 426c, 428c within the cavity 401 or a channel 403, 405, 407, 409, 412. Most likely post coupling component 420, 422, 424, 426, 428 would be made from materials including, but not limited to, hard plastic, rubber, synthetic polymers (e.g. nylon), thermoplastic polymer (e.g. acrylonitrile butadiene styrene), or any other material known or yet to be discovered material that is relatively light weight and will not dissolve in water (including salt water). Most likely the post coupling component 420, 422, 424, 426, 428 would be made using an injection molding process.

A third unique feature shown in some of the fishing line accessory systems of FIGS. 32-83 is the use of a glow stick 454, 464 that may be inserted into a channel 403, 405, 407, 409, 412 (and also the glow stick channel 432 which will be discussed with the other channels as well as individually below) of an air-lock float or bobber (shown and described as an air-lock bobber 402, 404, 406, 408, 410). The eighteenth fishing line accessory system is shown as including a glow stick 454 that may be inserted into the channel 403 opposite from the post coupling component 422. Put another way, the channel 403 has a first end and a second end, the post coupling component 422 may be inserted into the first end and the glow stick 454 may be inserted into the second end. The glow stick 454, 464 is also preferably removable. Preferably the glow stick 454, 464 is easily removable and no tools are needed to remove it. For example, the glow stick 454, 464 may be held within the channel 403, 405, 407, 409, 412, 432 using friction. This may be accomplished using a glow stick 454, 464 that has a diameter that is slightly larger (e.g. 4.5 mm) than the smallest diameter of the channel into which it is inserted. The cross-section of the glow stick 454, 464 does not have to be the same as the cross-section of the channel 403, 405, 407, 409, 412, 432. For example, the eighteenth fishing line accessory system shown in FIGS. 40-48 has a channel 403 with a square cross-section and the glow stick 454 has a circular cross-section. Instead of using a friction securing mechanism, the glow stick 454, 464 may be screwed into the channel 403, 405, 407, 409, 412, 432 (the exterior surface of the glow stick 454, 464 having threading that mated with threading on the interior surface of the channel 403, 405, 407, 409, 412, 432). There also may additional structure that alternatively or further secures the glow stick 454, 464 within the channel 403, 405, 407, 409, 412, 432 that is used alone or in combination with other specified securing mechanisms (e.g. friction or screwing).

The seventeenth fishing line accessory system of FIGS. 32-39, the eighteenth fishing line accessory system of FIGS. 40-48, and the nineteenth fishing line accessory system of FIGS. 71-83, are examples of fishing line accessory systems that incorporate some or all of the unique features described above. These examples are not meant to limit the scope of the invention as variations are possible (e.g. the cross-sections of the component may be different).

FIGS. 32-39 show a preferred exemplary seventeenth fishing line accessory system. This system may include an air-lock bobber 400 with a cavity 401 and a post coupling component 420. The post coupling component 420 (and specifically the insertion section 420c thereof) may be inserted (and possibly adhered using an adhesive) into the cavity 401. The shown air-lock bobber 400 may be a spherical one-half inch air-lock bobber. This seventeenth fishing line accessory system functions much like the second fishing line accessory system shown in FIGS. 3 and 4 in that it has a "male" forked coupling component (shown as shaft section 420b which is divided into two tines) and a "female" nut coupling component 440. As shown, the "male" forked coupling component has an at least partially threaded exterior surface. The shaft section 420b is forked to have two tines separated by a gap into which a fishing line may be inserted. An optional O-ring 442 helps both in the gripping of the fishing line and sealing. The base section 420a, shaft section 420b, coupling component 440, and optional O-ring 442 of the seventeenth fishing line accessory system function substantially similarly to and have similar advantages as the structures of the second fishing line accessory system and the description related to the second fishing line accessory system is incorporated here.

FIGS. 40-48 show a preferred exemplary eighteenth fishing line accessory system. This system may include an air-lock bobber 402 with a channel 403 and a post coupling component 422. The shown air-lock bobber 402 may be a spherical one and one-quarter inch air-lock bobber. The eighteenth fishing line accessory system is shown is including a glow stick 454 that may be inserted into the channel 403 opposite from the post coupling component 422. Put another way, the channel 403 has a first end and a second end, the post coupling component 422 may be inserted (and possibly adhered using an adhesive) into the first end and the glow stick 454 may be inserted into the second end. The glow stick 454 is also preferably removable. This eighteenth fishing line accessory system functions much like the second fishing line accessory system shown in FIGS. 3 and 4 in that it has a "male" forked coupling component (shown as shaft section 422b which is divided into two tines) and a "female" nut coupling component 450. As shown, the "male" forked coupling component has an at least partially threaded exterior surface. The shaft section 422b is forked to have two tines separated by a gap into which a fishing line may be inserted. An optional O-ring 452 helps both in the gripping of the fishing line and sealing. The base section 422a, shaft section 422b, coupling component 450, and optional O-ring 452 of the eighteenth fishing line accessory system function substantially similarly to and have similar advantages as the structures of the second fishing line accessory system and the description related to the second fishing line accessory system is incorporated here.

Figure 71:
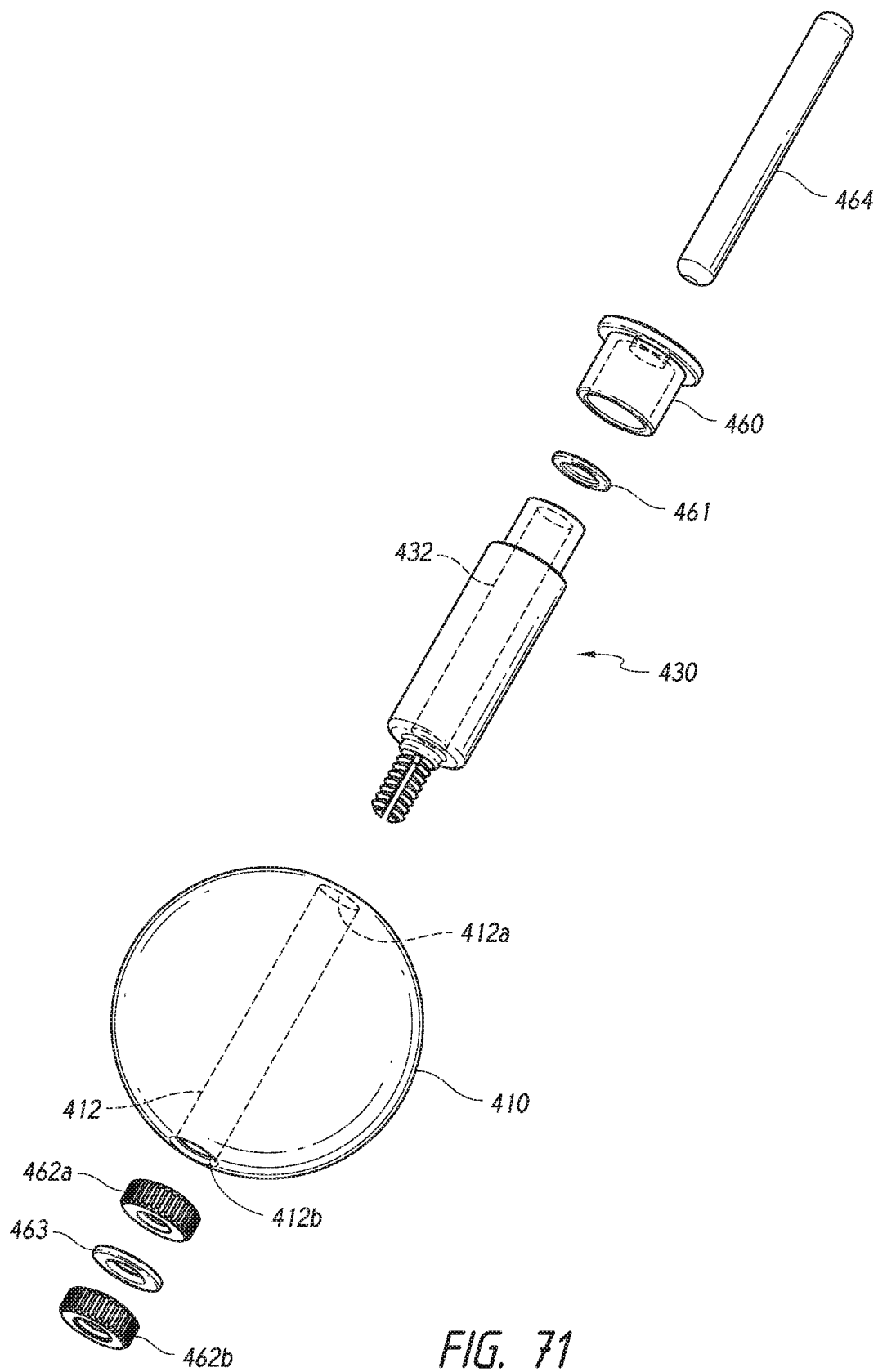
FIG. 71 is an exploded view of a preferred exemplary nineteenth fishing line accessory system, with a glow stick inserted into a through-shaft with end tines, with a first knurled nut, a rubber washer, and a second knurled nut attached to the end tines.
Figure 72:
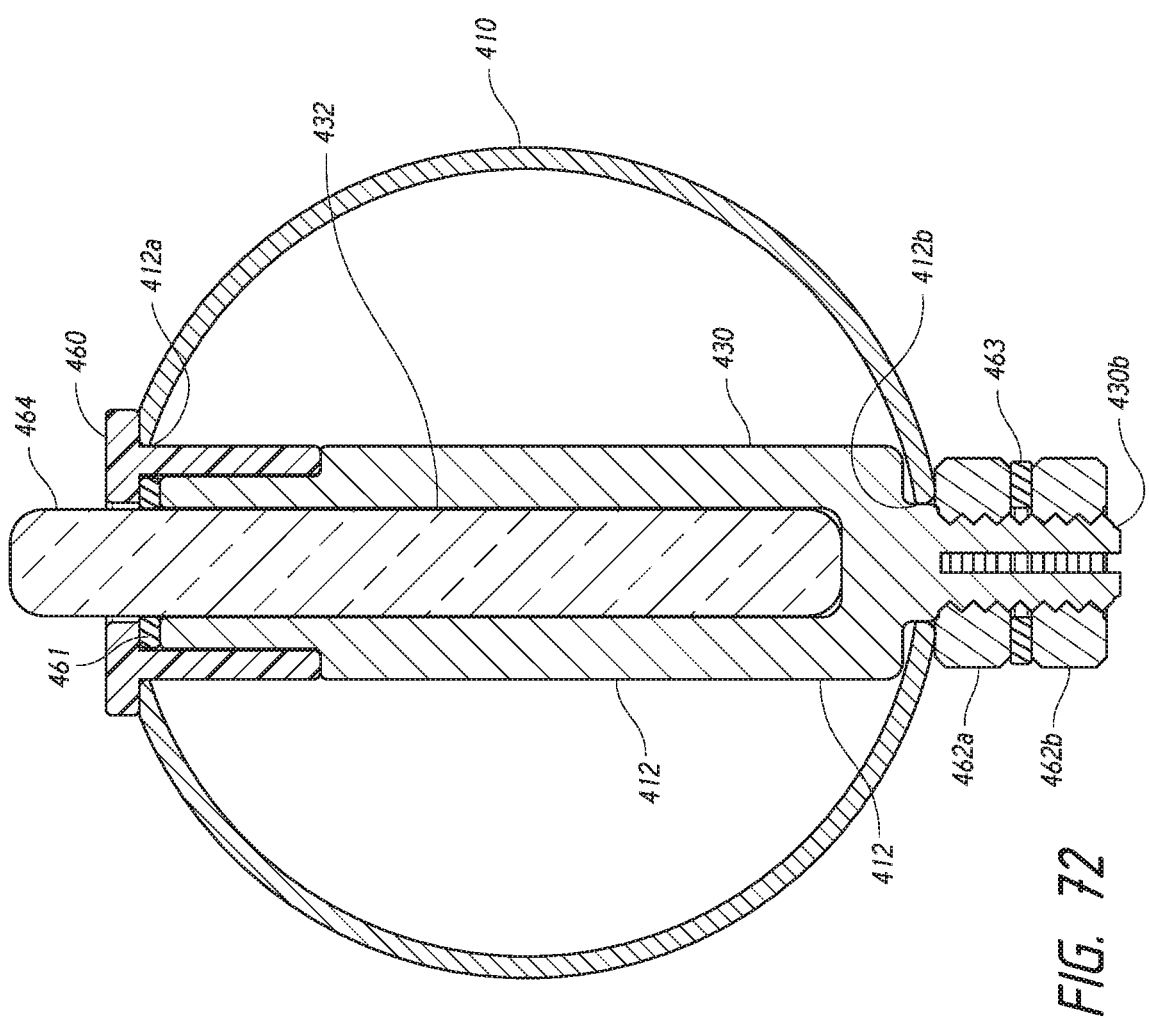
FIG. 72 is a cross-sectional view of the assembled preferred exemplary nineteenth fishing line accessory system of FIG. 71.
Figure 74:
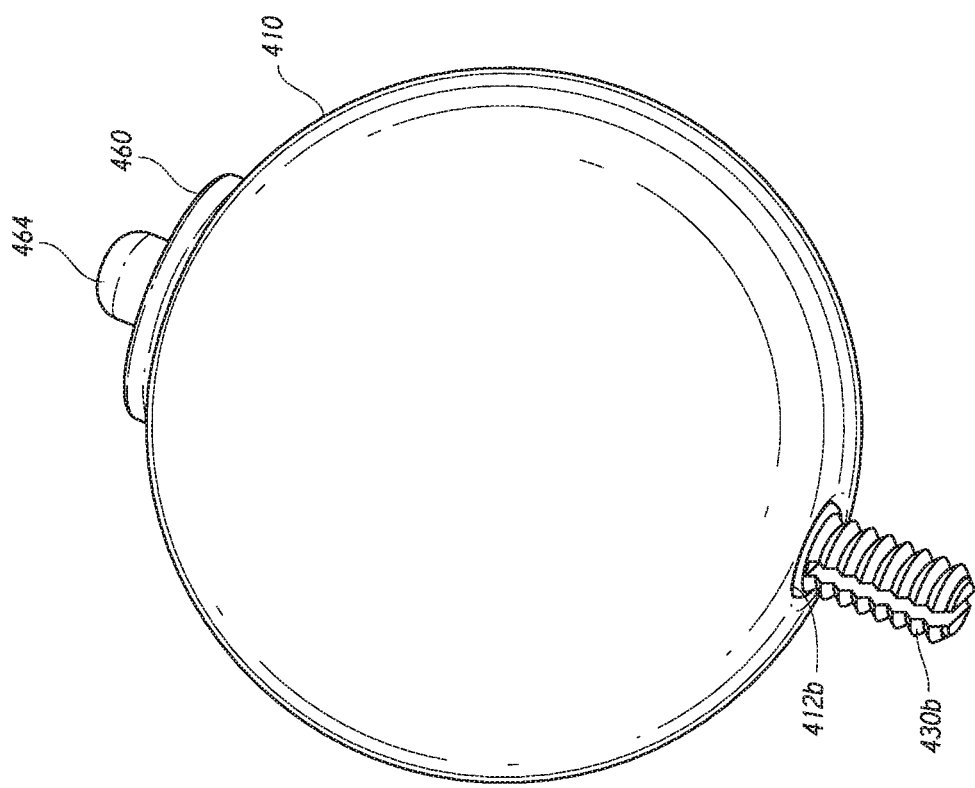
FIG. 74 is a perspective view of the preferred exemplary nineteenth fishing line accessory system of FIG. 71, without the first knurled nut, the rubber washer, and the second knurled nut attached to the end tines.
Figure 73:
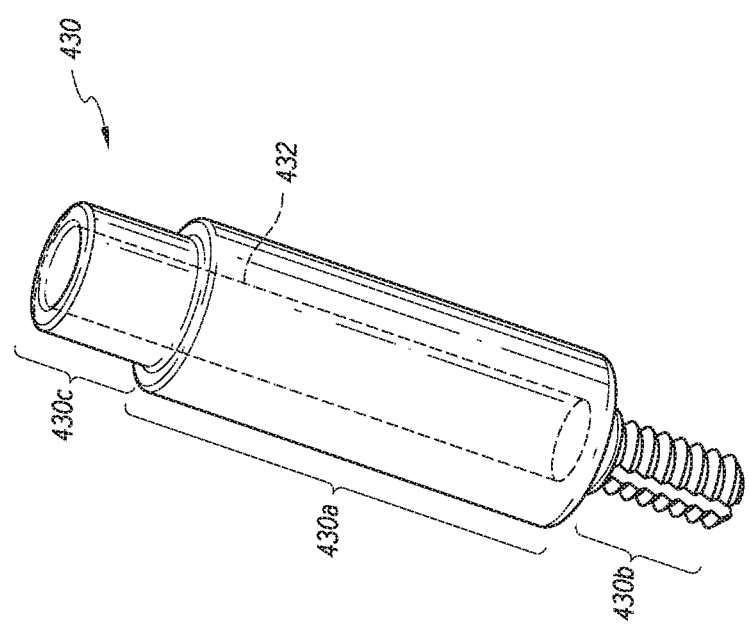
FIG. 73 is a perspective view of the through-shaft of the preferred exemplary nineteenth fishing line accessory system of FIG. 71.
Figure 76:
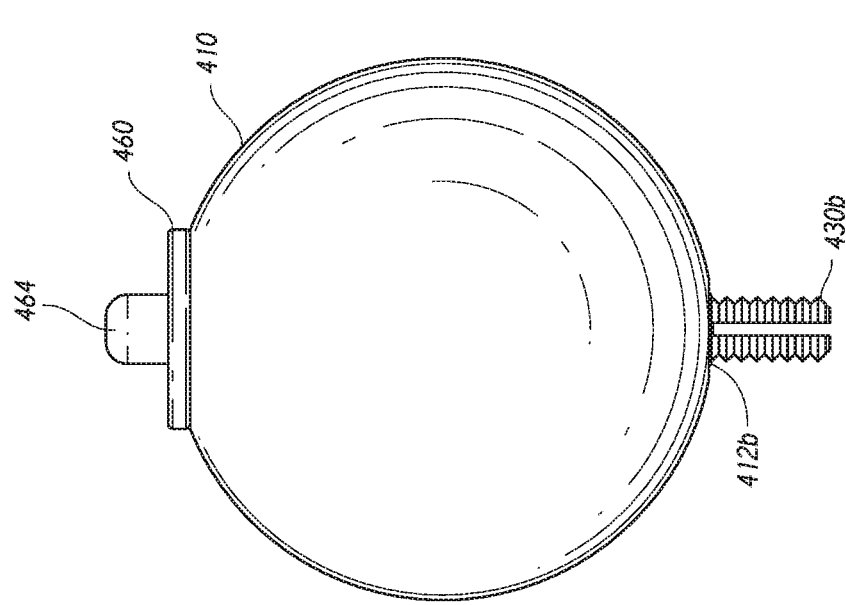
FIG. 76 is a first side view of the preferred exemplary nineteenth fishing line accessory system of FIG. 74, the second side view being a mirror image of the first side view.
Figure 75:
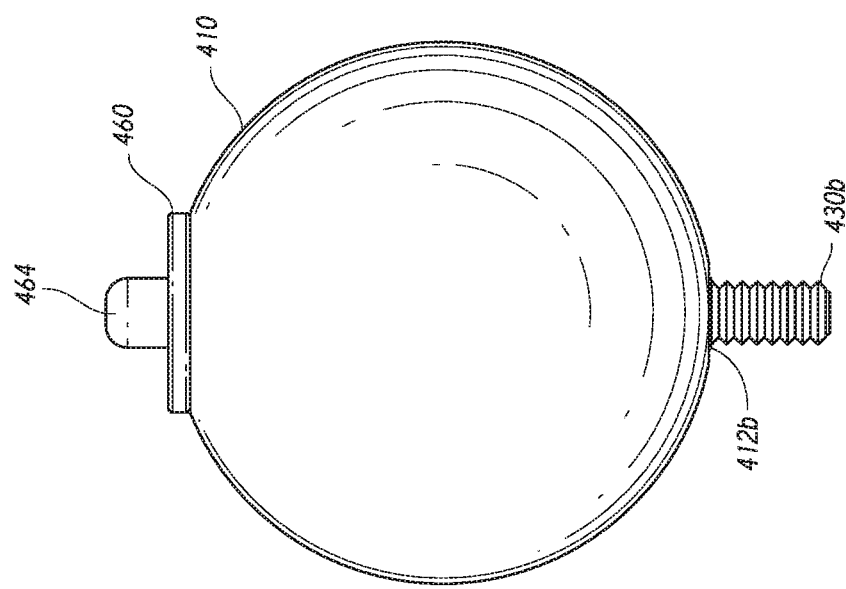
FIG. 75 is front view of the preferred exemplary nineteenth fishing line accessory system of FIG. 74, the back view being a mirror image of the front view.
Figure 78:
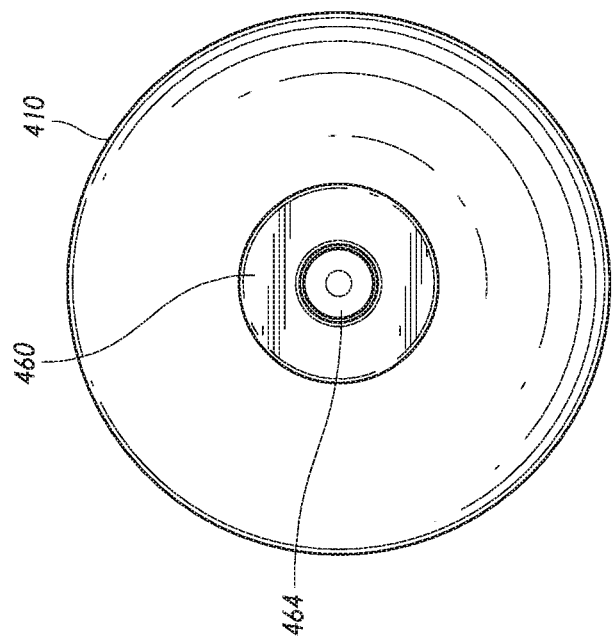
FIG. 78 is a top view of the preferred exemplary nineteenth fishing line accessory system of FIG. 74.
Figure 77:
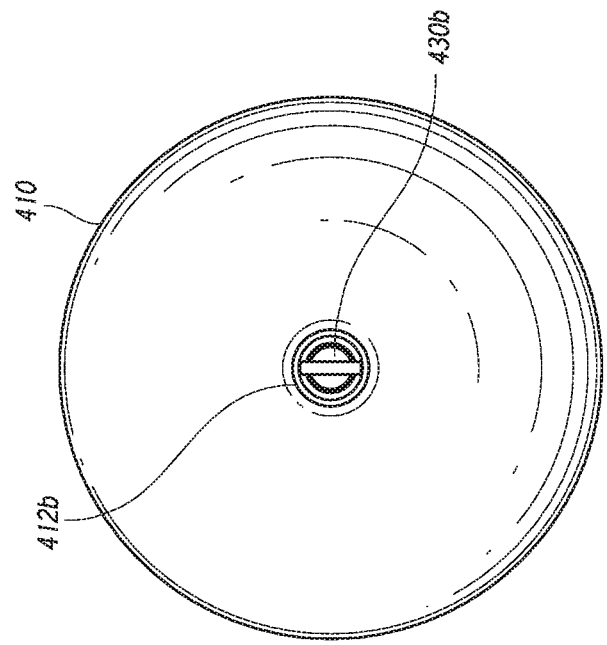
FIG. 77 is a bottom view of the preferred exemplary nineteenth fishing line accessory system of FIG. 74.
Figure 79:
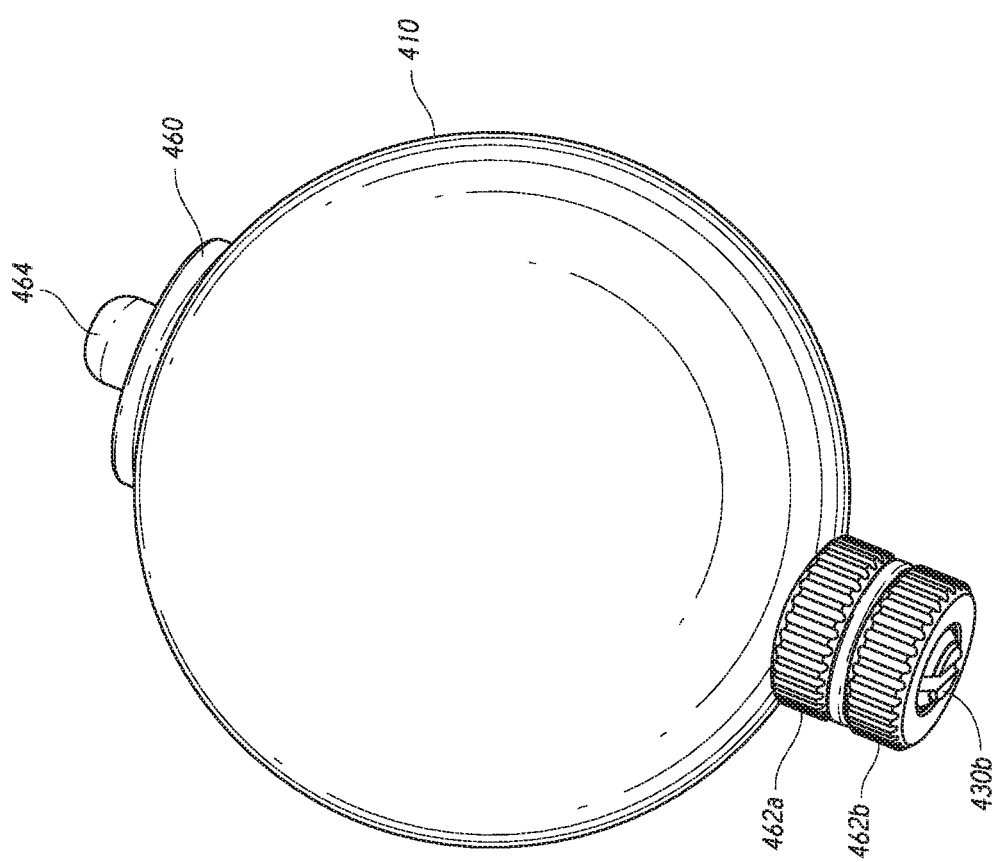
FIG. 79 is a perspective view of the preferred exemplary nineteenth fishing line accessory system of FIG. 71, with the first knurled nut, the rubber washer, and the second knurled nut attached to the end tines.
Figure 81:
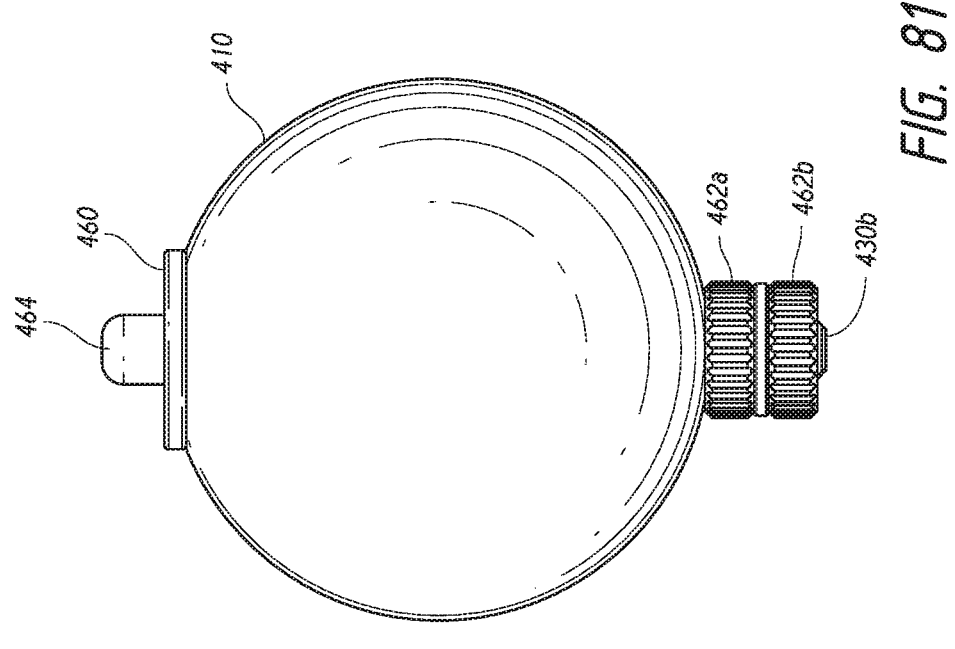
FIG. 81 is a front view of the preferred exemplary nineteenth fishing line accessory system of FIG. 79, the back view being a mirror image of the front view.
Figure 80:
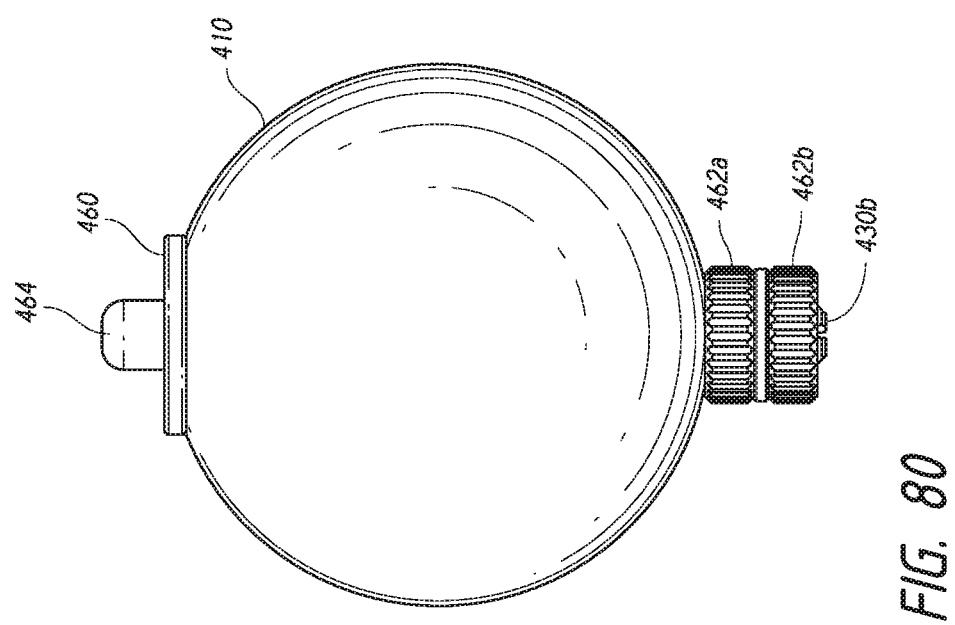
FIG. 80 is a first side view of the preferred exemplary nineteenth fishing line accessory system of FIG. 79, the second side view being a mirror image of the first side view.

FIGS. 71-83 show a preferred exemplary nineteenth fishing line accessory system. This system may include a bobber 410 with a channel 412 and a spanning coupling component 430. The shown bobber 410 may be an air-lock bobber or it may be a standard bobber. The shown bobber 410 may be a spherical one and one-quarter inch bobber. If the bobber 410 is an air-lock bobber, the channel 412 would be constructed in a manner similar to the channels 403, 405, 407, 409, 412 described herein. On the other hand, if the bobber 410 is a standard bobber, the "channel" may simply be the distance (without any surface) between two real openings 412a, 412b defined in the surface of the sphere. The spanning coupling component 430 spans the distance of the channel 412. As shown in FIG. 73, the shown exemplary spanning coupling component 430 has three sections: a central spanning section 430a, a shaft section 430b (that is forked to have two tines divided by a gap) that is at one end of the central spanning section 430a, and an access section 430c (that is open to receive a glow stick 464) that is at the opposite end of the central spanning section 430a. A glow stick channel 432 is defined in the spanning coupling component 430 from the access section 430c and at least partially through the central spanning section 430a. As shown in FIGS. 71 and 72, the nineteenth fishing line accessory system also includes an annular securing cap 460, a first optional O-ring 461, a first nut 462a, a second optional O-ring 463, and a second nut 462b. One way to construct the nineteenth fishing line accessory system includes the steps of (1) inserting the first optional O-ring 461 into the annular securing cap 460, (2) the spanning coupling component 430 is inserted through a first real opening 412a and partially through the second real opening 412b so that the shaft section 430b protrudes from the second real opening 412b, (3) the annular securing cap 460 is inserted partially into the first real opening 412a and over the access section 430c to secure the spanning coupling component 430 within the bobber 410, but without obstructing access to the glow stick channel 432, and (4) the protruding shaft section 430b then is inserted through the opening of the second nut 462b, the second nut 462b securing the protruding shaft section 430b. Please note that the order of these steps may be varied (e.g. step (1) could be performed after step (2), and step (3) could be performed after step (4)). In this configuration, the first nut 462a serves a dual purpose and functions as the base shown in FIGS. 3 and 4, the protruding shaft section 430b functions like the "male" forked coupling component shown in FIGS. 3 and 4, and the second nut 462b functions like the "female" nut coupling component shown in FIGS. 3 and 4. The base-like first nut 462a, protruding shaft section 430b, second nut 462b, and the second optional O-ring 463 of the nineteenth fishing line accessory system function substantially similarly to and have similar advantages as the structures of the second fishing line accessory system and the description related to the second fishing line accessory system is incorporated here.

Additional Variations

Preferred exemplary materials from which the coupling components may be constructed include, but are not limited to, plastic, nylon, non-corrosive metals, and other solid materials that can be submerged. The O-rings may be constructed from preferred exemplary materials such as rubber, neoprene, silicone, and other compressible materials that can be submerged. As set forth above, the body of the fishing accessories such as floats or bobbers may be made of any floating material including, but not limited to, rubber or latex (e.g. a balloon), plastic (e.g. a hollow plastic shape), polystyrene (e.g. STYROFOAM®), cork, foam, yarn, neoprene, silicone, or any other floating material. As set forth above, the body of the fishing accessories such as weights may be or may include any heavy material including, but not limited to, magnets, metal (e.g. lead), sand, or any material that would sink in water.

Although the shown gaps (in the shafts) are straight, the gaps may have bends, zig-zags, or enlarged openings near the base. Although the shown bases have a smooth face surface (on the face of the base facing the shaft), the base face surface may have additional features such as texturing (e.g. ridges, grooves, threading, ribs, or bumps) or a single groove. For example, an alternative fishing line accessory system including a fishing accessory, an affixed "male" forked coupling component, and a "female" nut coupling component might have a "male" forked coupling component with a base and a shaft (which is connected at one end to the base and forked to have two tines separated by a gap) with an at least partially threaded exterior surface. One surface of the base is affixed to the fishing accessory and the opposite surface has the shaft that is affixed (including integral) thereto. In this example, the shaft surface of the base has a base groove that extends along the diameter through the gap in the shaft. In addition, substantially at or adjacent to where the shaft meets the base, is an enlarged opening through the shaft. "Male" forked coupling components having either or both the base groove or the enlarged shaft opening would allow a fishing line to slide if no O-ring is used, but be held in place if the O-ring is used. Alternatively, the forked coupling components can be altered with a notch on the threads that would make it tighten at a short distance from the base, holding the nut coupling component at a position short of the base. This would allow space enough for the fishing accessory to slide on the fishing line, but tightening with greater effort would accomplish bringing the nut coupling component tightly against the base, fixing the fishing accessory on the fishing line.

Appropriate gripping, ridged, knurled, or otherwise textured surfaces may be used to facilitate easy gripping by a user. The shown textured surfaces are meant to be exemplary and are not to be considered limiting. Similarly, surfaces that are not shown as being textured may be textured for purposes such as facilitating easy gripping by a user. Appropriate tabs and/or indents may be added to coupling components as needed for the purpose of providing a place for a user to insert a fingernail. FIGS. 11 and 12, for example, show an optional tab 158 for this purpose.

Although the preferred embodiments are shown as complete products, they can be distributed and sold as kits. More specifically, the coupling components (and other components such as O-rings and magnets) can be sold separately so that the user can affix the appropriate coupling components to a fishing accessory of their choice. For example, the coupling components and O-ring of the second fishing line accessory system (FIGS. 3 and 4) could be provided to a user who affixes one of the coupling components to his own fishing accessory. Another example is that, the coupling components and magnet of the tenth fishing line accessory system (FIG. 19) could be provided to a user who affixes one of the magnets to his own fishing accessory. Yet another example is that the balloon fishing accessories shown in the thirteenth, fourteenth, fifteenth, and sixteenth fishing line accessory systems that could be user provided.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. A fishing line accessory system for securing fishing accessories to a fishing line, said system comprising:
    (a) a primary coupling component;
    (b) a secondary coupling component coupleable with said primary coupling component, said fishing line being securable between said primary coupling component and said secondary coupling component;
    (c) at least one fishing accessory, said at least one fishing accessory being at least one inflatable fishing accessory;
    (d) at least one of said coupling components having an air path defined therein and a valve positioned within said air path, air being introducible to said at least one inflatable fishing accessory via said valve and air path;
    (e) at least one of the primary coupling component and the secondary coupling component being a male coupling component having a shaft forked to have at least two tines separated by at least one gap; and
    (f) at least one other of the primary coupling component and the secondary coupling component being a female coupling component;
    (g) wherein when said male coupling component is at least partially mated with said female coupling component, said at least two tines and said at least one gap are positioned at least partially within said female coupling component.

2. The system of claim 1, said at least one inflatable fishing accessory being at least one balloon.

3. The system of claim 1, wherein said valve is opened by the air being forced along said air path and through said valve in a single direction into said at least one fishing accessory.

4. The system of claim 1, said valve being associated with said male coupling component.

5. The system of claim 1, said male coupling component having an at least partially threaded exterior surface, and said female coupling component having an at least partially threaded interior surface.

6. The system of claim 1, said male coupling component having an at least partially threaded exterior surface, said female coupling component having an at least partially threaded interior surface, wherein when said at least partially threaded exterior surface of said male coupling component is at least partially threadably mated with said at least partially threaded interior surface of said female coupling component, said valve is positioned within said air path defined in said female coupling component.

7. The system of claim 1, said fishing line being securable at least partially within said at least one gap.

8. The system of claim 1, said male coupling component comprising:
(a) a base; and
(b) said shaft connected at one end to said base.

9. The system of claim 1, said valve being a duckbill valve.

10. The system of claim 1, wherein the air is introducible in a single direction into said at least one inflatable fishing accessory via said valve and said air path, but the air cannot flow in an opposite direction and, therefore, prevents escape or leakage of the air.

11. The system of claim 1, wherein said male coupling component blocks said air path to at least partially prevent the air from escaping through said valve and said air path when said male coupling component is at least partially mated with said female coupling component.

12. A fishing line accessory system for securing fishing accessories to a fishing line, said system comprising:
(a) a primary coupling component;
(b) a secondary coupling component coupleable with said primary coupling component;
(c) at least one fishing accessory, said at least one fishing accessory being at least one inflatable fishing accessory;
(d) at least one of said coupling components having an air path defined therein and a valve positioned within said air path, said valve being a one-way valve through which air can be forced in a single direction, the air being introducible to said at least one inflatable fishing accessory via said valve and air path;
(e) at least one of the primary coupling component and the secondary coupling component being a male coupling component having a shaft forked to have at least two tines separated by at least one gap; and
(f) at least one other of the primary coupling component and the secondary coupling component being a female coupling component;
(g) wherein when said male coupling component is at least partially mated with said female coupling component, said at least two tines and said at least one gap are positioned at least partially within said female coupling component.

13. The system of claim 12, said at least one inflatable fishing accessory being at least one balloon.

14. The system of claim 12, said valve being associated with said male coupling component.

15. The system of claim 12, said male coupling component having an at least partially threaded exterior surface, and said female coupling component having an at least partially threaded interior surface.

16. The system of claim 12, said male coupling component having an at least partially threaded exterior surface, said female coupling component having an at least partially threaded interior surface, wherein when said at least partially threaded exterior surface of said male coupling component is at least partially threadably mated with said at least partially threaded interior surface of said female coupling component, said valve is positioned within said air path defined in said female coupling component.

17. The system of claim 12, said fishing line being securable at least partially within said at least one gap.

18. The system of claim 12, said male coupling component comprising:
(a) a base; and
(b) said shaft connected at one end to said base.

19. The system of claim 12, said fishing line being securable between said primary coupling component and said secondary coupling component.

20. The system of claim 12, said valve being a duckbill valve.

21. The system of claim 12, wherein the air is introducible in a single direction into said at least one inflatable fishing accessory via said valve and said air path, but the air cannot flow in an opposite direction and, therefore, prevents escape or leakage of the air.

22. The system of claim 12, wherein said male coupling component blocks said air path to at least partially prevent the air from escaping through said valve and said air path when said male coupling component is at least partially mated with said female coupling component.

23. The system of claim 12, wherein said valve is opened by the air being forced along said air path and through said valve in a single direction into said at least one fishing accessory.

* * * * *